US011070821B2

(12) United States Patent
Zhang et al.

(10) Patent No.: US 11,070,821 B2
(45) Date of Patent: Jul. 20, 2021

(54) SIDE INFORMATION SIGNALING FOR INTER PREDICTION WITH GEOMETRIC PARTITIONING

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/031,208

(22) Filed: Sep. 24, 2020

(65) Prior Publication Data
US 2021/0006803 A1 Jan. 7, 2021

Related U.S. Application Data

(63) Continuation of application No. PCT/CN2019/115969, filed on Nov. 6, 2019.

(30) Foreign Application Priority Data

Nov. 6, 2018 (WO) ................ PCT/CN2018/114099
Dec. 30, 2018 (WO) ................ PCT/CN2018/125956
(Continued)

(51) Int. Cl.
*H04N 19/176* (2014.01)
*H04N 19/184* (2014.01)
(Continued)

(52) U.S. Cl.
CPC ......... *H04N 19/176* (2014.11); *H04N 19/105* (2014.11); *H04N 19/119* (2014.11);
(Continued)

(58) Field of Classification Search
CPC ............... H04N 19/176; H04N 19/184; H04N 19/1883; H04N 19/52; H04N 19/70
(Continued)

(56) References Cited

U.S. PATENT DOCUMENTS 9,020,030 B2 4/2015 Chen et al.
9,237,358 B2 1/2016 Chien et al.
(Continued)

FOREIGN PATENT DOCUMENTS

CN 101822058 A 9/2010
CN 101822064 A 9/2010
(Continued)

OTHER PUBLICATIONS

Akula et al. "Description of SDR, HDR and 360 degrees Video Coding Technology Proposal Considering Mobile Application Scenario by Samsung, Huawei, GoPro, and HiSilicon," buJoint Video Exploration Team (JVET) of ITU-T SG 16 WP 3 and ISO/IEC JTC 1/SC 29/WG 11, 10th Meeting, San Diego, US, Apr. 10-20, 2018, document JVET-J0024, 2018.
(Continued)

*Primary Examiner* — Jae N Noh
(74) *Attorney, Agent, or Firm* — Perkins Coie LLP

(57) ABSTRACT

A method for processing a video includes performing a determination, by a processor, that a first video block is partitioned to include a first prediction portion that is non-rectangular and non-square; adding a first motion vector (MV) prediction candidate associated with the first prediction portion to a motion candidate list associated with the first video block, wherein the first MV prediction candidate
(Continued)

splitting from top-left corner to bottom-right corner splitting from top-right corner to bottom-left corner is derived from a sub-block MV prediction candidate; and performing further processing of the first video block using the motion candidate list.

19 Claims, 48 Drawing Sheets

(30) Foreign Application Priority Data

Jan. 10, 2019 (WO) ................ PCT/CN2019/071160
Jan. 15, 2019 (WO) ................ PCT/CN2019/071747

(51) Int. Cl.
```
H04N 19/169      (2014.01)
H04N 19/52       (2014.01)
H04N 19/70       (2014.01)
H04N 19/105      (2014.01)
H04N 19/119      (2014.01)
H04N 19/46       (2014.01)
H04N 19/51       (2014.01)
H04N 19/159      (2014.01)
```
(52) U.S. Cl.
CPC ......... *H04N 19/159* (2014.11); *H04N 19/184* (2014.11); *H04N 19/1883* (2014.11); *H04N 19/46* (2014.11); *H04N 19/51* (2014.11); *H04N 19/52* (2014.11); *H04N 19/70* (2014.11)

(58) Field of Classification Search
USPC ..................................................... 375/240.16
See application file for complete search history.

(56) References Cited

U.S. PATENT DOCUMENTS

| | | | |
|---|---|---|---|
| 2010/0208818 A1* | 8/2010 | Yin ........................ | H04N 19/13 375/240.15 |
| 2011/0075724 A1 | 3/2011 | Reznik et al. | |
| 2011/0200097 A1* | 8/2011 | Chen .................... | H04N 19/137 375/240.02 |
| 2011/0200110 A1 | 8/2011 | Chen et al. | |
| 2012/0106627 A1 | 5/2012 | Guo et al. | |
| 2012/0106647 A1 | 5/2012 | Jung et al. | |
| 2012/0147961 A1 | 6/2012 | Guo et al. | |
| 2012/0177114 A1* | 7/2012 | Guo ........................ | H04N 19/17 375/240.12 |
| 2013/0077684 A1 | 3/2013 | Chen et al. | |
| 2013/0188704 A1 | 7/2013 | Zhou | |
| 2013/0266070 A1 | 10/2013 | Sato | |
| 2013/0272423 A1 | 10/2013 | Chien et al. | |
| 2014/0003527 A1 | 1/2014 | Tourapis | |
| 2014/0003528 A1 | 1/2014 | Tourapis | |
| 2014/0072041 A1 | 3/2014 | Seregin et al. | |
| 2014/0086329 A1 | 3/2014 | Seregin et al. | |
| 2014/0294078 A1 | 10/2014 | Seregin et al. | |
| 2015/0189330 A1 | 7/2015 | Alshina et al. | |
| 2018/0098086 A1 | 4/2018 | Chuang et al. | |
| 2018/0103273 A1 | 4/2018 | Guo et al. | |
| 2018/0241998 A1 | 8/2018 | Chen et al. | |
| 2018/0262773 A1 | 9/2018 | Chuang et al. | |
| 2018/0295385 A1 | 10/2018 | Alshin et al. | |
| 2018/0376166 A1 | 12/2018 | Chuang et al. | |
| 2019/0191171 A1 | 6/2019 | Ikai | |
| 2019/0230350 A1 | 7/2019 | Chen et al. | |
| 2019/0238880 A1 | 8/2019 | Lee | |
| 2020/0029073 A1 | 1/2020 | Chiang et al. | |
| 2020/0137422 A1 | 4/2020 | Misra et al. | |
| 2020/0177911 A1 | 6/2020 | Aono et al. | |
| 2020/0186792 A1* | 6/2020 | Zhao .................... | H04N 19/159 |
| 2021/0006790 A1 | 1/2021 | Zhang et al. | |
| 2021/0029366 A1 | 1/2021 | Zhang et al. | |
| 2021/0029372 A1 | 1/2021 | Zhang et al. | |

FOREIGN PATENT DOCUMENTS

| | | |
|---|---|---|
| CN | 102547290 A | 7/2012 |
| CN | 102668569 A | 9/2012 |
| CN | 102763415 A | 10/2012 |
| CN | 104717513 A | 6/2015 |
| CN | 105531999 A | 4/2016 |
| CN | 106791834 A | 5/2017 |
| CN | 106851313 A | 6/2017 |
| CN | 107736022 A | 2/2018 |
| CN | 107750457 A | 3/2018 |
| CN | 109005407 A | 12/2018 |
| WO | 2012099692 A1 | 7/2012 |
| WO | 2013039692 A1 | 3/2013 |
| WO | 2013056656 A1 | 4/2013 |
| WO | 2017058633 A1 | 4/2017 |
| WO | 2018035127 A1 | 2/2018 |
| WO | 2018067672 A1 | 4/2018 |
| WO | 2018115572 A3 | 8/2018 |
| WO | 2018237303 A1 | 12/2018 |

OTHER PUBLICATIONS

Bordes et al. "Fast Encoding Algorithms for Geometry-Adaptive Block Partitioning," 18th IEEE International Conference on Image Processing, 2011, 1205-1208.

Bross et al. "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K1001, 2018.

Chen et al. "Parametric OBMC for Pixel-Adaptive Temporal Prediction on Irregular Motion Sampling Grids," IEEE Transactions on Circuits and Systems for Video Technology, Jan. 2012, 22(1)113-127.

Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "Description of SDR, HDR and 360 degree Video Coding Technology Proposal by Qualcomm and Technicolor—low and high complexity versions," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021, 2018.

Chen et al. "CE4: Common Base for Affine Merge Mode (Test 4.2.1)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0366, 2018.

Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0368, 2018.

Chen et al. "CE4: Separate List for Sub-Block Merge Candidate (Test 4.2.8)," Joint Video Experts Team (JVET) of ITU-T SG 16 WP 3 and Iso/IEC JTC 1/SC 29/WG 11, 12th Meeting, Macao, CN, Oct. 3-12, 2018, document JVET-L0369, 2018.

httpsjvet.hhi.fraunhofer.desvnsvn_HMJEMSoftwaretags HM-16.6-JEM-7.0. (only website).

httpsvcgit.hhi.fraunhofer.dejvetVVCSoftware_VTMtagsVTM-2.1 (only website).

Han et al. "CE4.1.3: Affine Motion Compensation Prediction," Joint Video Exploration Team (JVET) of ITU-T SG 16 WP3 and ISO/IEC JTC 1/SC 29/WG 11, 11th Meeting: Ljubljana, SI,. Jul. 10-18, 2018,document JVET-K0337, 2018.

Huang et al. "CE4.2.5: Simplification of Affine Merge List Construction and Move ATMVP to Affine Merge List," Joint Video Experts Team (JVET) of ITU-T SG 16 WP 3 and ISO/IEC 1/SC 29/WG 11, 12th Meeting, Macao, CN, Oct. 3-12, 2018, document JVET-L0278, 2018.

Information Technology—High efficiency coding and media delivery in heterogeneous environments—Part 2: "High Efficiency Video Coding" ISO/IEC JTC 1/SC 29/WG 11 N 17661, ISO/IEC DIS 23008-2_201x(4th Ed.) (Apr. 2018).

(56) References Cited

OTHER PUBLICATIONS

Kumakura et al. Non-CE3: Simplified Context Derivation for Significance Map, Joint Collaborative Team on Video Coding (JCT-VC) of ITU-T SG 16 WP 3 and ISO/IEC JTC 1/SC 29/WG 11, 9th Meeting, Geneva, CH, Apr. 27-May 7, 2012, document JCTVC-I0296, 2012.

Li et al. "An Efficient Four-Parameter Affine Motion Model for Video Coding," IEEE Transactions on Circuits and Systems for Video Technology, Aug. 2018, 28(8):1934-1948.

Liao et al. "CE10:Triangular Prediction Unit Mode (CE10.3.1 and CE10.3.2)," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K1044, 2018.

Liao et al. "CE10.3.1.b:Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124 v1and v2, 2018.

Lin et al. "Adaptive Interpolated Motion-Compensated Prediction with Variable Block Partitioning," Data Compression Conference, 2018, Snowbird, UT, 23-31.

Rosewarne C et al. "High Efficiency Video Coding (HEVC) Test Model 16 (HM16) Improved Encoder Description Update 7," Joint Collaborative Team on Video Coding (JCT-VC) of ITU-T SG.16 WP3 and ISO/IEC JTC1/SC29/WG11, 25th Meeting, Chengdu, CN, Oct. 14-21, 2016, document JCTVC-Y1002, 2016.

Shimizu et al. "Depth-Based Weighted Bi-Prediction for Video Plus Depth Map Coding," 19th IEEE International Conference on Image Processing, 2012, Orlando, FL, 1313-1316.

Su et al. "CE4-Related: Generalized Bi-Prediction Improvements Combined from JVET-L0197 and JVET-L0296," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0646, 2018.

Yang et al. "CE:4 Summary Report on Inter Prediction and Motion Vector Coding," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0024, 2018.

Zhao et al. "CE4-related: Improved Context for Prediction Mode Flag," Joint Video Experts Team (JVET) of ITU-T SG 16 WP 3 and ISO/IEC JTC 1/SC 29/WG 11, 13th Meeting: Marrakech, MA Jan. 9-18, 2019, document JVET-M0502, 2019.

International Search Report and Written Opinion from International Patent Application No. PCT/CN2019/115955 dated Feb. 1, 2020(15 pages).

International Search Report and Written Opinion from International Patent Application No. PCT/CN2019/115958 dated Jan. 19, 2020(11 pages).

International Search Report and Written Opinion from International Patent Application No. PCT/CN2019/115966 dated Feb. 1, 2020(11 pages).

International Search Report and Written Opinion from International Patent Application No. PCT/CN2019/115969 dated Feb. 1, 2020(12 pages).

International Search Report and Written Opinion from International Patent Application No. PCT/CN2019/115972 dated Feb. 19, 2020(12 pages).

International Search Report and Written Opinion from International Patent Application No. PCT/CN2019/129797 dated Feb. 28, 2020(13 pages).

International Search Report and Written Opinion from International Patent Application No. PCT/CN2020/71334 dated Apr. 9, 2020(12 pages).

Non-Final Office Action from U.S. Appl. No. 17/031,125 dated Nov. 27, 2020.

Non-Final Office Action from U.S. Appl. No. 17/071,210 dated Dec. 10, 2020.

Non-Final Office Action from U.S. Appl. No. 17/071,292 dated Dec. 10, 2020.

Final Office Action from U.S. Appl. No. 17/071,210 dated Mar. 17, 2021.

\* cited by examiner

FIG. 16

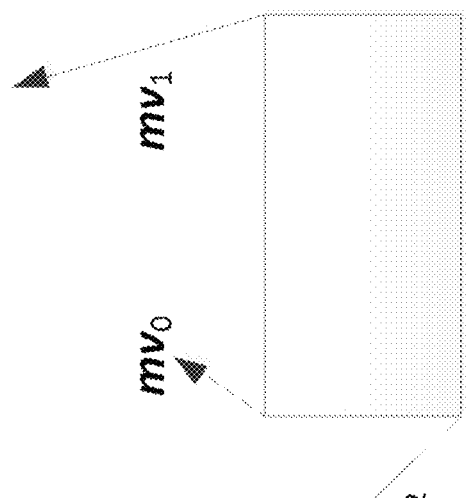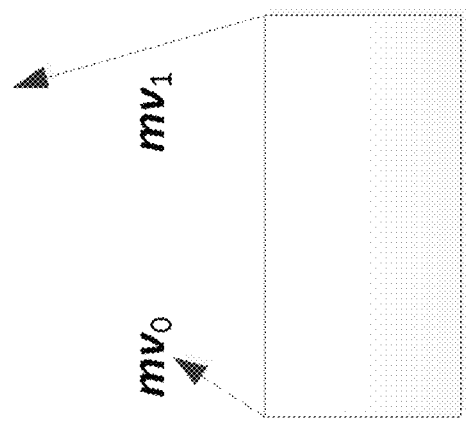
FIG. 22

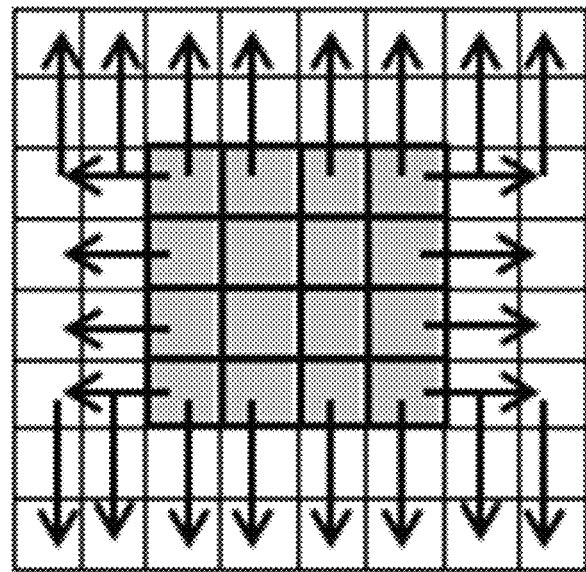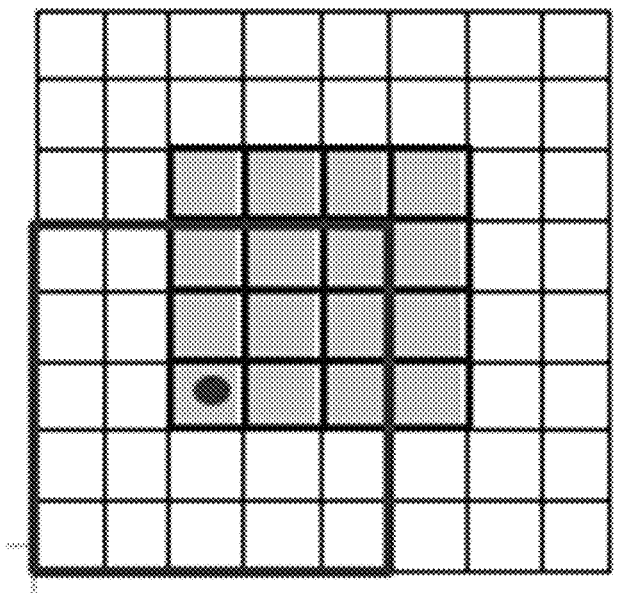
FIG. 27

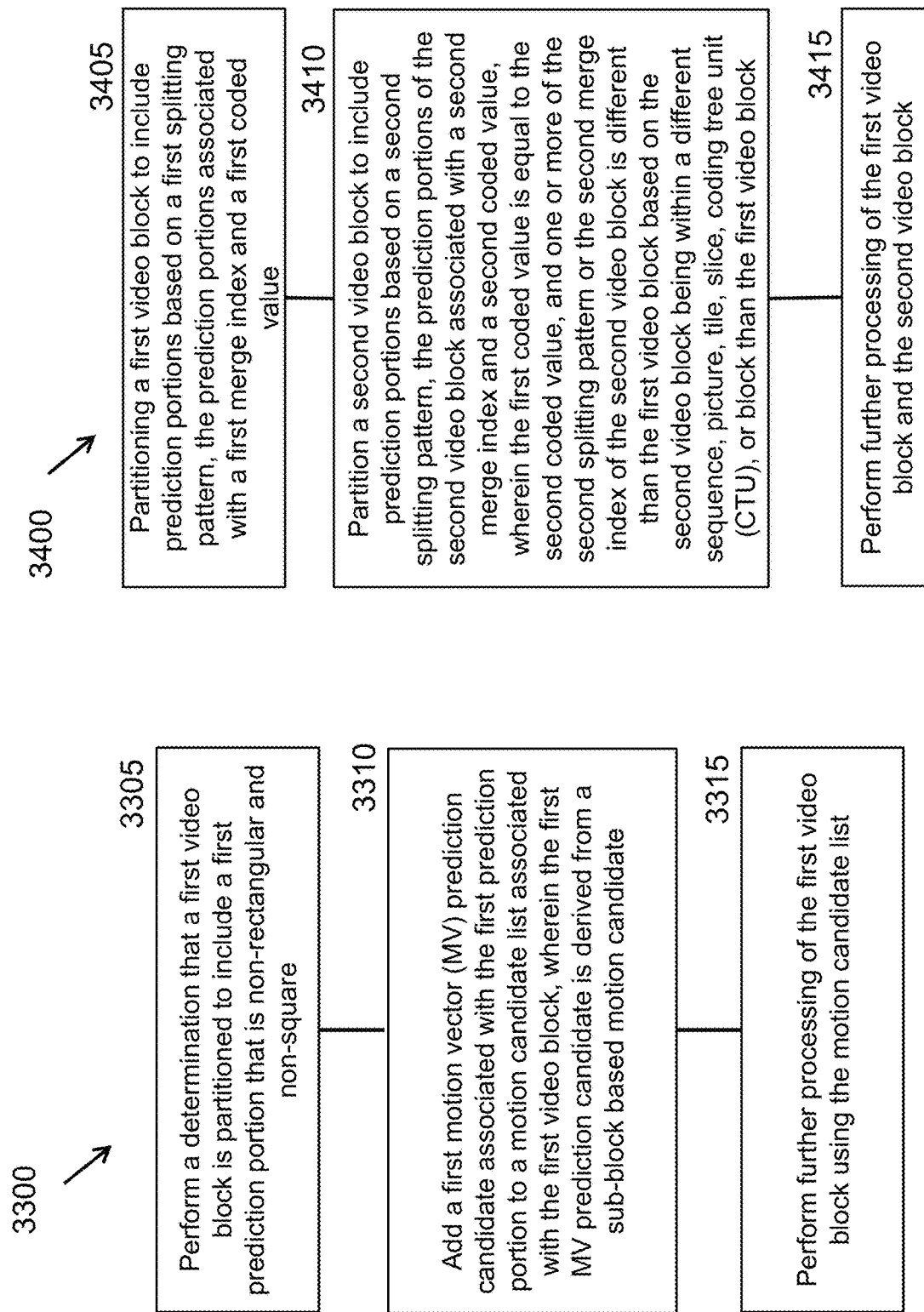

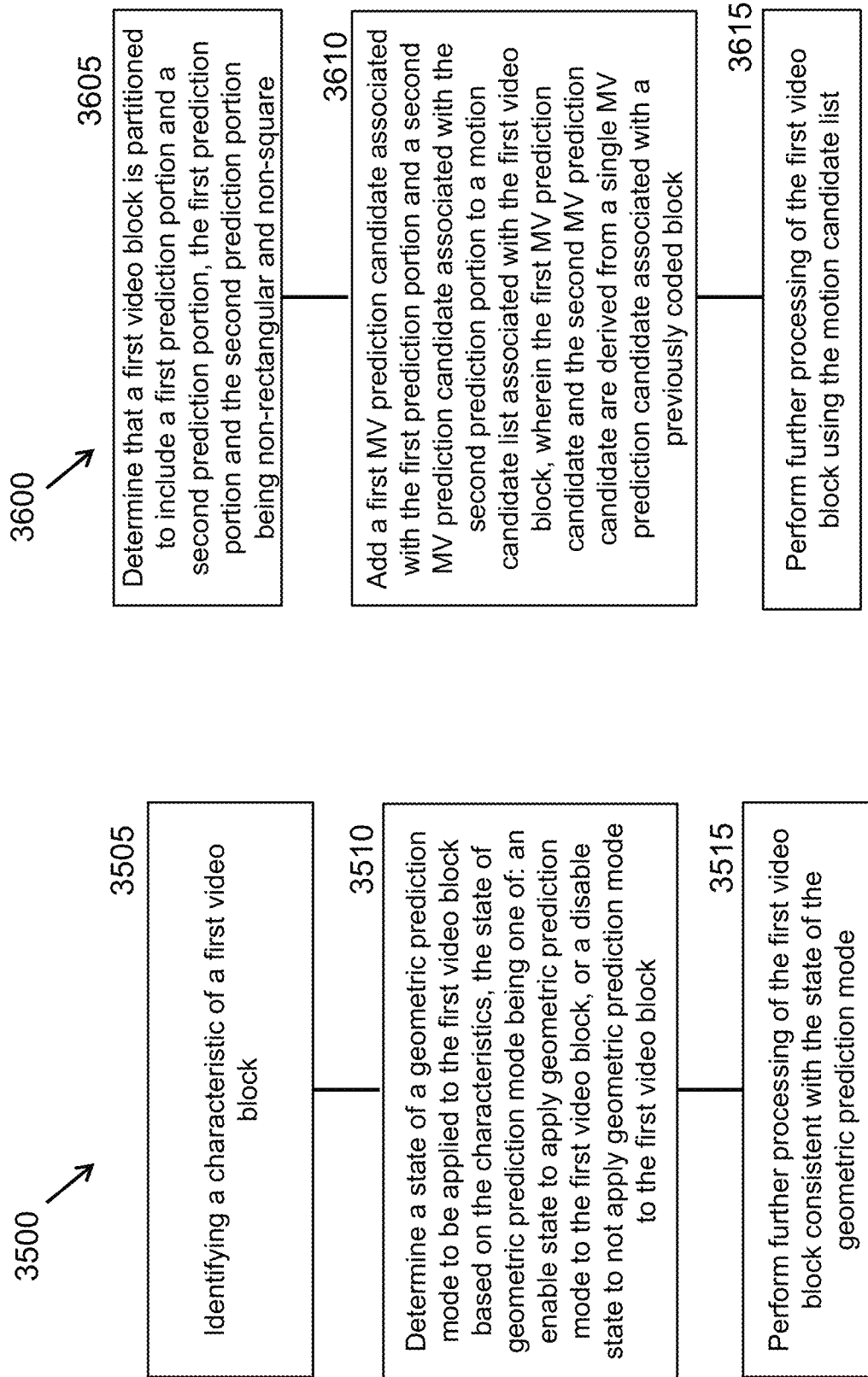

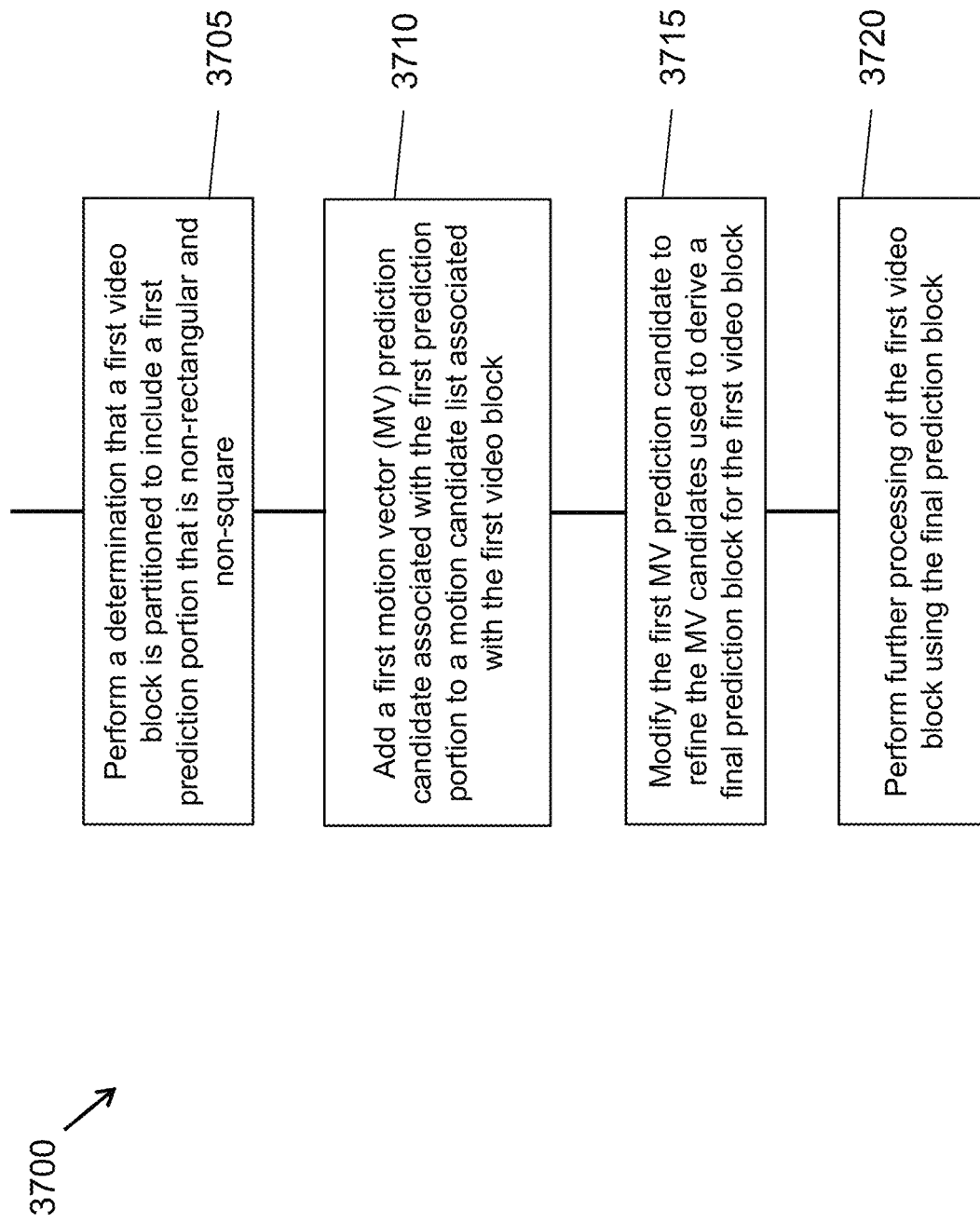

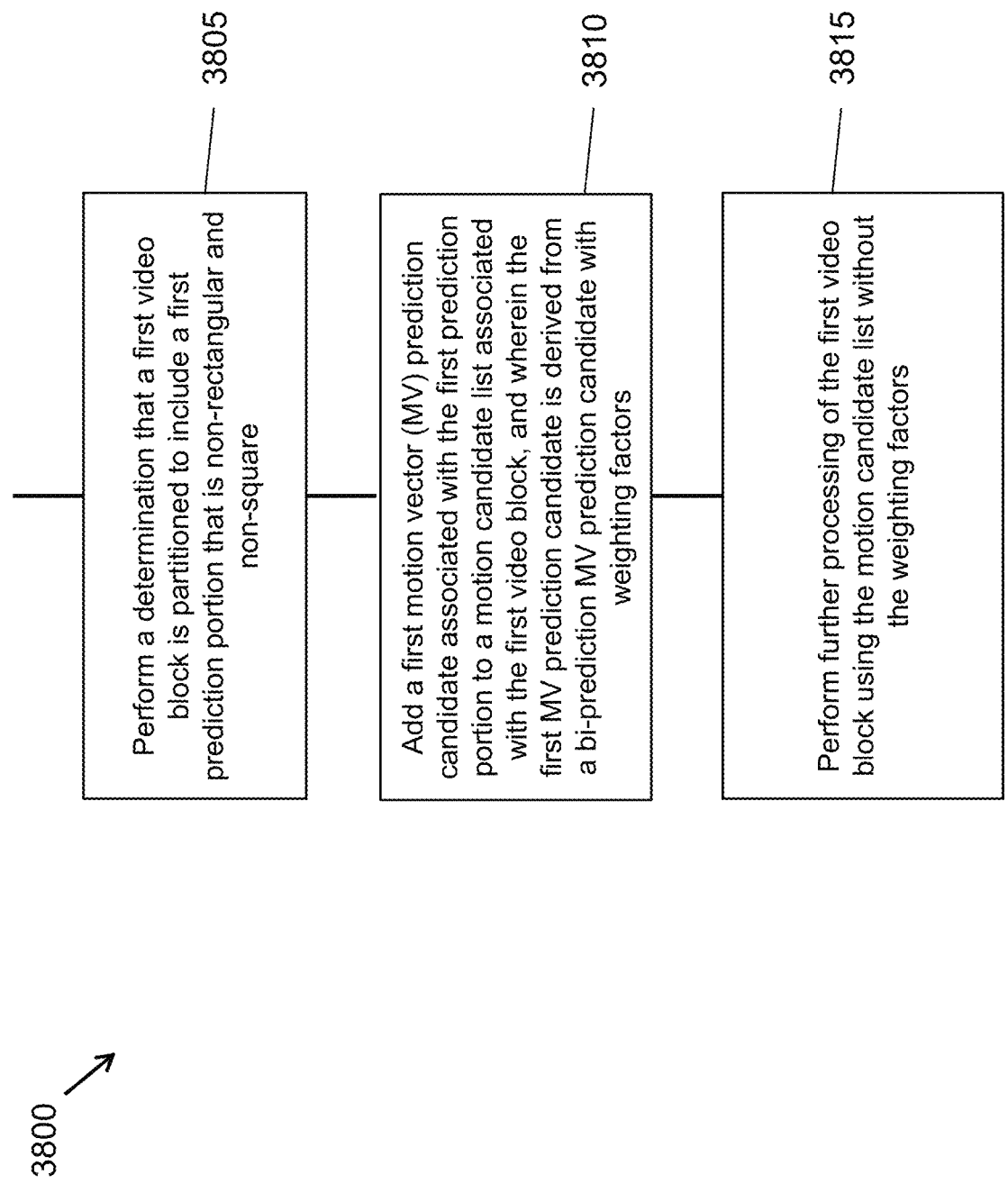

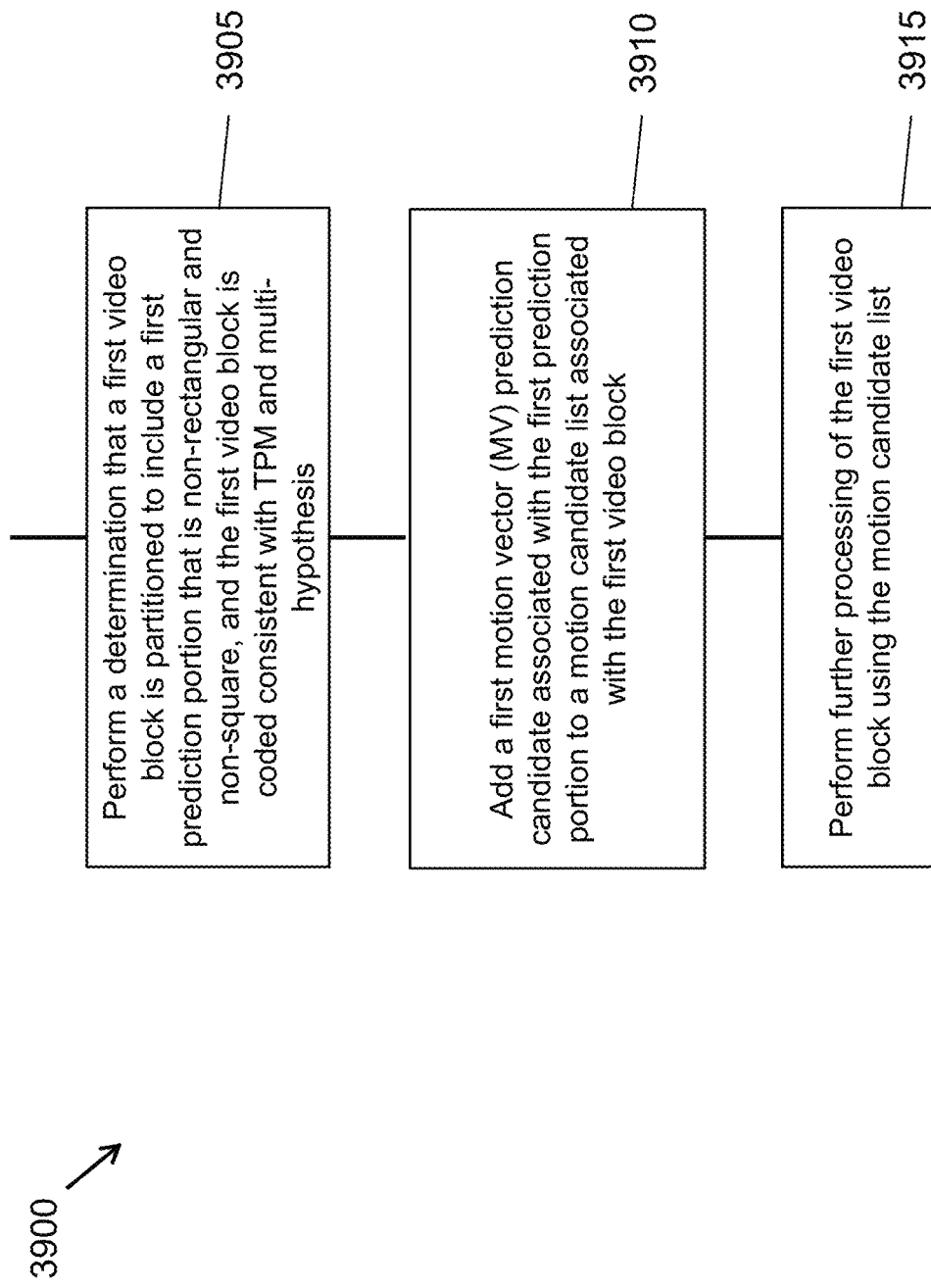

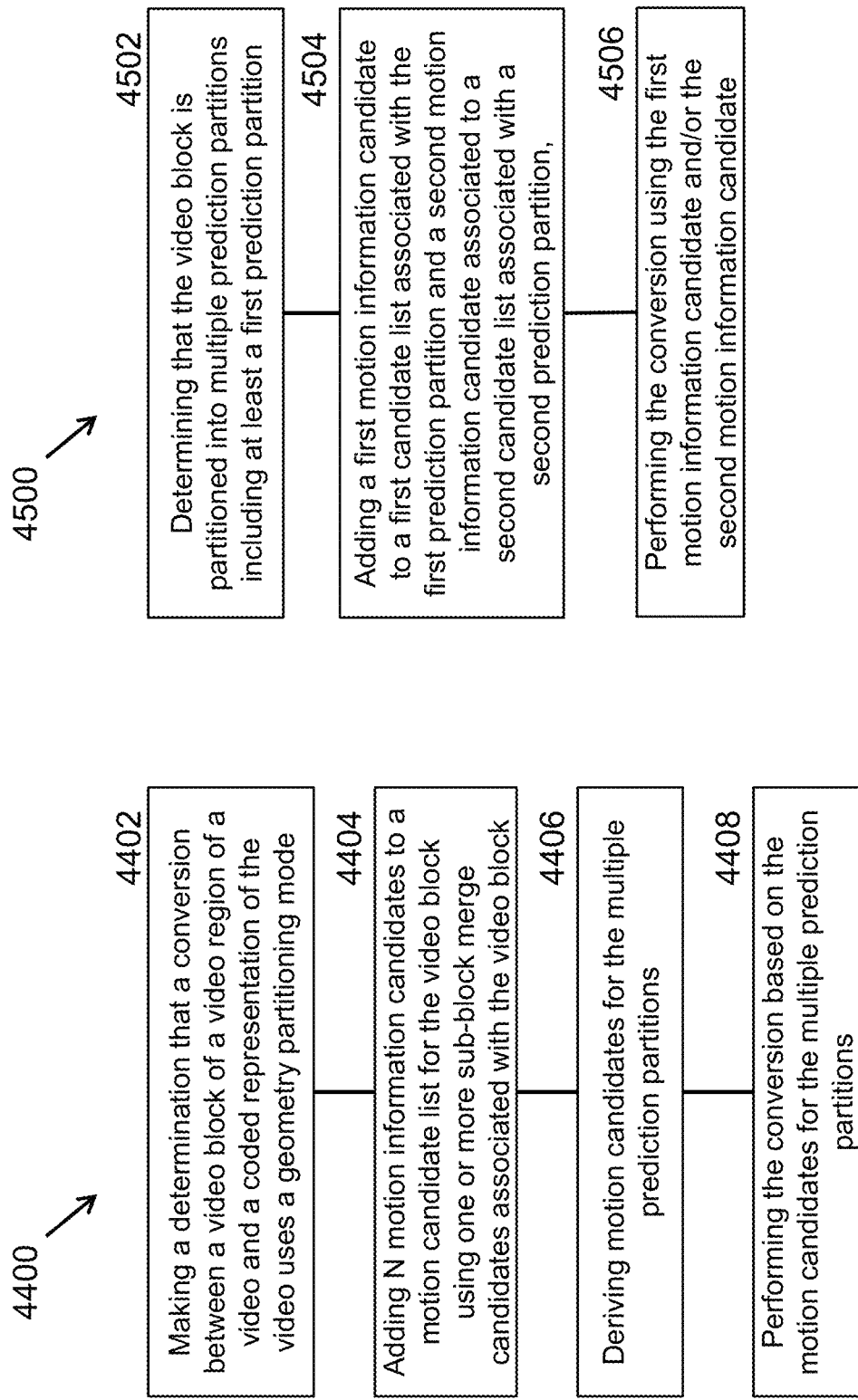

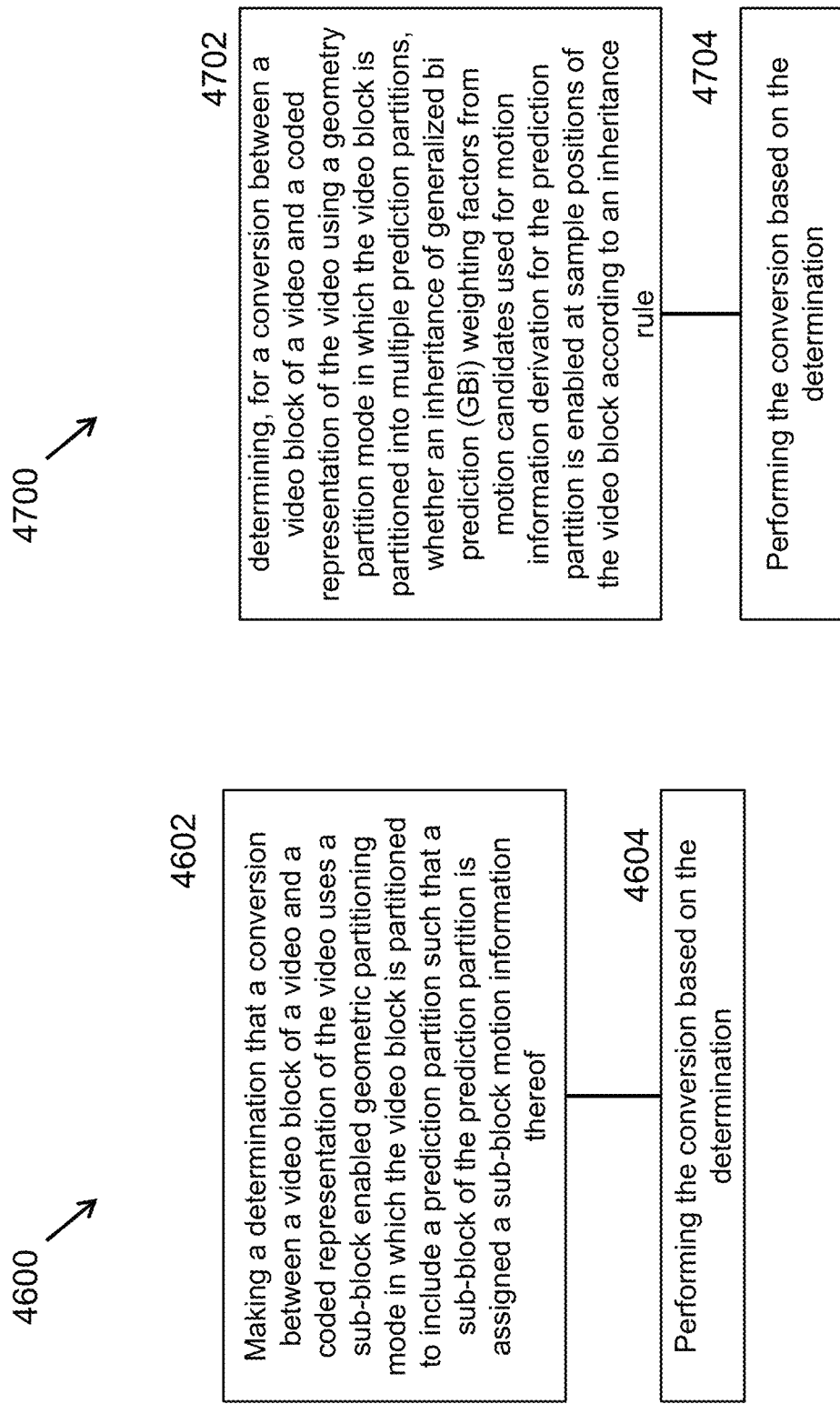

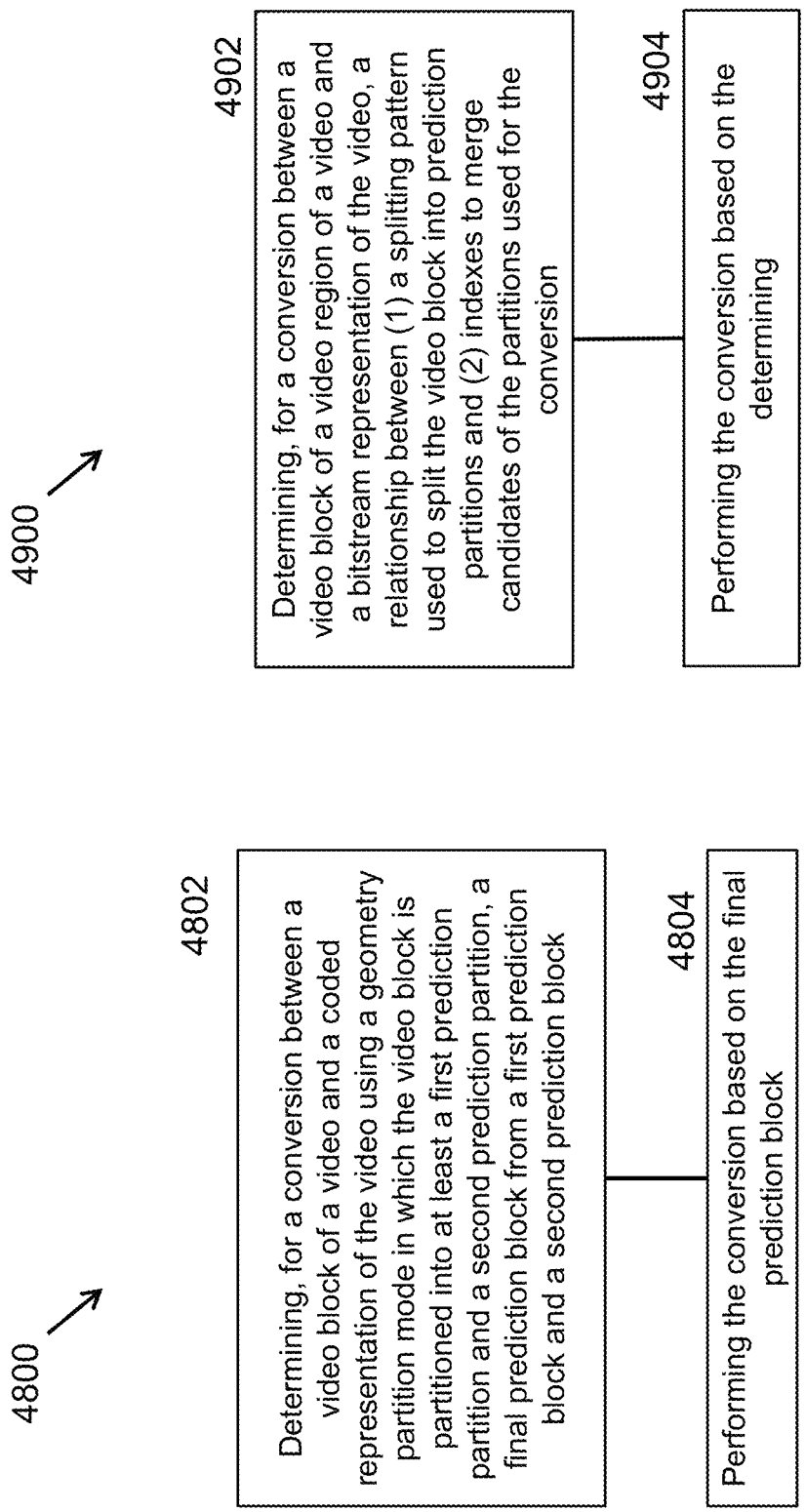

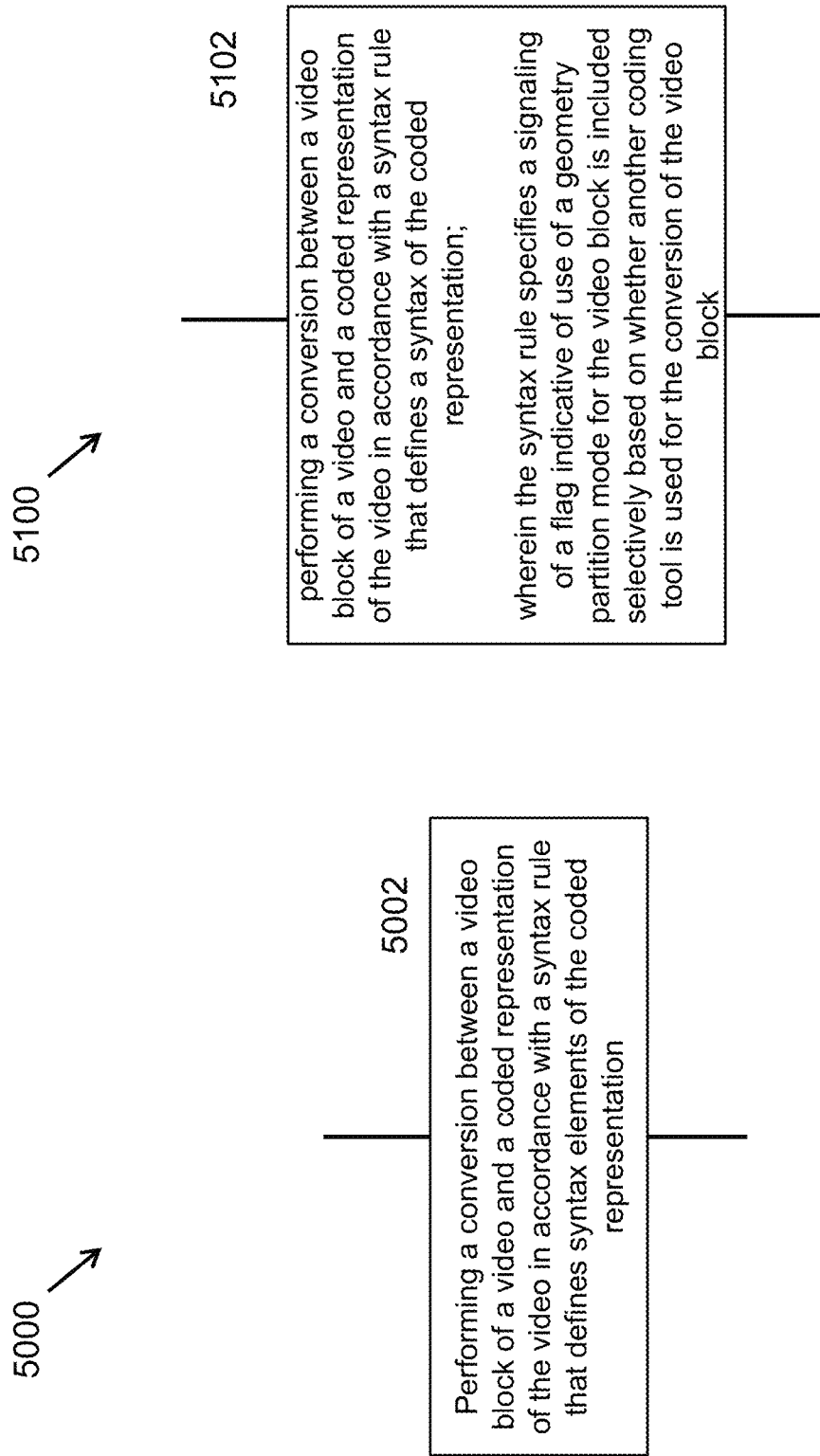

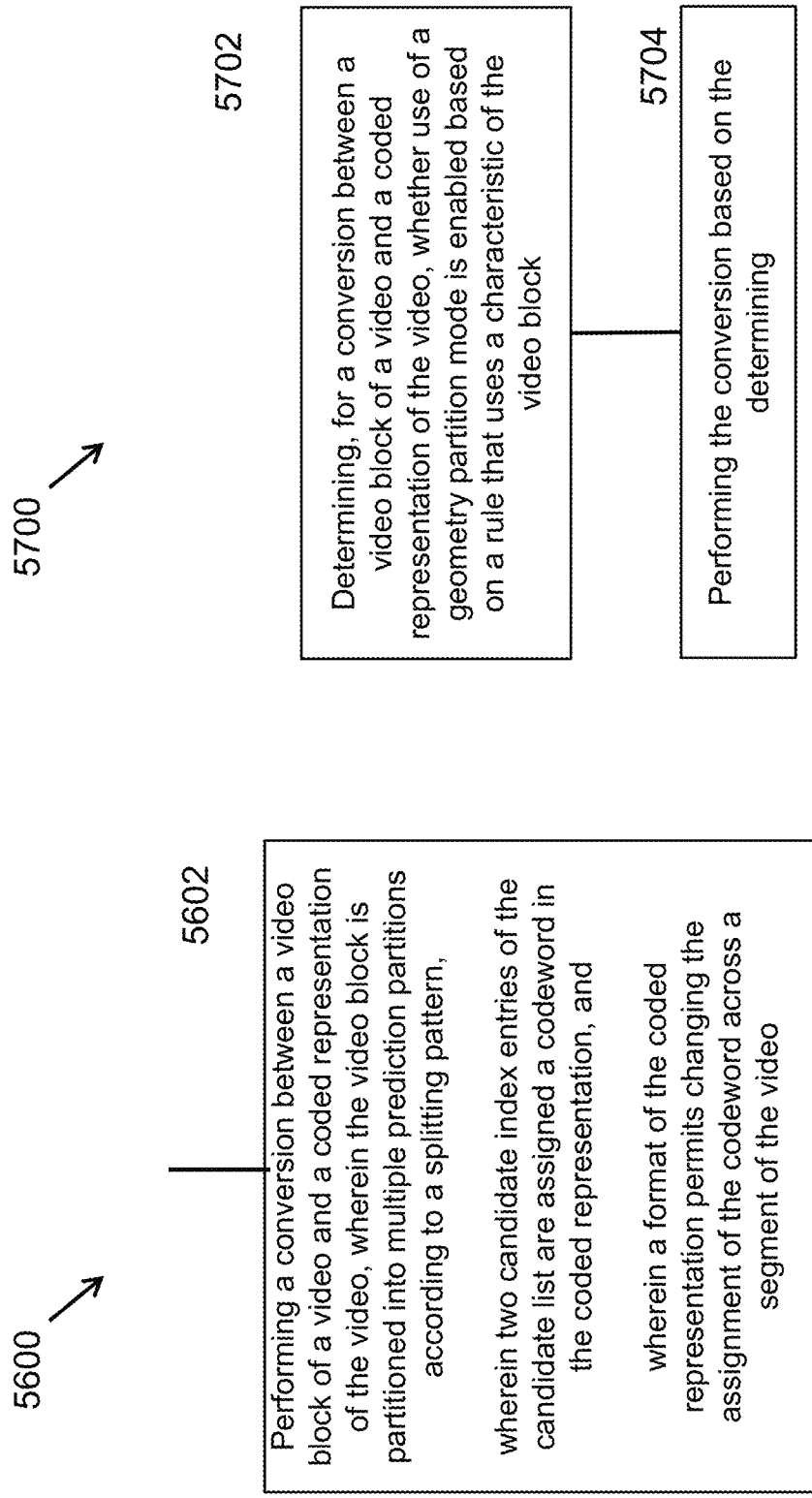

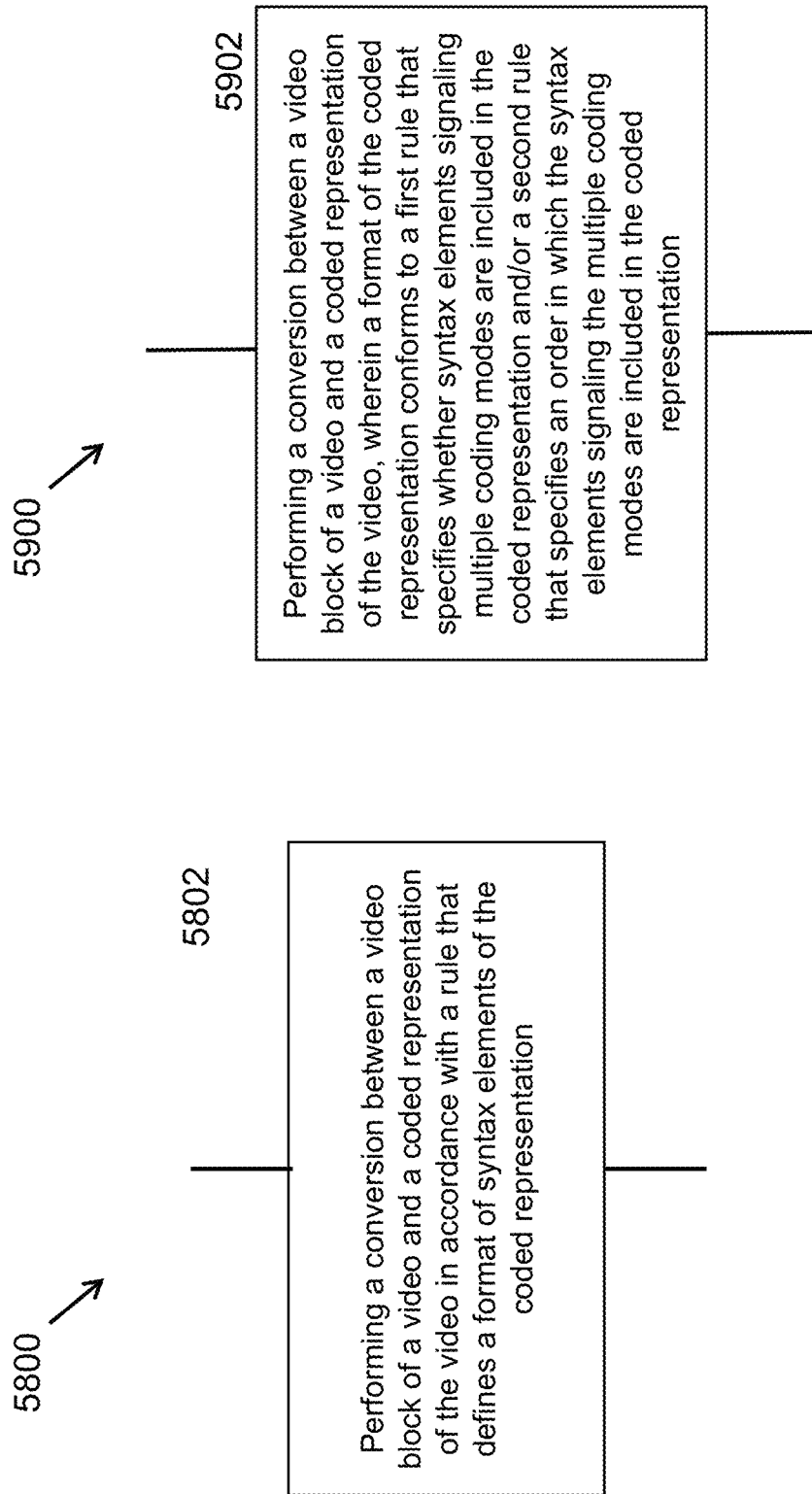

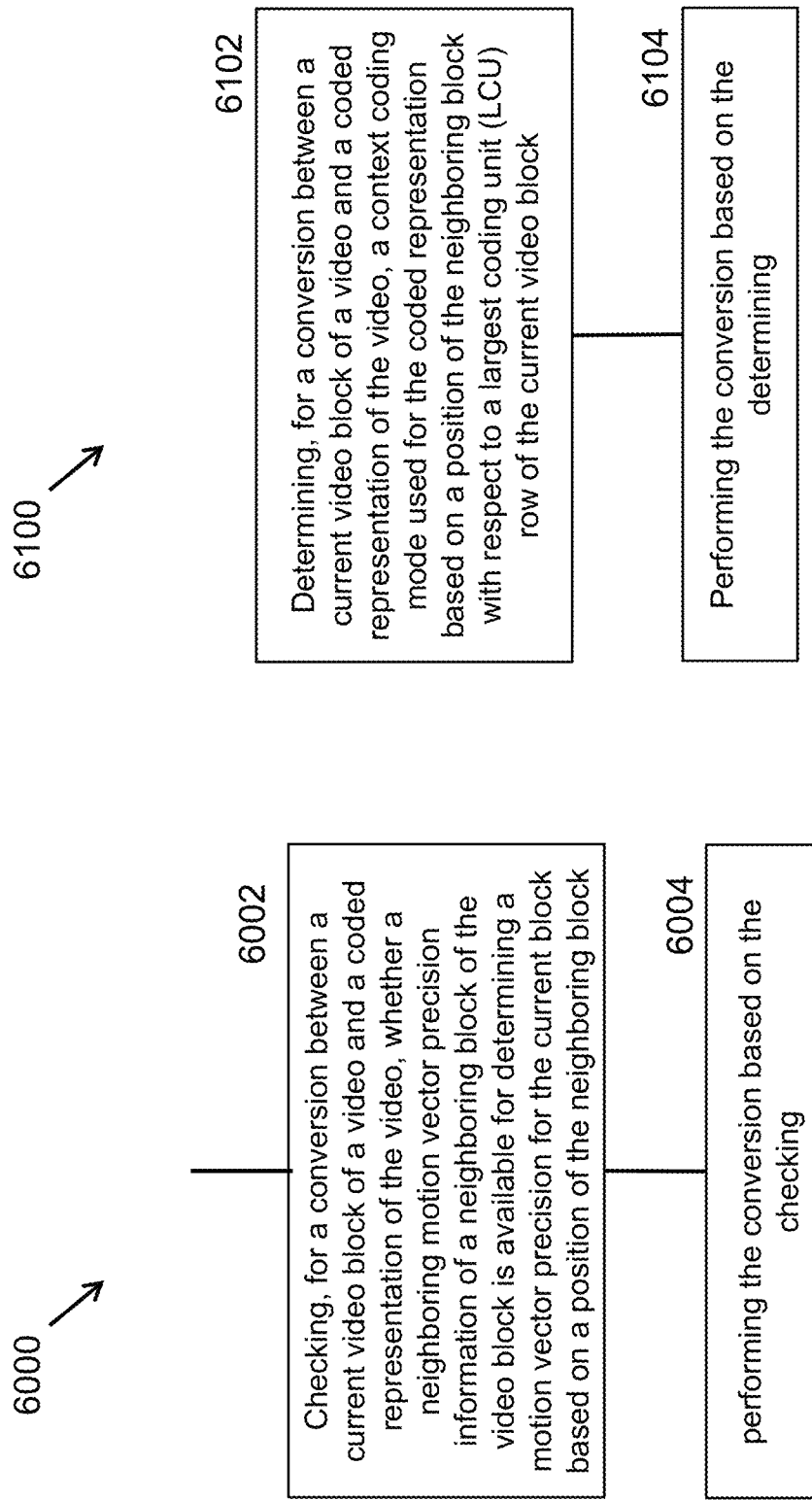

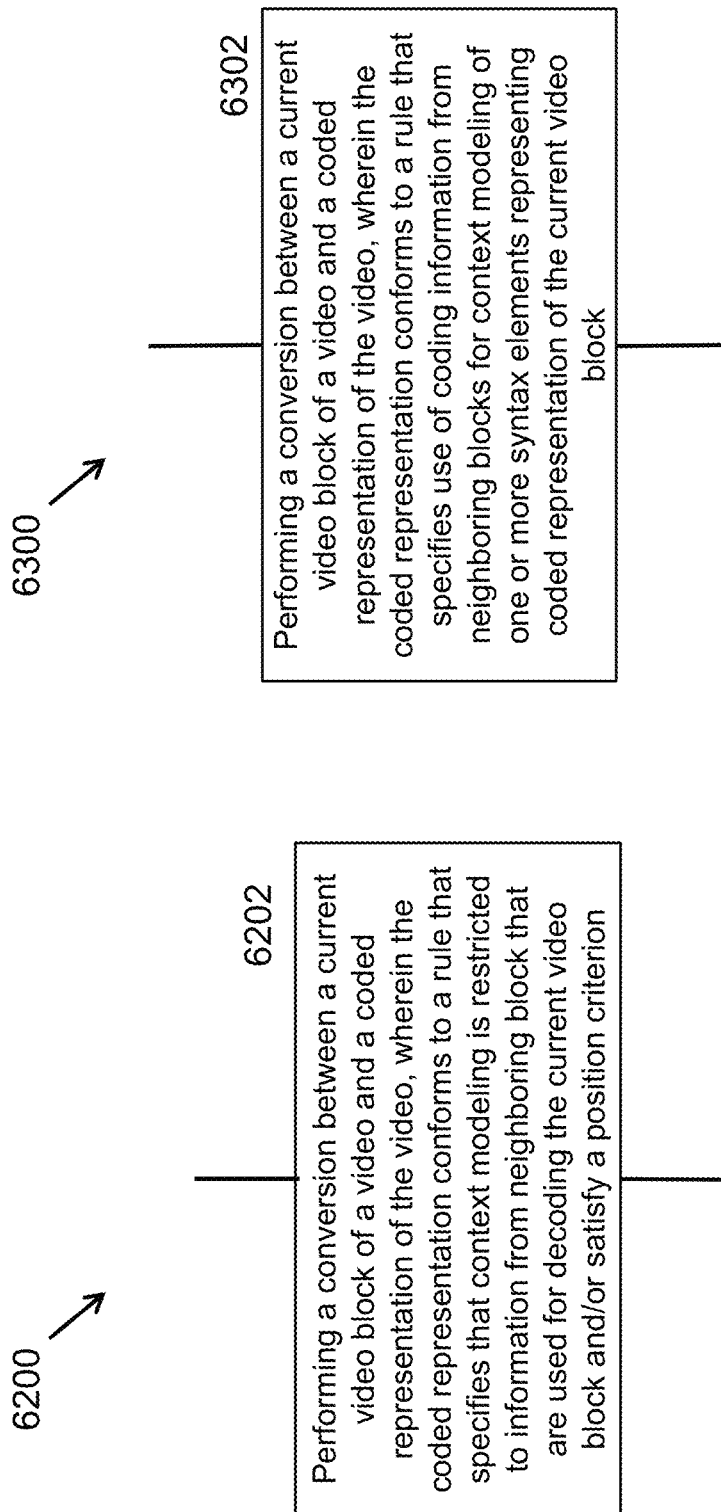

SIDE INFORMATION SIGNALING FOR INTER PREDICTION WITH GEOMETRIC PARTITIONING

CROSS REFERENCE TO RELATED APPLICATIONS

This application is a continuation of International Application No. PCT/CN2019/115969, filed on Nov. 6, 2019, which claims the priority to and benefits of International Patent Application No. PCT/CN2018/114099, filed on Nov. 6, 2018, International Patent Application No. PCT/CN2018/125956, filed on Dec. 30, 2018, International Patent Application No. PCT/CN2019/071160, filed on Jan. 10, 2019, and International Patent Application No. PCT/CN2019/071747, filed on Jan. 15, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for in which geometry partitions may be used for video coding or decoding.

In one example aspect, a method of video processing is disclosed. The method includes making a determination that a conversion between a video block of a video region of a video and a coded representation of the video uses a geometry partitioning mode in which the video block is partitioned into multiple prediction partitions including at least a first prediction partition; adding N motion information candidates to a motion candidate list for the video block using one or more sub-block merge candidates associated with the video block, where N is a positive integer; deriving, from the motion candidate list, motion candidates for the multiple prediction partitions; and performing the conversion based on the motion candidates for the multiple prediction partitions.

In another example aspect, another method of video processing is disclosed. The method includes determining, for a conversion between a video block of a video and a coded representation of the video, that the video block is partitioned into multiple prediction partitions including at least a first prediction partition; adding a first motion information candidate to a first candidate list associated with the first prediction partition and a second motion information candidate associated to a second candidate list associated with a second prediction partition, wherein the first motion information candidate and the second motion information candidate are inherited from a single motion candidate; and performing the conversion using the first motion information candidate and/or the second motion information candidate.

In another example aspect, another method of video processing is disclosed. The method includes making a determination that a conversion between a video block of a video and a coded representation of the video uses a sub-block enabled geometric partitioning mode in which the video block is partitioned to include a prediction partition such that a sub-block of the prediction partition is assigned a sub-block motion information thereof; and performing the conversion based on the determination.

In another example aspect, another method of video processing is disclosed. The method includes determining, for a conversion between a video block of a video and a coded representation of the video using a geometry partition mode in which the video block is partitioned into multiple prediction partitions, whether an inheritance of generalized bi prediction (GBi) weighting factors from motion candidates used for motion information derivation for the prediction partition is enabled at sample positions of the video block according to an inheritance rule; and performing the conversion based on the determining. GBi is also known as Bi-prediction with Coding Unit based Weighting (BCW).

In another example aspect, another method of video processing is disclosed. The method includes determining, for a conversion between a video block of a video and a coded representation of the video using a geometry partition mode in which the video block is partitioned into multiple prediction partitions, whether use of bi-prediction is enabled at least at sample positions of the video block according to a rule; and performing the conversion based on the determining.

In another example aspect, another method of video processing is disclosed. The method includes determining, for a conversion between a video block of a video and a coded representation of the video using a geometry partition mode in which the video block is partitioned into at least a first prediction partition and a second prediction partition, a final prediction block from a first prediction block and a second prediction block from motion information that is different from a first set of motion information derived for sample positions of the first prediction partition, a second set of motion information derived for sample positions of the second prediction partition; and performing the conversion based on the final prediction block; wherein the video block is coded using a multi-hypothesis technique.

In another example aspect, another method of video processing is disclosed. The method includes determining, for a conversion between a video block of a video region of a video and a bitstream representation of the video, a relationship between (1) a splitting pattern used to split the video block into prediction partitions such that at least one prediction partition is a non-rectangular and non-square partition, and (2) indexes to merge candidates of the partitions used for the conversion, and a format of the bitstream representation permits changing the relationship at the video region level; and performing the conversion based on the determining.

In another example aspect, another method of video processing is disclosed. The method includes performing a conversion between a video block of a video and a coded representation of the video in accordance with a syntax rule that defines syntax elements of the coded representation; wherein the syntax rule specifies a signaling order of a first flag indicative of use of a geometry partition mode for the video block and a second flag indicative of use of a merge mode for the video block; wherein the geometry partition mode includes splitting the video block into multiple prediction partitions, at least one prediction partition having a non-rectangular, non-square shape, and wherein the merge mode allows inheriting motion vector information from neighboring blocks of the video block.

In another example aspect, another method of video processing is disclosed. The method includes performing a conversion between a video block of a video and a coded representation of the video in accordance with a syntax rule that defines a syntax of the coded representation; wherein the syntax rule specifies a signaling of a flag indicative of use of a geometry partition mode for the video block is included selectively based on whether another coding tool is used for the conversion of the video block; wherein the geometry partition mode includes splitting the video block into multiple prediction partitions, at least one prediction partition having a non-rectangular, non-square shape.

In another example aspect, another method of video processing is disclosed. The method includes determining that a geometry partition mode is enabled for a conversion between a video block of a video and a coded representation of the video wherein the video block is split into multiple prediction partitions based on a splitting pattern based on a neighboring block's geometry partition mode; and performing the conversion based on the determining.

In another example aspect, another method of video processing is disclosed. The method includes determining a splitting pattern for a conversion between a video block of a video and a coded representation of the video based on a geometry partition mode in which the video block is split into multiple prediction partitions based on the splitting pattern based on a neighboring block's splitting pattern; and performing the conversion based on the determining.

In another example aspect, another method of video processing is disclosed. The method includes performing a conversion between a video block of a video and a coded representation of the video, wherein the video block is partitioned into multiple prediction partitions according to a splitting pattern of a geometry partition mode including a first prediction partition; wherein the coded representation includes multiple syntax elements among which one syntax element corresponds to the splitting pattern and other syntax elements corresponds to merge indices for the multiple prediction partitions.

In another example aspect, another method of video processing is disclosed. The method includes determining that a conversion between a video block of a video and a coded representation of the video is based on a geometry partition mode wherein the video block is partitioned into multiple prediction partitions according to a splitting pattern including a first prediction partition; and performing the conversion based on the determining; wherein the geometry partition mode for the video block is signaled in the coded representation using a context-based coding in which the context depends on a coding condition of the video block.

In another example aspect, another method of video processing is disclosed. The method includes performing a conversion between a video block of a video and a coded representation of the video, wherein the video block is partitioned using a geometry prediction mode into multiple prediction partitions according to a splitting pattern having a first prediction partition; wherein two candidate index entries of the candidate list are assigned a codeword in the coded representation, and wherein a format of the coded representation permits changing the assignment of the codeword across a segment of the video.

In another example aspect, another method of video processing is disclosed. The method includes determining, for a conversion between a video block of a video and a coded representation of the video, whether use of a geometry partition mode is enabled based on a rule that uses a characteristic of the video block; and performing the conversion according to the determining, wherein, the geometry partition mode partitions the video block into multiple prediction partitions.

In another example aspect, another method of video processing is disclosed. The method includes performing a conversion between a video block of a video and a coded representation of the video in accordance with a rule that defines a format of syntax elements of the coded representation; wherein the rule specifies whether indication of use of a first coding mode is signaled or whether to signal the indication is based on use of a second coding mode for the video block; wherein the second coding mode is a merge mode; wherein the merge mode enables inheriting motion information from a merge candidate in a merge candidate list without a motion vector difference for whole of the video block.

In another example aspect, another method of video processing is disclosed. The method includes performing a conversion between a video block of a video and a coded representation of the video, wherein a format of the coded representation conforms to a first rule that specifies whether syntax elements signaling multiple coding modes are included in the coded representation and/or a second rule that specifies an order in which the syntax elements signaling the multiple coding modes are included in the coded representation; wherein the multiple coding modes include two or more of a geometry partition mode, an inter-intra (MHIntra) mode, a sub-block merge mode or a merge with motion vector differencing (MMVD) mode; wherein, in the inter-intra coding mode, a prediction block of the video block is derived from an intra prediction signal and an inter prediction signal; wherein, in the sub-block merge mode, the conversion uses derived motion information for each sub-block within the block; wherein, in the MMVD mode, a combined merge and motion vector differencing (MVD) coding mode is used; and wherein the merge mode enables inheriting motion information from a merge candidate in a merge candidate list without MVD for whole of the video block.

In another example aspect, another method of video processing is disclosed. The method includes checking, for a conversion between a current video block of a video and a coded representation of the video, whether a neighboring motion vector precision information of a neighboring block of the video block is available for determining a motion vector precision for the current block based on a position of the neighboring block; and performing the conversion based on the checking.

In another example aspect, another method of video processing is disclosed. The method includes determining, for a conversion between a current video block of a video and a coded representation of the video, a context coding mode used for the coded representation based on a position of the neighboring block with respect to a largest coding unit (LCU) row of the current video block; and performing the conversion based on the determining.

In another example aspect, another method of video processing is disclosed. The method includes performing a conversion between a current video block of a video and a coded representation of the video, wherein the coded representation conforms to a rule that specifies that context modeling is restricted to information from neighboring block that are used for decoding the current video block and/or satisfy a position criterion.

In another example aspect, another method of video processing is disclosed. The method includes performing a conversion between a current video block of a video and a coded representation of the video, wherein the coded representation conforms to a rule that specifies use of coding information from neighboring blocks for context modeling of one or more syntax elements representing coded representation of the current video block.

In another example aspect, a method of processing video is disclosed. The method includes performing a determination, by a processor, that a first video block is partitioned to include a first prediction portion that is non-rectangular and non-square; adding a first motion vector (MV) prediction candidate associated with the first prediction portion to a motion candidate list associated with the first video block, wherein the first MV prediction candidate is derived from a sub-block based motion candidate; and performing further processing of the first video block using the motion candidate list.

In another example aspect, a method of processing video includes partitioning a first video block to include a first prediction portion based on a first splitting pattern, the prediction first portion associated with a first merge index and a first coded value; partitioning a second video block to include a second prediction portion based on a second splitting pattern, the prediction second portion of the second video block associated with a second merge index and a second coded value, wherein the first coded value is equal to the second coded value, and one or more of the second splitting pattern, second merge index, the second video block is different than the first video block based on the second video block being within a different sequence, picture, tile, slice, coding tree unit (CTU), or block than the first video block; and performing further processing of the first video block and the second video block.

In another example aspect, a method of processing video includes identifying, by a processor, a characteristic of a first video block; determining a state of a geometric prediction mode to be applied to the first video block based on the characteristics, the state of geometric prediction mode being one of: an enable state to apply geometric prediction mode to the first video block, or a disable state to not apply geometric prediction mode to the first video block; and performing further processing of the first video block consistent with the state of the geometric prediction mode.

In another example aspect, a method of processing video includes performing a determination, by a processor, that a first video block is partitioned to include a first prediction portion and a second prediction portion, the first prediction portion and the second prediction portion being non-rectangular and non-square; adding a first MV prediction candidate associated with the first prediction portion and a second MV prediction candidate associated with the second prediction portion to a motion candidate list associated with the first video block, wherein the first MV prediction candidate and the second MV prediction candidate are derived from a single MV prediction candidate associated with a previously coded block; and performing further processing of the first video block using the motion candidate list.

In another example aspect, a method of processing video includes performing a determination, by a processor, that a first video block is partitioned to include a first prediction portion that is non-rectangular and non-square; adding a first motion vector (MV) prediction candidate associated with the first prediction portion to a motion candidate list associated with the first video block; modifying the first MV prediction candidate to refine the MV candidates used to derive a final prediction block for the first video block; and performing further processing of the first video block using the final prediction block.

In another example aspect, a method of processing video includes performing a determination, by a processor, that a first video block is partitioned to include a first prediction portion that is non-rectangular and non-square; adding a first motion vector (MV) prediction candidate associated with the first prediction portion to a motion candidate list associated with the first video block, and wherein the first MV prediction candidate is derived from a bi-prediction MV prediction candidate with weighting factors; and performing further processing of the first video block using the motion candidate list without the weighting factors.

In another example aspect, a method of processing video includes performing a determination, by a processor, that a first video block is partitioned to include a first prediction portion that is non-rectangular and non-square, and the first video block is coded consistent with multi-hypothesis.

In another example aspect, a method of processing video includes performing a determination, by a processor, that a first video block is partitioned to include a first prediction portion that is non-rectangular and non-square, and wherein overlapped block motion compensation (OBMC) is not applied.

In another example aspect, a method of processing video includes performing a determination, by a processor, that a first video block is partitioned to include more than 2 prediction portions. In one example, the first video block is partitioned to a first prediction portion, a second prediction portion, a third prediction portion, and a fourth prediction portion that are each non-rectangular and non-square; and perform further processing of the first video block using the first prediction portion, the second prediction portion, the third prediction portion, and the fourth prediction portion.

In another example aspect, a method of video processing is disclosed. The method includes performing a conversion between a video block and a bitstream representation of the video block consistent with a coding rule that specifies that a skip/merge mode of coding is treated separately from a second coding mode, wherein the second coding mode is a triangular partition mode or a MHIntra (sometimes also called combined inter-intra mode, or CIIP) mode or a sub-block merge list mode.

In another example aspect, another method of video processing is disclosed. The method includes performing a conversion between a video block and a bitstream representation of the video block consistent with a rule that specifies a specific order of indication of usage of a plurality of sub-block coding tools in the conversion, wherein the specific order is one of: (a.) merge with motion vector difference (MMVD) followed by sub-block merge list followed by triangular partition mode TPM, followed by MHIntra, or (b.) MMVD followed by sub-block merge list followed by MHIntra followed by TPM.

In yet another example aspect, another method of video processing is disclosed. The method includes performing a conversion between a video block and a bitstream representation of the current video block consistent with a rule of coding wherein the rule specifies a selective use of a neighboring block for specifying a motion vector prediction in an adaptive motion vector resolution (AMVR) coding mode of the video block, wherein the rule includes: (1) excluding the neigh block that is in a different largest coding unit (LCU) row or (2) specifies a fixed resolution value or (3) in case that the video block is coded using affine mode, making unavailable an affine-coded neighboring block that is in a different LCU row.

In yet another example aspect, another method of video processing is disclosed. The method includes performing a conversion between a video block and a bitstream representation of the current video block consistent with a rule of coding wherein the rule specifies a selective use of a neighboring block for specifying a motion vector prediction in an adaptive motion vector resolution (AMVR) coding mode of the video block, wherein the rule includes selective use of a neighboring block as: (a) disabling using the neighboring video block's information for context modeling of the video block in case that the neighboring block is in a different largest coding unit (LCU) row or (b) using only one context for coding a syntax element during the conversion or (c) applying bypass coding is applied to the only one syntax element.

In yet another example aspect, another method of video processing is disclosed. The method includes performing a conversion between a video block and a bitstream representation of the current video block consistent with a rule of coding wherein the rule specifies a selective use of neighboring video blocks for specifying a motion vector prediction in an adaptive motion vector resolution (AMVR) coding mode of the video block, wherein the rule includes that information regarding the neighboring video blocks are used for context modeling based on the neighboring video blocks being used to decode the current video block.

In yet another example aspect, another method of video processing is disclosed. The method includes performing a conversion between a video block and a bitstream representation of the current video block consistent with a rule of coding wherein the rule specifies a selective use of neighboring video blocks for specifying a motion vector prediction in an adaptive motion vector resolution (AMVR) coding mode of the video block, wherein the rule includes that information regarding the neighboring video blocks are used for context modeling based on the neighboring video blocks being used to decode the current video block, the neighboring video blocks being used excluding video blocks within a different CTU row than a current CTU row, or within a different CTU than a current CTU.

In another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 16 shows an example of motion vector storage.

FIG. 22 shows an example of 4-parameter affine model (a) and 6-parameter affine model (b).

FIG. 27 shows an example of BIO w/o block extension: a) access positions outside of the block; b) padding issued in order to avoid extra memory access and calculation.

FIGS. 33 to 41 show flowcharts for examples of video processing methods.

FIGS. 44 to 63 show flowcharts for examples of video processing methods.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. SUMMARY

This patent document is related to video coding technologies. Specifically, it is related to motion vector coding under geometry partition in video coding. It may be applied to the existing video coding standard like HEVC, or the standard (Versatile Video Coding) to be finalized. It may be also applicable to future video coding standards or video codec.

2. DISCUSSION

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC [1] standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

Figure 32:
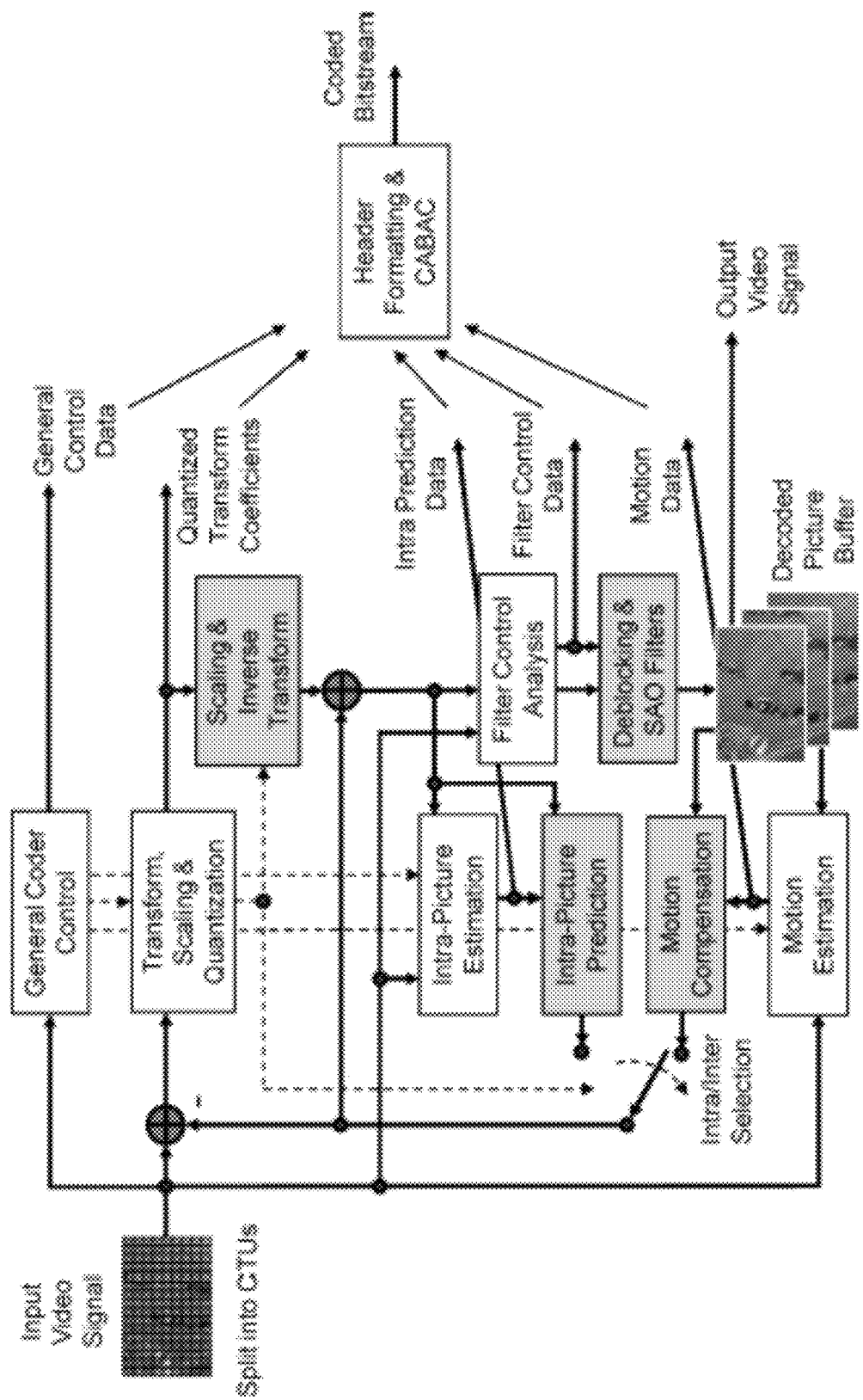
FIG. 32 shows a block diagram of an example implementation of a video encoder.

FIG. 32 is a block diagram of an example implementation of a video encoder. FIG. 32 shows that the encoder implementation has a feedback path built in in which the video encoder also performs video decoding functionality (reconstructing compressed representation of video data for use in encoding of next video data).

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1. Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode 2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

Figure 1:
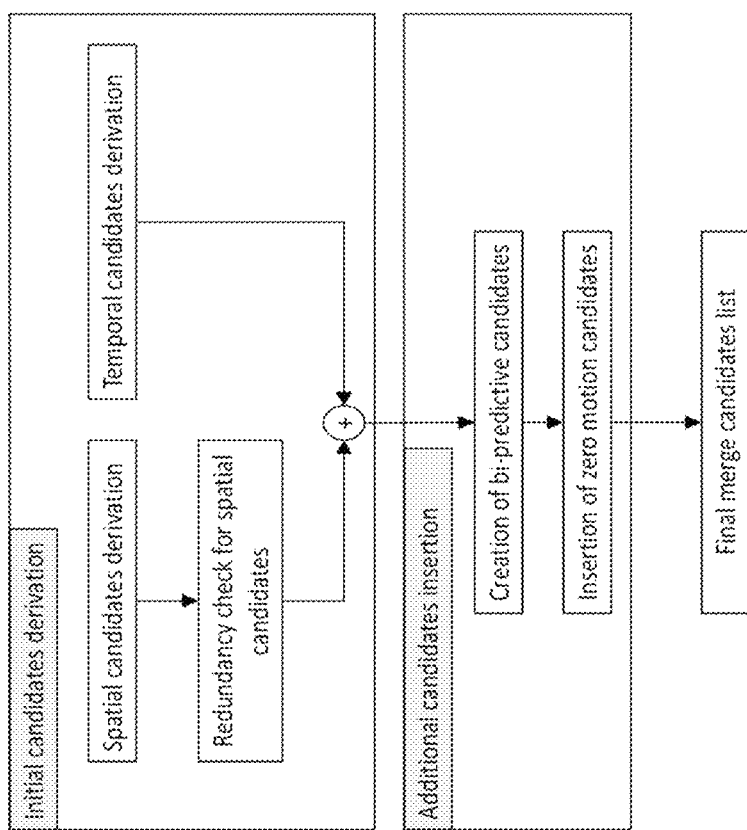
FIG. 1 shows an example of a derivation process for merge candidates list construction.

FIG. 1 shows an example of a derivation process for merge candidates list construction.

2.1.2.2. Spatial Candidates Derivation

Figure 3:
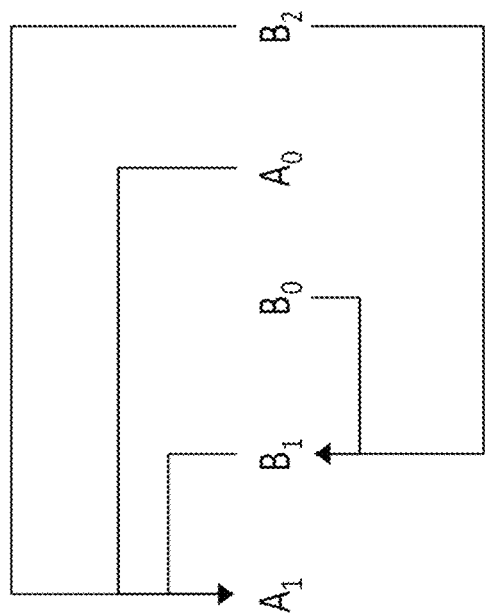
FIG. 3 shows an example of candidate pairs considered for redundancy check of spatial merge candidates.
Figure 2:
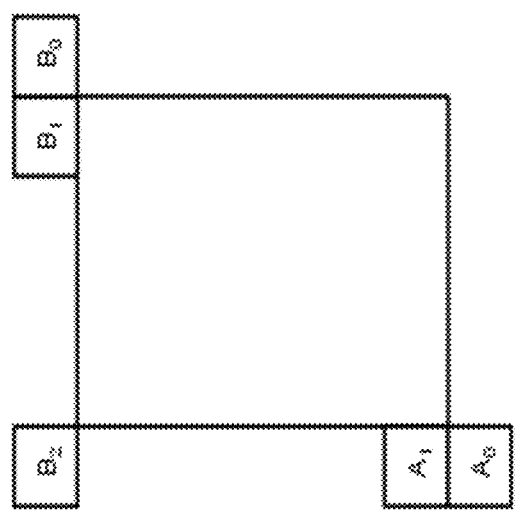
FIG. 2 shows an example of positions of spatial merge candidates.
Figure 4:
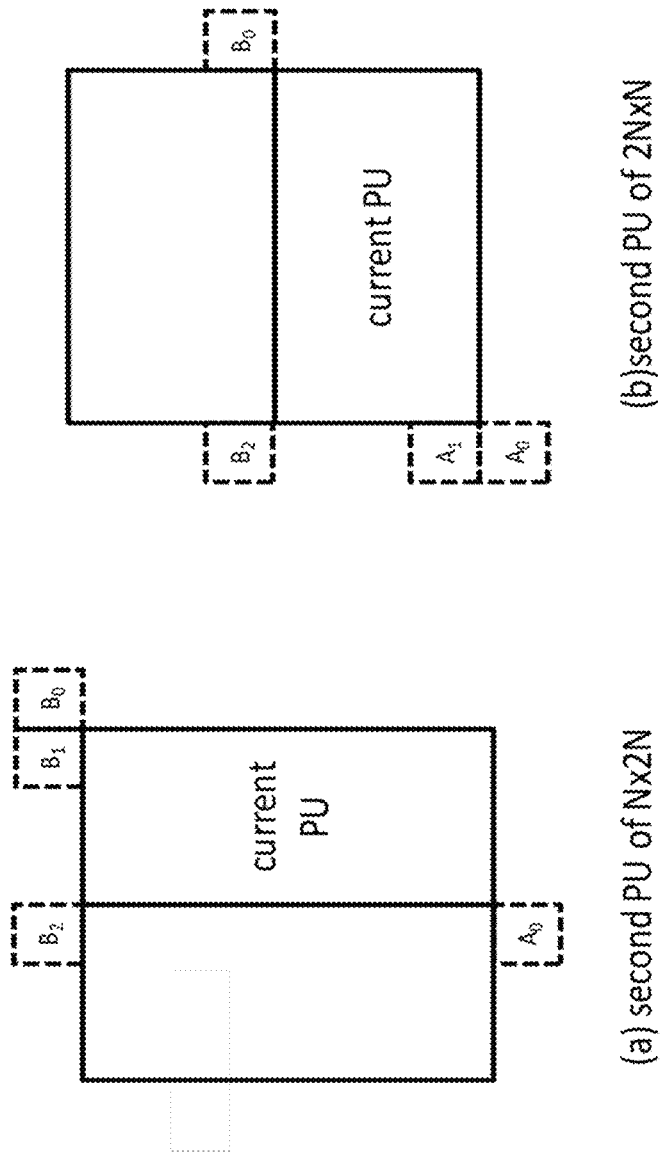
FIG. 4 shows an example of positions for the second PU of N×2N and 2N×N partitions.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

FIG. 2 shows an example of positions of spatial merge candidates.

FIG. 3 shows an example of candidate pairs considered for redundancy check of spatial merge candidates.

FIG. 4 shows an example of positions for the second PU of N×2N and 2N×N partitions.

2.1.2.3. Temporal Candidates Derivations

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 5:
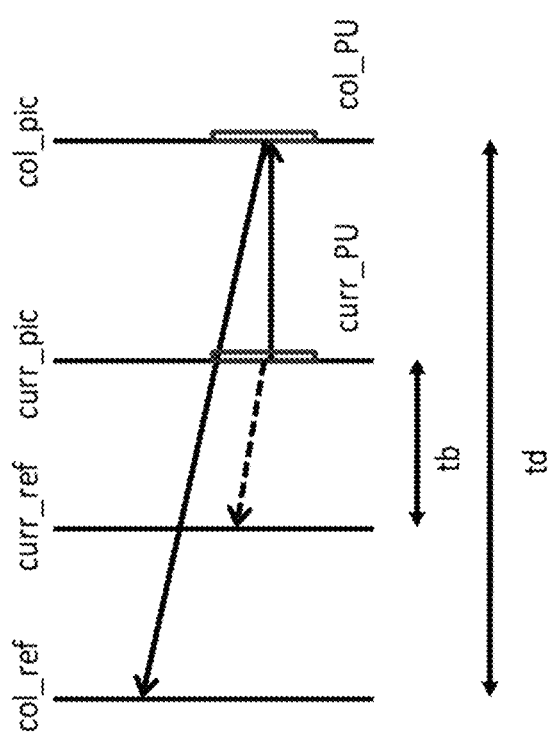
FIG. 5 shows an example of motion vector scaling for a temporal merge candidate.

FIG. 5 shows an example of motion vector scaling for temporal merge candidate.

Figure 6:
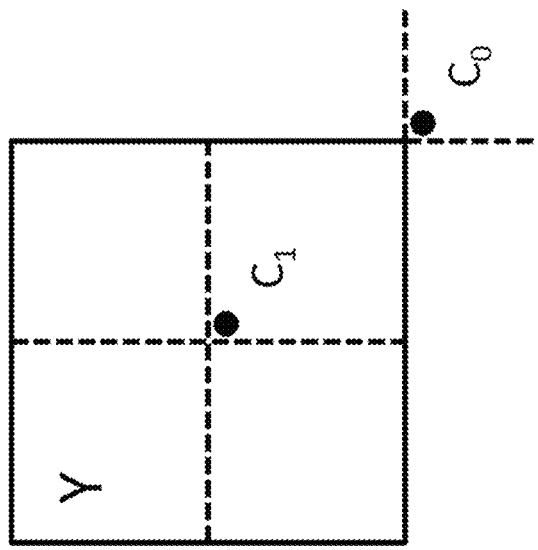
FIG. 6 shows an example of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU row, position $C_1$ is used. Otherwise, position $C_0$ is used in the derivation of the temporal merge candidate.

FIG. 6 shows an example of candidate positions for temporal merge candidate, C0 and C1.

2.1.2.4. Additional Candidates Insertion

Figure 7:
FIG. 7 shows an example of a combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

FIG. 7 shows an example of combined bi-predictive merge candidate.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.1.2.5. Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log 2_parallel_merge_level_minus2" syntax element [1]. When a MER is defined, merge candidates falling in the same region are marked as unavailable and therefore not considered in the list construction.

2.1.3. AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
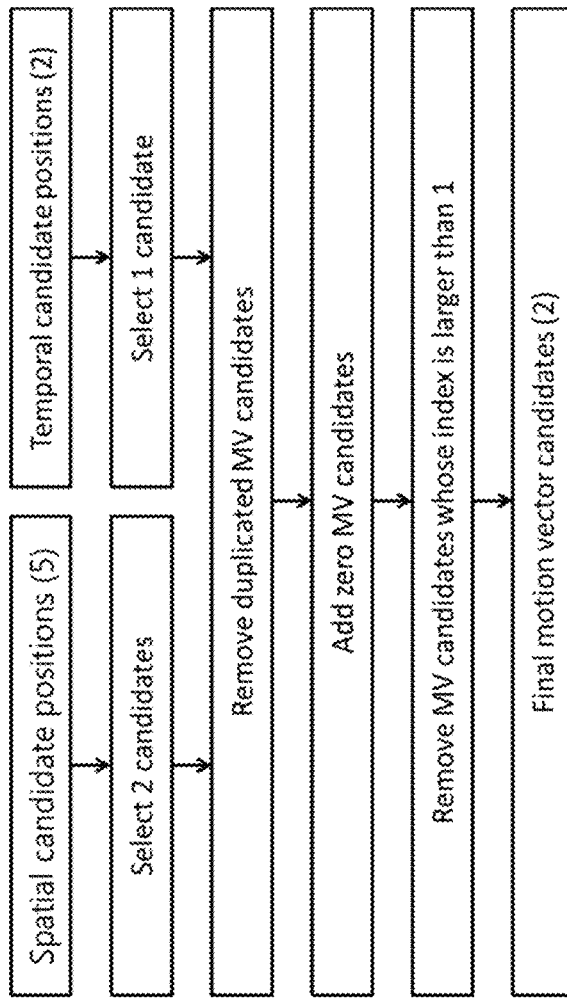
FIG. 8 shows an example of a derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2. Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as A0, A1, and scaled A0, scaled A1. The order of derivation for the above side of the current PU is defined as B0, B1, B2, scaled B0, scaled B1, scaled B2. For each side there are therefore four cases that can be used as motion vector candidate, with two cases not required to use spatial scaling, and two cases where spatial scaling is used. The four different cases are summarized as follows.

No Spatial Scaling (1) Same reference picture list, and same reference picture index (same POC)

(2) Different reference picture list, but same reference picture (same POC)

Spatial Scaling (3) Same reference picture list, but different reference picture (different POC)

(4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
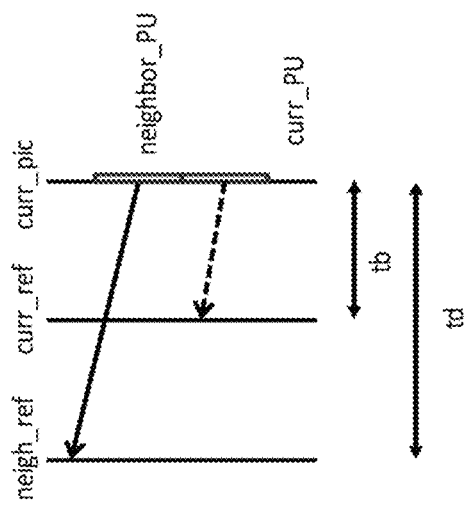
FIG. 9 shows an example of motion vector scaling for a spatial motion vector candidate.

FIG. 9 shows an example of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3. Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2. New Inter Prediction Methods in JEM 2.2.1. Sub-CU Based Motion Vector Prediction In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method, which is also referred to sub-block temporal motion vector prediction (SbTMVP), allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

Figure 10:
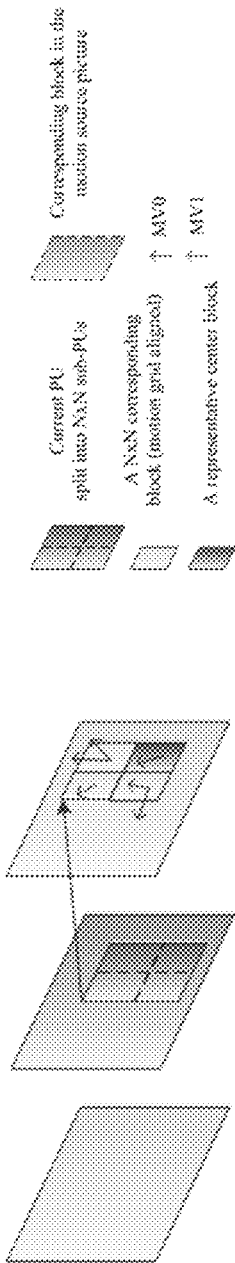
FIG. 10 shows an example of ATMVP motion prediction for a CU.

FIG. 10 shows an example ATMVP motion prediction for a CU.

2.2.1.1. Alternative Temporal Motion Vector Prediction

In the alternative temporal motion vector prediction (ATMVP) method, the motion vectors temporal motion vector prediction (TMVP) is modified by fetching multiple sets of motion information (including motion vectors and reference indices) from blocks smaller than the current CU. In some embodiments, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1−X) for each sub-CU.

2.2.1.2. Spatial-Temporal Motion Vector Prediction (STMVP)

Figure 11:
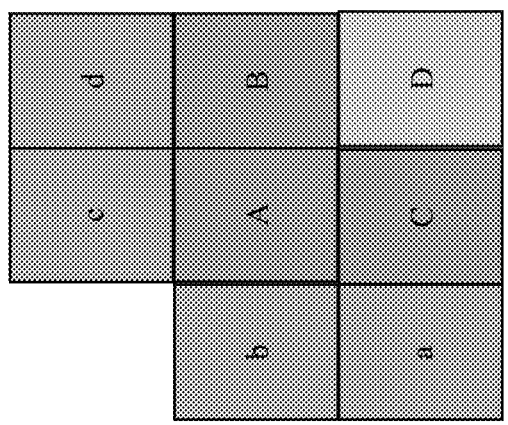
FIG. 11 shows an example of one CU with four sub-blocks (A-D) and its neighbouring blocks (a-d).

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

2.2.1.3. Sub-CU Motion Prediction Mode Signaling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context coded by CABAC. While in HEVC, only the first bin is context coded and the remaining bins are context by-pass coded.

2.2.2. Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Figure 12:
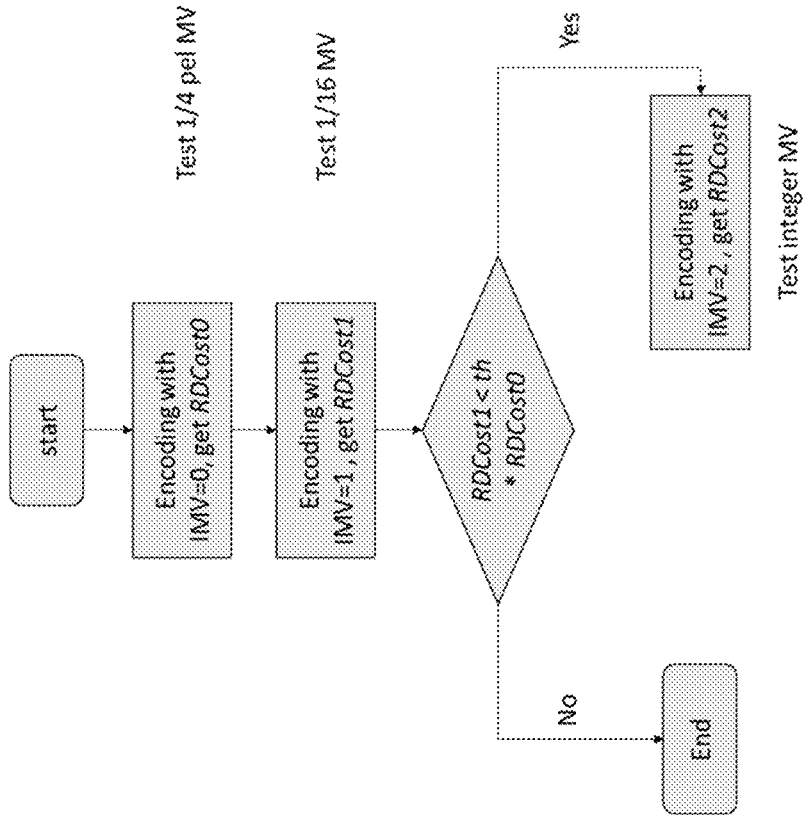
FIG. 12 shows an example of a flowchart of encoding with different MV precision.

The encoding process is shown in FIG. 12. First, ¼ pel MV is tested and the RD cost is calculated and denoted as RDCost0, then integer MV is tested and the RD cost is denoted as RDCost1. If RDCost1<th*RDCost0 (wherein th is a positive value), then 4-pel MV is tested; otherwise, 4-pel MV is skipped. Basically, motion information and RD cost etc. are already known for ¼ pel MV when checking integer or 4-pel MV, which can be reused to speed up the encoding process of integer or 4-pel MV.

2.2.3. Triangular Prediction Mode

Figure 13:
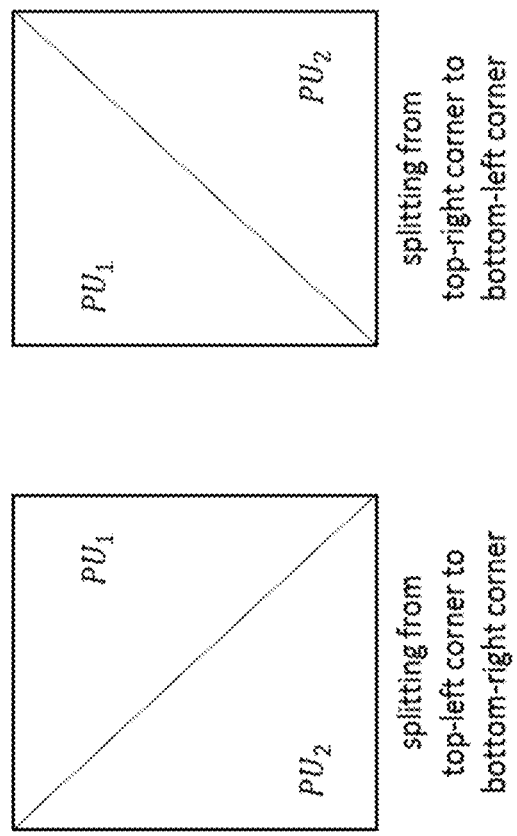
FIG. 13 shows examples of splitting a CU into two triangular prediction units (two partition types).

The concept of the triangular prediction mode (TPM) is to introduce a new triangular partition for motion compensated prediction. As shown in FIG. 13, it splits a CU into two triangular prediction units, in either diagonal or inverse diagonal direction. Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes.

2.2.3.1 Uni-Prediction Candidate List for TPM

Figure 14:
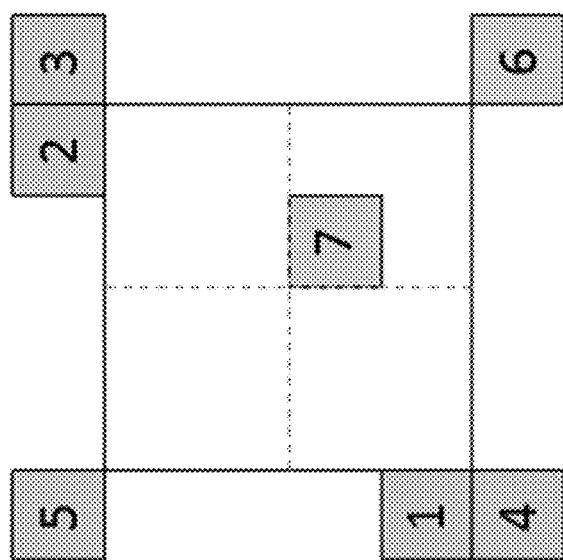
FIG. 14 shows an example of a position of neighboring blocks.

The uni-prediction candidate list consists of five uni-prediction motion vector candidates. It is derived from seven neighboring blocks including five spatial neighboring blocks (1 to 5) and two temporal co-located blocks (6 to 7), as shown in FIG. 14. FIG. 14 shows an example of a position of neighboring blocks. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list.

More specifically, the following steps are involved:

Obtain motion candidates from A1, B1, B0, A0, B2, Col and Col2 (corresponding to block 1-7 in FIG. 14) without any pruning operations.

Set variable numCurrMergeCand=0

For each motion candidates derived from A1, B1, B0, A0, B2, Col and Col2 and numCurrMergeCand is less than 5, if the motion candidate is uni-prediction (either from List 0 or List 1), it is added to the merge list with numCurrMergeCand increased by 1. Such added motion candidates is named 'originally uni-predicted candidate'.

Full Pruning is Applied.

For each motion candidates derived from A1, B1, B0, A0, B2, Col and Col2 and numCurrMergeCand is less than 5, if the motion candidate is bi-prediction, the motion information from List 0 is added to the merge list (that is, modified to be uni-prediction from List 0) and numCurrMergeCand increased by 1. Such added motion candidates is named 'Truncated List0-predicted candidate'.

Full pruning is applied.

For each motion candidates derived from A1, B1, B0, A0, B2, Col and Co2 and numCurrMergeCand is less than 5, if the motion candidate is bi-prediction, the motion information from List 1 is added to the merge list (that is, modified to be uni-prediction from List 1) and numCurrMergeCand increased by 1. Such added motion candidates is named 'Truncated List1—predicted candidate'.

Full pruning is applied.

For each motion candidates derived from A1, B1, B0, A0, B2, Col and Col2 and numCurrMergeCand is less than 5, if the motion candidate is bi-prediction, If List 0 reference picture's slice QP is smaller than List 1 reference picture's slice QP, the motion information of List 1 is firstly scaled to List 0 reference picture, and the average of the two MVs (one is from original List 0, and the other is the scaled MV from List 1) is added to the merge list, that is averaged uni-prediction from List 0 motion candidate and numCurrMergeCand increased by 1.

Otherwise, the motion information of List 0 is firstly scaled to List 1 reference picture, and the average of the two MVs (one is from original List 1, and the other is the scaled MV from List 0) is added to the merge list, that is averaged uni-prediction from List 1 motion candidate and numCurrMergeCand increased by 1.

Full pruning is applied.

If numCurrMergeCand is less than 5, zero motion vector candidates are added.

2.2.3.2. Adaptive Weighting Process

After predicting each triangular prediction unit, an adaptive weighting process is applied to the diagonal edge between the two triangular prediction units to derive the final prediction for the whole CU. Two weighting factor groups are defined as follows:

1st weighting factor group: {7/8, 6/8, 4/8, 2/8, 1/8} and {7/8, 4/8, 1/8} are used for the luminance and the chrominance samples, respectively;

2nd weighting factor group: {7/8, 6/8, 5/8, 4/8, 3/8, 2/8, 1/8} and {6/8, 4/8, 2/8} are used for the luminance and the chrominance samples, respectively.

Figure 15:
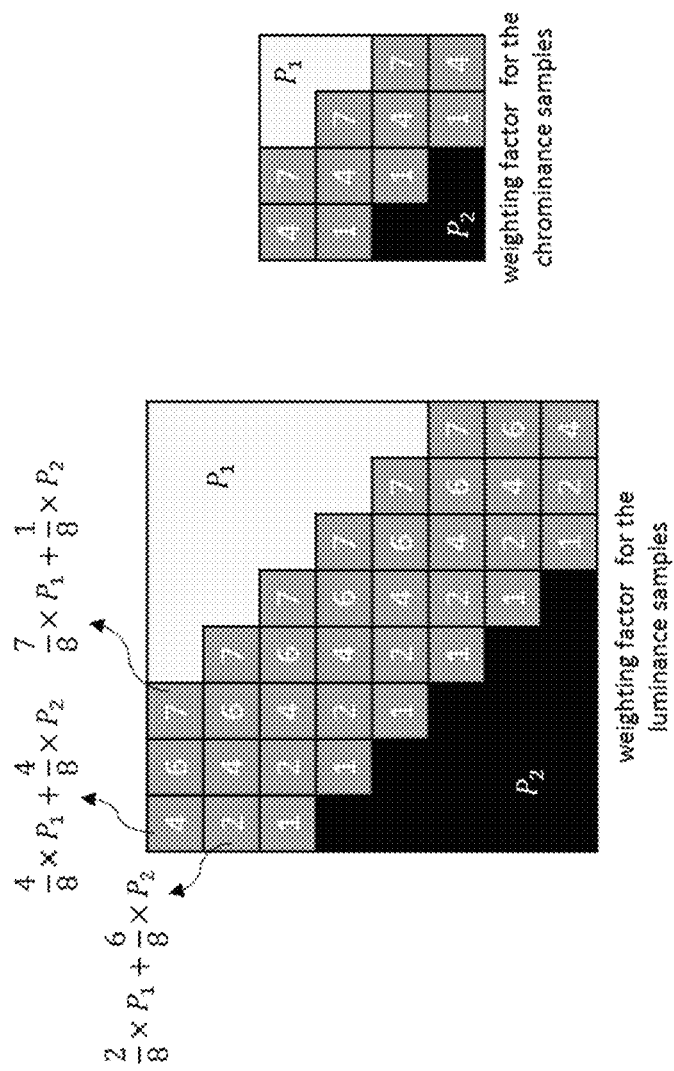
FIG. 15 shows an example of a CU applying the 1st weighting factor group.

Weighting factor group is selected based on the comparison of the motion vectors of two triangular prediction units. The 2nd weighting factor group is used when the reference pictures of the two triangular prediction units are different from each other or their motion vector difference is larger than 16 pixels. Otherwise, the 1st weighting factor group is used. An example is shown in FIG. 15. FIG. 15 shows an example of a CU applying the 1st weighting factor group.

2.2.3.3. Motion Vector Storage

Figure 16:
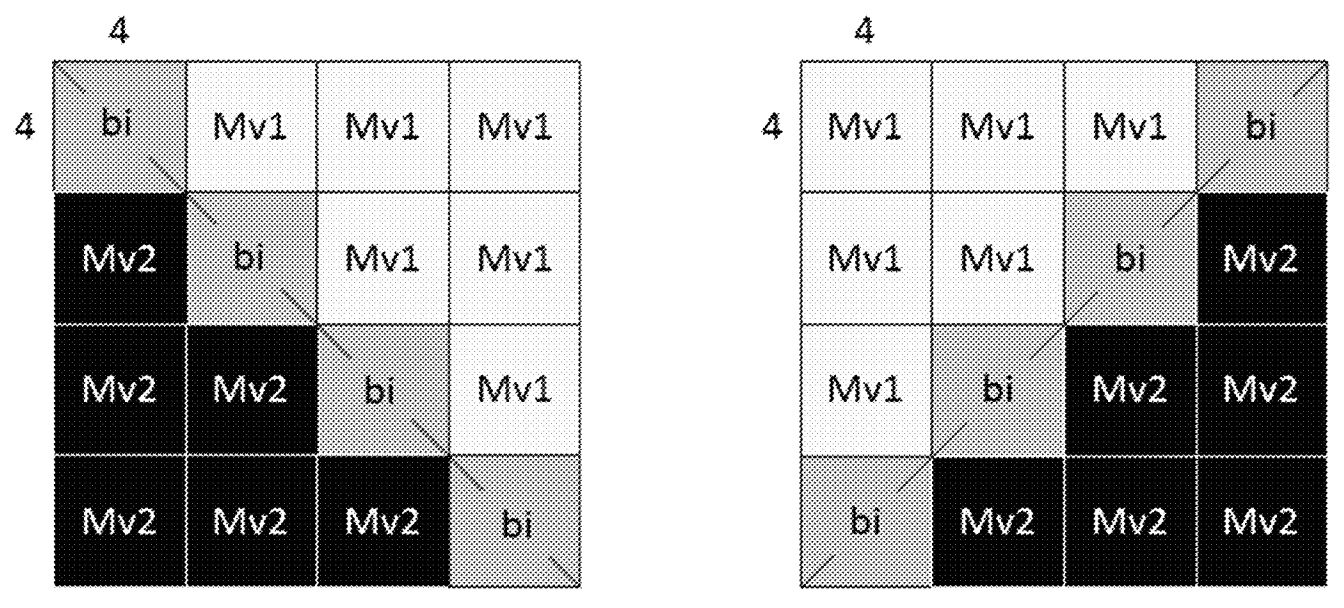

FIG. 16 shows an example of motion vector storage. The motion vectors (Mv1 and Mv2 in FIG. 16) of the triangular prediction units are stored in 4×4 grids. For each 4×4 grid, either uni-prediction or bi-prediction motion vector is stored depending on the position of the 4×4 grid in the CU. As shown in FIG. 16, uni-prediction motion vector, either Mv1 or Mv2, is stored for the 4×4 grid located in the non-weighted area (that is, not located at the diagonal edge). On the other hand, a bi-prediction motion vector is stored for the 4×4 grid located in the weighted area. The bi-prediction motion vector is derived from Mv1 and Mv2 according to the following rules:

In the case that Mv1 and Mv2 have motion vector from different directions (L0 or L1), Mv1 and Mv2 are simply combined to form the bi-prediction motion vector.

In the case that both Mv1 and Mv2 are from the same L0 (or L1) direction,

If the reference picture of Mv2 is the same as a picture in the L1 (or L0) reference picture list, Mv2 is scaled to the picture. Mv1 and the scaled Mv2 are combined to form the bi-prediction motion vector.

If the reference picture of Mv1 is the same as a picture in the L1 (or L0) reference picture list, Mv1 is scaled to the picture. The scaled Mv1 and Mv2 are combined to form the bi-prediction motion vector.

Otherwise, only Mv1 is stored for the weighted area.

2.2.3.4. Signaling of Triangular Prediction Mode (TPM)

One bit flag to indicate whether TPM is used may be firstly signaled. Afterwards, the indications of two splitting patterns (as depicted in FIG. 13), and selected merge indices for each of the two partitions are further signaled.

It is noted that TPM is treated as a special sub-mode of merge mode. Therefore, a merge flag is firstly signaled. When the merge flag is true, whether the block selects TPM may be further signaled.

The following table (referencing to the current version of VVC codec specification) shows an example of modifying current syntax (bold faced entries show changes)

7.3.4.6 Coding Unit Syntax

| coding_unit( x0, y0, cbWidth, cbHeight, treeType ) { | Descriptor |
|---|---|
| if( slice_type != I ) { | |
|   cu_skip_flag[ x0 ][ y0 ] | ae(v) |
|   if( cu_skip_flag[ x0 ][ y0 ] = = 0 ) | |
|     pred_mode_flag | ae(v) |
| } | |
| if( CuPredMode[ x0 ][ y0 ] = = MODE_INTRA ) { | |
| ... | |
| } else { /* MODE_INTER */ | |
|   if( cu_skip_flag[ x0 ][ y0 ] = = 0) { | |
|     merge_flag[ x0 ][ y0 ] | ae(v) |
|     if( merge _flag[ x0 ][ y0 ]) { | |
|     merge_data( x0, y0, cbWidth, cbHeight ) | |
|   } else { | |
|     if( slice_type = = B) | |
|     inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|     } | |
|     if( inter_pred_idc[ x0 ][ y0 ] != PRED_L1 ) { | |
|       if( num_ref_idx_l0_active_minus1 > 0 ) | |
|         ref_idx_l0[ x0 ][ y0] | ae(v) |
|       mvd_coding( x0, y0, 0, 0 ) | |
|       if( MotionModelIdc[ x0 ][ y0 ] > 0 ) | |

-continued

| coding_unit( x0, y0, cbWidth, cbHeight, treeType ) { | Descriptor |
|---|---|
|         mvd_coding( x0, y0, 0, 1 ) | |
|         if(MotionModelIdc[ x0 ][ y0 ] > 1 ) | |
|             mvd_coding( x0, y0, 0, 2 ) | |
|         mvp_l0_flag[ x0 ][ y0 ] | ae(v) |
|     } else { | |
|         MvdL0[ x0 ][ y0 ][ 0 ] = 0 | |
|         MvdL0[ x0 ][ y0 ][ 1 ] = 0 | |
|     } | |
|     if( inter_pred_idc[ x0 ][ y0 ] != PRED_L0 ) { | |
|         if( num_ref_idx_l1_active_minus1 > 0 ) | |
|             ref_idx_l1[ x0 ][ y0 ] | ae(v) |
|         if( mvd_l1_zero_flag && inter_pred_idc[ x0 ][ y0 ] = = PRED_BI ) { | |
|             MvdL1[ x0 ][ y0 ][ 0 ] = 0 | |
|             MvdL1[ x0 ][ y0 ][ 1 ] = 0 | |
|             MvdCpL1[ x0 ][ y0 ][ 0 ][ 0 ] = 0 | |
|             MvdCpL1[ x0 ][ y0 ][ 0 ][ 1 ] = 0 | |
|             MvdCpL1[ x0 ][ y0 ][ 1 ][ 0 ] = 0 | |
|             MvdCpL1[ x0 ][ y0 ][ 1 ][ 1 ] = 0 | |
|             MvdCpL1[ x0 ][ y0 ][ 2 ][ 0 ] = 0 | |
|             MvdCpL1[ x0 ][ y0 ][ 2 ][ 1 ] = 0 | |
|         } else { | |
|             mvd_coding( x0, y0, 1, 0 ) | |
|             if( MotionModelIdc[ x0 ][ y0 ] > 0 ) | |
|                 mvd_coding( x0, y0, 1, 1 ) | |
|             if(MotionModelIdc[ x0 ][ y0 ] > 1 ) | |
|                 mvd_coding( x0, y0, 1, 2) | |
|             mvp_l1_flag[ x0 ][y0 ] | ae(v) |
|         } else { | |
|             MvdL1[ x0 ][ y0 ][ 0 ] = 0 | |
|             MvdL1[ x0 ][ y0 ][ 1 ] = 0 | |
|         } | |
|         if( sps_amvr_enabled_flag && inter_affine_flag = = 0 && | |
|             ( MvdL0[ x0 ][ y0 ][ 0 ] != 0 \|\| MvdL0[ x0 ][ y0 ][ 1 ] != 0 \|\| | |
|             MvdL1[ x0 ][ y0 ][ 0 ] != 0 \|\| MvdL1[ x0 ][ y0 ][ 1 ] != 0 ) ) | |
|             amvr_mode[ x0 ][ y0 ] | ae(v) |
|         if( sps_gbi_enabled_flag && inter_pred_idc[ x0 ][ y0 ] = = PRED_BI && | |
|             cbWidth * cbHeight >= 256) | |
|             gbi_idx[ x0 ][ y0 ] | ae(v) |
|     } | |
|     if( !pcm_flag[ x0 ][ y0 ] ) { | |
|         if( CuPredMode[ x0 ][ y0 ] != MODE_INTRA && cu_skip_flag[ x0 ][ y0 ] = = 0 ) | |
|             cu_cbf | ae(v) |
|         if( cu_cbf ) | |
|             transform_tree( x0, y0, cbWidth, cbHeight, treeType ) | |
|     } | |
| } | |

7.3.4.8 Merge Data Syntax

| merge_data( x0, y0, cbWidth, cbHeight ) { | Descriptor |
|---|---|
|     mmvd_flag[ x0 ][ y0 ] | ae(v) |
|     if( mmvd_flag[ x0 ][ y0 ] = = 1 ) { | |
|         mmvd_merge_flag[ x0 ][ y0 ] | ae(v) |
|         mmvd_distance_idx[ x0 ][ y0] | ae(v) |
|         mmvd_direction_idx[ x0 ][ y0 ] | ae(v) |
|     } else { | |
|         if( MaxNumSubblockMergeCand > 0 && cbWidth >= 8 && cbHeight >= 8 ) | |
|             merge_subblock_flag[ x0 ][ y0 ] | ae(v) |
|         if( merge_subblock_flag[ x0][ y0 ] = = 1 ) { | |
|             if( MaxNumSubblockMergeCand > 1 ) | |
|                 merge_subblock_idx[ x0 ][ y0 ] | ae(v) |
|         } else { | |
|             if( sps_mh_intra_enabled_flag && cu_skip_flag[ x0 ][ y0 ] = = 0 && | |
|                 ( cbWidth * cbHeight ) >= 64 && cbWidth < 128 && cbHeight < 128 ) { | |
|                 mh_intra_flag[ x0 ][ y0 ] | ae(v) |
|                 if( mh_intra_flag[ x0 ][ y0 ] ) { | |
|                     if ( cbWidth <= 2 * cbHeight \|\| cbHeight <= 2 * cbWidth ) | |
|                         mh_intra_luma_mpm_flag[ x0 ][ y0 ] | ae(v) |
|                     if( mh_intra_luma_mpm_flag[ x0 ][ y0 ] ) | |
|                         mh_intra_luma_mpm_idx[ x0 ][ y0 ] | ae(v) |
|                 } | |
|             } | |

```
merge_data( x0, y0, cbWidth, cbHeight ) {                                    Descriptor
        if( sps_triangle_enabled_flag && slice_type = = B && cbWidth * cbHeight >= 16 )
            merge_triangle_flag[ x0 ][ y0 ]                                  ae(v)
        if( merge_triangle_flag[ x0 ][ y0 ] )
            merge_triangle_idx[ x0 ][ y0 ]                                   ae(v)
        else if( MaxNumMergeCand > 1 )
            merge_idx[ x0 ][ y0 ]                                            ae(v)
    }
  }
}
```

2.2.3.4.1 Signaling of TPM Flag

Let's denote one luma block's width and height by W and H, respectively. If W*H<64, triangular prediction mode is disabled.

When one block is coded with affine mode, triangular prediction mode is also disabled.

When one block is coded with merge mode, one bit flag may be signaled to indicate whether the triangular prediction mode is enabled or disabled for the block.

Figure 17:
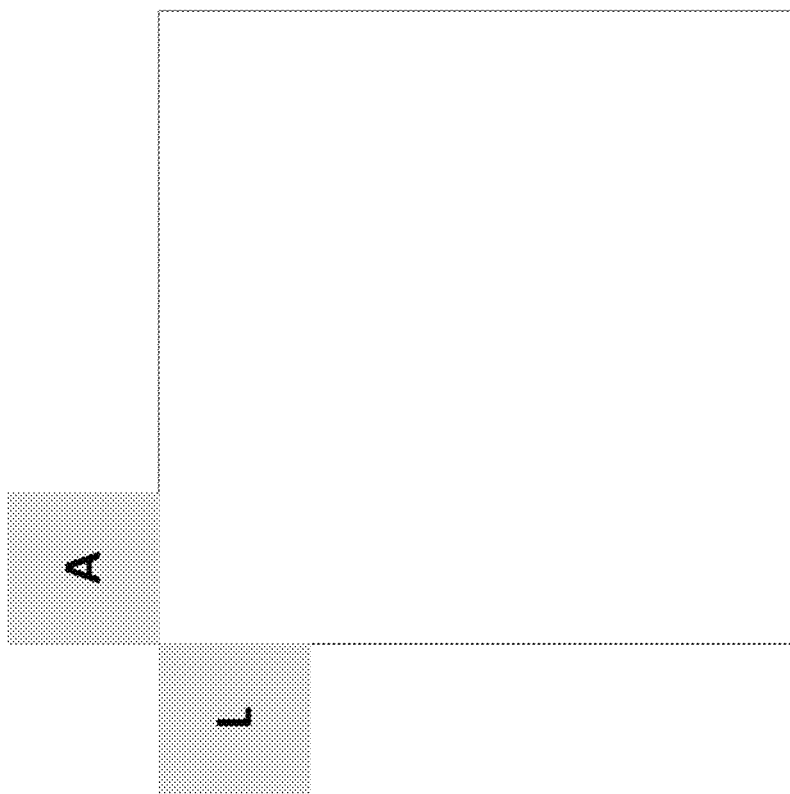
FIG. 17 shows an example of neighboring blocks (A and L) used for context selection in TPM flag coding.

The flag is coded with 3 contexts, based on the following equation:

Ctx index=((left block $L$ available && $L$ is coded with TPM?)1:0)+((Above block $A$ available && $A$ is coded with TPM?)1:0);

FIG. 17 shows an example of neighboring blocks (A and L) used for context selection in TPM flag coding.

2.2.3.4.2. Signaling of an Indication of Two Splitting Patterns (as Depicted in FIG. 13), and Selected Merge Indices for Each of the Two Partitions It is noted that splitting patterns, merge indices of two partitions are jointly coded. In [5], it is restricted that the two partitions couldn't use the same reference index. Therefore, there are 2 (splitting patterns)*N (maximum number of merge candidates)*(N−1) possibilities wherein N is set to 5. One indication is coded and the mapping between the partition type, two merge indices are derived from the array defined below:

const uint8_t g_TriangleCombination[TRIANGLE_MAX_NUM_CANDS][3]={
{0, 1, 0}, {1, 0, 1}, {1, 0, 2}, {0, 0, 1}, {0, 2, 0},
{1, 0, 3}, {1, 0, 4}, {1, 1, 0}, {0, 3, 0}, {0, 4, 0},
{0, 0, 2}, {0, 1, 2}, {1, 1, 2}, {0, 0, 4}, {0, 0, 3},
{0, 1, 3}, {0, 1, 4}, {1, 1, 4}, {1, 1, 3}, {1, 2, 1},
{1, 2, 0}, {0, 2, 1}, {0, 4, 3}, {1, 3, 0}, {1, 3, 2},
{1, 3, 4}, {1, 4, 0}, {1, 3, 1}, {1, 2, 3}, {1, 4, 1},
{0, 4, 1}, {0, 2, 3}, {1, 4, 2}, {0, 3, 2}, {1, 4, 3},
{0, 3, 1}, {0, 2, 4}, {1, 2, 4}, {0, 4, 2}, {0, 3, 4}1;

Partition type (45 degree or 135 degree)=g_TriangleCombination[signaled indication][0];

Merge index of candidate $A$=g_TriangleCombination [signaled indication][1];

Merge index of candidate $B$=g_TriangleCombination [signaled indication][2];

Once the two motion candidates A and B are derived, the two partitions' (PU1 and PU2) motion information could be set either from A or B. Whether PU1 uses the motion information of merge candidate A or B is dependent on the prediction directions of the two motion candidates. Table 1 shows the relationship between two derived motion candidates A and B, with the two partitions.

TABLE 1

Derivation of partitions' motion information from derived two merge candidates (A, B)

| Prediction direction of A | Prediction direction of B | PU1's motion information | PU2's motion information |
|---|---|---|---|
| L0 | L0 | A (L0) | B (L0) |
| L1 | L1 | B (L1) | A (L1) |
| L0 | L1 | A (L0) | B (L1) |
| L1 | L0 | B (L0) | A (L1) |

2.2.3.4.3. Entropy Coding of the Indication (Denoted by Merge_Triangle_Idx)

merge_triangle_idx is within the range [0, 39], inclusively. K-th order Exponential Golomb (EG) code is used for binarization of merge_triangle_idx wherein K is set to 1.

K-Th Order EG

To encode larger numbers in fewer bits (at the expense of using more bits to encode smaller numbers), this can be generalized using a nonnegative integer parameter k. To encode a nonnegative integer x in an order-k exp-Golomb code:

Encode $\lfloor x/2^k \rfloor$ using order-0 exp-Golomb code described above, then Encode x mod $2^k$ in binary

TABLE 2

Exp-Golomb-k coding examples

| x | k = 0 | k = 1 | k = 2 |
|---|---|---|---|
| 0 | 1 | 10 | 100 |
| 1 | 010 | 11 | 101 |
| 2 | 011 | 0100 | 110 |
| 3 | 00100 | 0101 | 111 |
| 4 | 00101 | 0110 | 01000 |
| 5 | 00110 | 0111 | 01001 |
| 6 | 00111 | 001000 | 01010 |
| 7 | 0001000 | 001001 | 01011 |
| 8 | 0001001 | 001010 | 01100 |
| 9 | 0001010 | 001011 | 01101 |
| 10 | 0001011 | 001100 | 01110 |
| 11 | 0001100 | 001101 | 01111 |
| 12 | 0001101 | 001110 | 0010000 |
| 13 | 0001110 | 001111 | 0010001 |
| 14 | 0001111 | 00010000 | 0010010 |
| 15 | 000010000 | 00010001 | 0010011 |
| 16 | 000010001 | 00010010 | 0010100 |
| 17 | 000010010 | 00010011 | 0010101 |
| 18 | 000010011 | 00010100 | 0010110 |
| 19 | 000010100 | 00010101 | 0010111 |

2.2.4. Overlapped Block Motion Compensation

Figure 18:
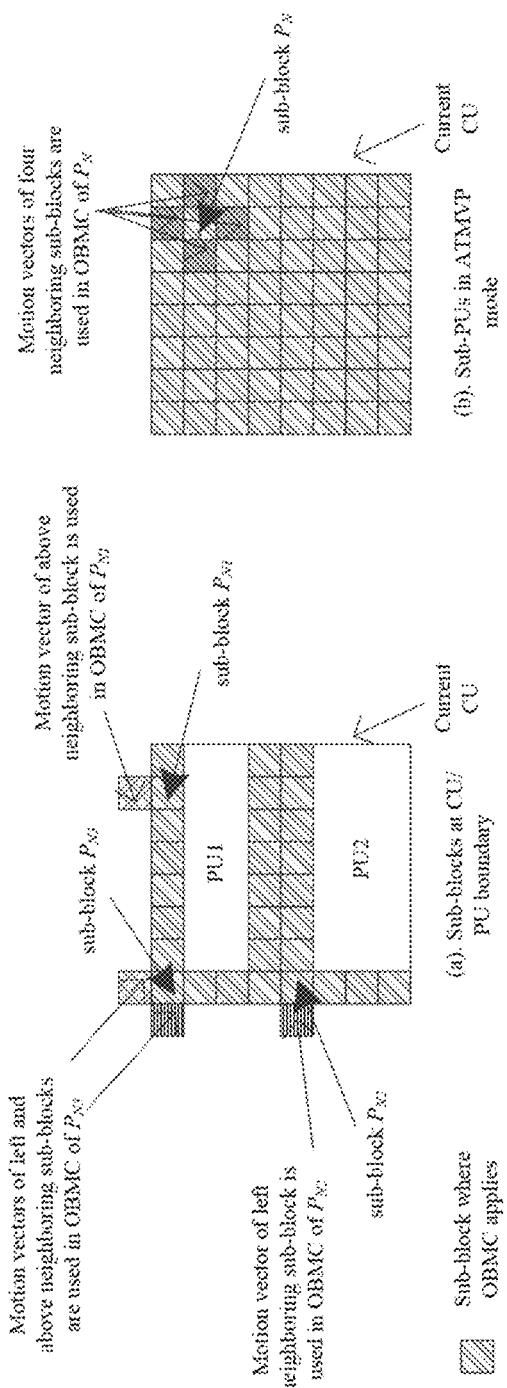
FIG. 18 shows an example of sub-blocks where OBMC applies.

Overlapped Block Motion Compensation (OBMC) has previously been used in H.263. In the JEM, unlike in H.263, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as illustrated in FIG. 18.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighbouring sub-block is denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every sample of $P_N$ is added to the same sample in $P_C$, i.e., four rows/columns of $P_N$ are added to $P_C$. The weighting factors $\{1/4, 1/8, 1/16, 1/32\}$ are used for $P_N$ and the weighting factors $\{3/4, 7/8, 15/16, 31/32\}$ are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors $\{1/4, 1/8\}$ are used for $P_N$ and weighting factors $\{3/4, 7/8\}$ are used for $P_C$. For $P_N$ generated based on motion vectors of vertically (horizontally) neighbouring sub-block, samples in the same row (column) of $P_N$ are added to $P_C$ with a same weighting factor.

In the JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighbouring block and the left neighbouring block is used to compensate the top and left boundaries of the original signal of the current CU, and then the normal motion estimation process is applied.

2.2.5. Local Illumination Compensation

Figure 19:
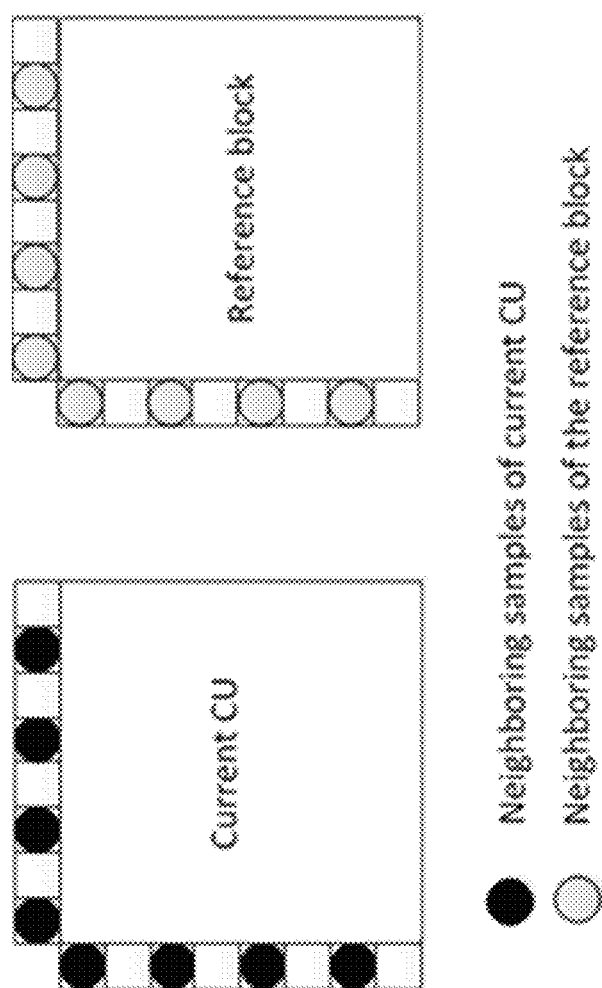
FIG. 19 shows an example of neighboring samples used for deriving IC parameters.

Local Illumination Compensation (LIC) is based on a linear model for illumination changes, using a scaling factor a and an offset b. And it is enabled or disabled adaptively for each inter-mode coded coding unit (CU). FIG. 19 shows an example of neighboring samples used for deriving IC parameters.

When LIC applies for a CU, a least square error method is employed to derive the parameters a and b by using the neighbouring samples of the current CU and their corresponding reference samples. More specifically, as illustrated in FIG. 19, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.2.6. Affine Motion Compensation Prediction

Figure 20:
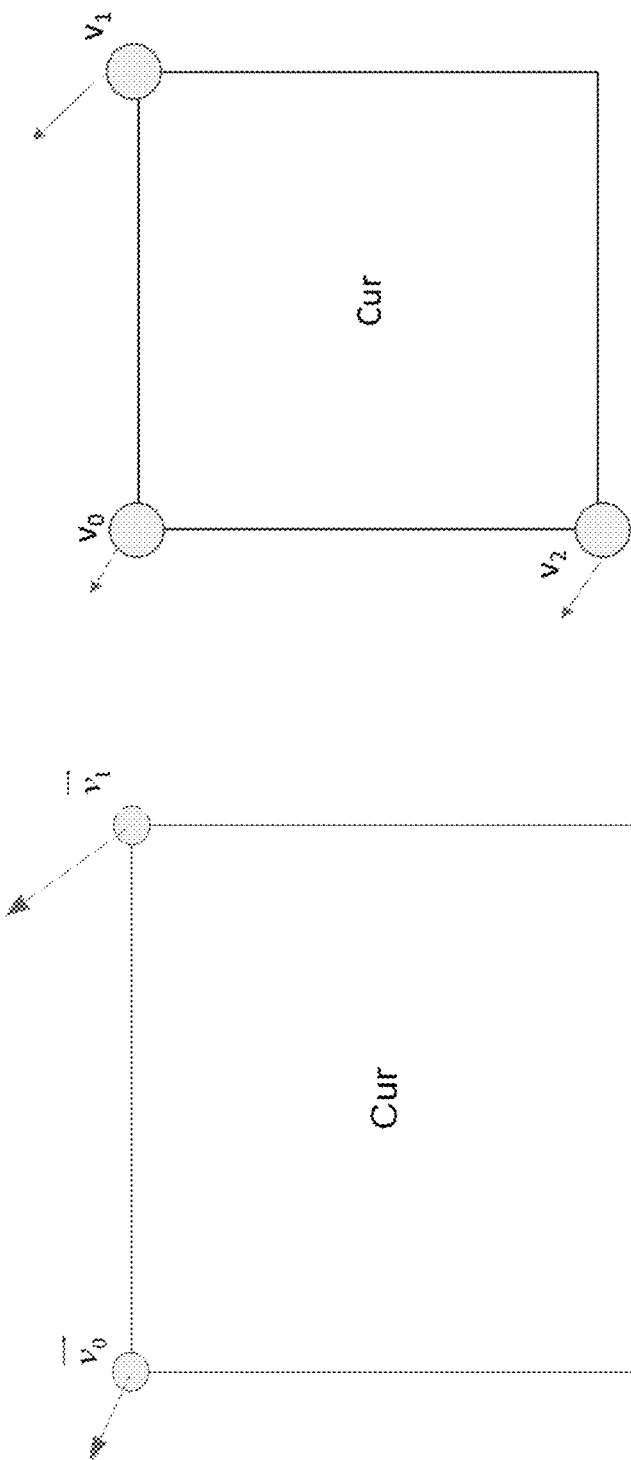
FIG. 20 shows an example of a simplified affine motion model.

In HEVC, only translation motion model is applied for motion compensation prediction (MCP). While in the real world, there are many kinds of motion, e.g. zoom in/out, rotation, perspective motions and he other irregular motions. In the JEM, a simplified affine transform motion compensation prediction is applied. As shown in FIG. 20, the affine motion field of the block is described by two control point motion vectors.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} + v_{0x})}{w}y + v_{0y} \end{cases} \quad (1\text{-a})$$

For 6-parmaeter affine, $$\begin{cases} v_x = \frac{v_{1x} - v_{0x}}{w}x + \frac{v_{2x} - v_{0x}}{h}y + v_{0x} \\ v_y = \frac{v_{1y} - v_{0y}}{w}x + \frac{v_{2y} + v_{0y}}{h}y + v_{0y} \end{cases} \quad (1\text{-b})$$

Where $(v_{0x}, v_{0y})$ is motion vector of the top-left corner control point, and $(v_{1x}, v_{1y})$ is motion vector of the top-right corner control point and $(v_{2x}, v_{2y})$ is motion vector of the bottom-left corner control point, (x, y) represents the coordinate of a representative point relative to the top-left sample within current block. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2).

In order to further simplify the motion compensation prediction, sub-block based affine transform prediction is applied. The sub-block size M×N is derived as in Equation 2, where MvPre is the motion vector fraction accuracy (1/16 in JEM), $(v_{2x}, v_{2y})$ is motion vector of the bottom-left control point, calculated according to Equation 1.

$$\begin{cases} M = clip3\left(4, w, \dfrac{w \times MvPre}{\max(\text{abs}(v_{1x} - v_{0x}), \text{abs}(v_{1y} - v_{0y}))}\right) \\ N = clip3\left(4, h, \dfrac{h \times MvPre}{\max(\text{abs}(v_{2x} - v_{0x}), \text{abs}(v_{2y} - v_{0y}))}\right) \end{cases} \quad (2)$$

After derived by Equation 2, M and N should be adjusted downward if necessary to make it a divisor of w and h, respectively.

Figure 21:
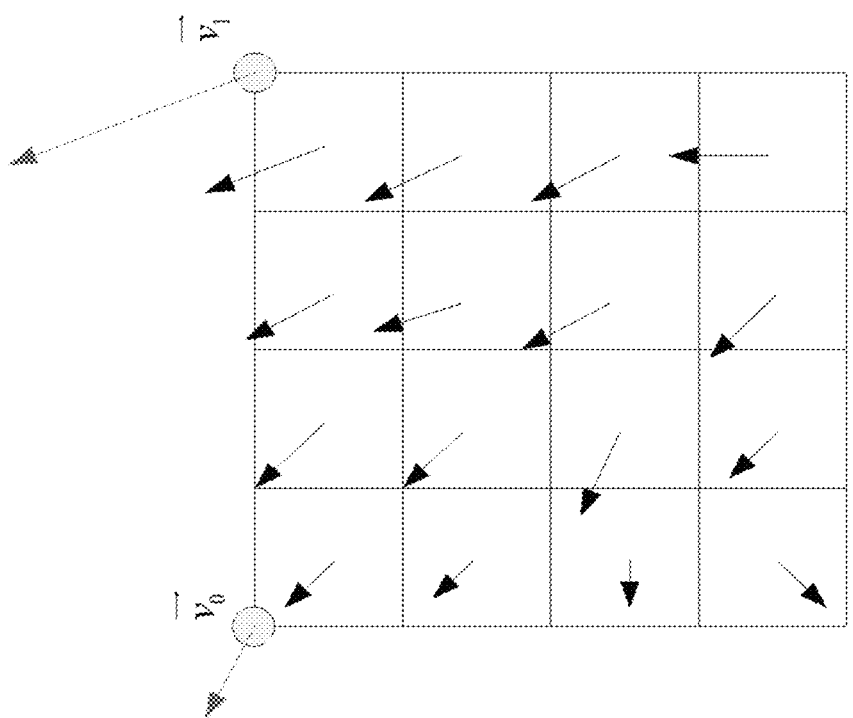
FIG. 21 shows an example of affine MVF per sub-block.

To derive motion vector of each M×N sub-block, the motion vector of the center sample of each sub-block, as shown in FIG. 21, is calculated according to Equation 1, and rounded to 1/16 fraction accuracy. Then the motion compensation interpolation filters mentioned elsewhere herein are applied to generate the prediction of each sub-block with derived motion vector.

After MCP, the high accuracy motion vector of each sub-block is rounded and saved as the same accuracy as the normal motion vector.

2.2.6.1. AF_INTER Mode

Figure 23:
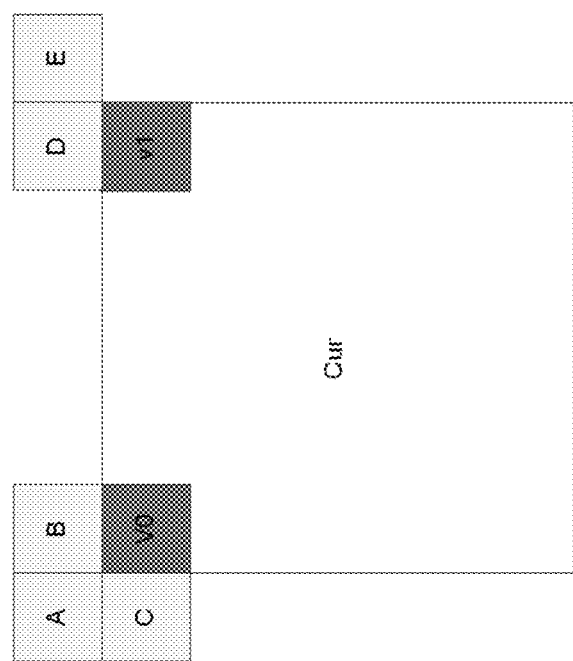
FIG. 23 shows an example of MVP for AF_INTER.

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair $\{(v_0, v_1) | v_0 = \{v_A, v_B, v_C\}, v_1 = \{v_D, v_E\}\}$ is constructed using the neighbour blocks. As shown in FIG. 23, $v_0$ is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighbouring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

In AF_INTER mode, when 4/6 parameter affine mode is used, 2/3 control points are required, and therefore 2/3 MVD needs to be coded for these control points, as shown in FIG. 22. In some embodiments, it is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 22 (b). Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.2.6.2. AF_MERGE Mode

Figure 24:
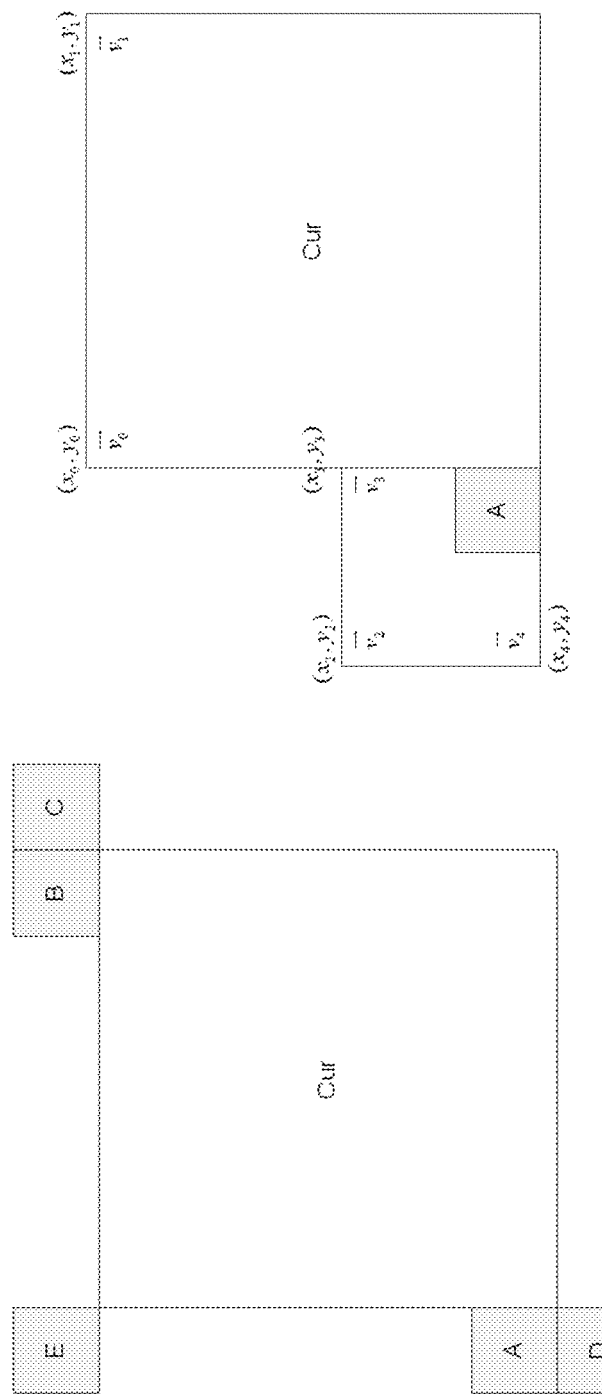
FIG. 24 shows an example of candidates for AF_MERGE.

When a CU is applied in AF_MERGE mode, it gets the first block coded with affine mode from the valid neighbour reconstructed blocks. And the selection order for the candidate block is from left, above, above right, left bottom to above left as shown in FIG. 24 a. If the neighbour left bottom block A is coded in affine mode as shown in FIG. 24, caption (b), the motion vectors $v_2$, $v_3$ and $v_4$ of the top left corner, above right corner and left bottom corner of the CU which contains the block A are derived. And the motion vector $v_0$ of the top left corner on the current CU is calculated according to $v_2$, $v_3$ and $v_4$. Secondly, the motion vector $v_1$ of the above right of the current CU is calculated.

After the CPMV of the current CU $v_0$ and $v_1$ are derived, according to the simplified affine motion model Equation 1, the MVF of the current CU is generated. In order to identify whether the current CU is coded with AF_MERGE mode, an affine flag is signalled in the bitstream when there is at least one neighbour block is coded in affine mode.

In some embodiments, an affine merge candidate list is constructed with following steps:

Insert Inherited Affine Candidates

Figure 25:
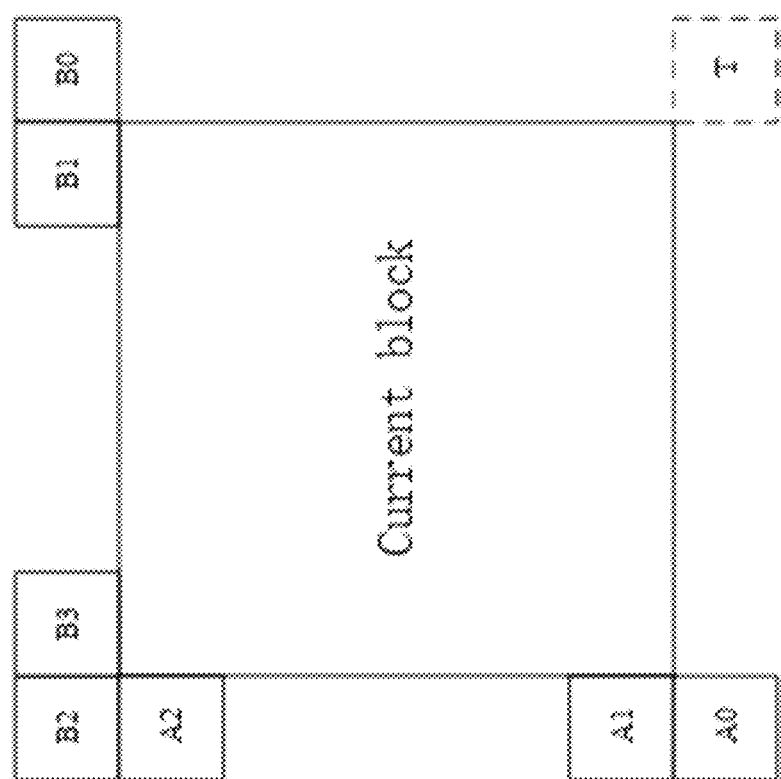
FIG. 25 shows an example of candidates position for affine merge mode.

Inherited affine candidate means that the candidate is derived from the affine motion model of its valid neighbor affine coded block. In the common base, as shown in FIG. 25, the scan order for the candidate positions is: A1, B1, B0, A0 and B2.

After a candidate is derived, full pruning process is performed to check whether same candidate has been inserted into the list. If a same candidate exists, the derived candidate is discarded.

Insert Constructed Affine Candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 25. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2->B3->A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1->B0.

For CP3, the checking priority is A1->A0.

For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

Padding with Zero Motion Vectors

If the number of candidates in affine merge candidate list is less than 5, zero motion vectors with zero reference indices are insert into the candidate list, until the list is full.

2.2.7. Bi-Directional Optical Flow

Bi-directional Optical flow (BIO) is sample-wise motion refinement which is performed on top of block-wise motion compensation for bi-prediction. The sample-level motion refinement doesn't use signalling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by an equation $$\partial I^{(k)}/\partial t + v_x \partial I^{(k)}/\partial x + v_y \partial I^{(k)}/\partial y = 0. \quad (3)$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$pred_{BIO}=\tfrac{1}{2} \cdot (I^{(0)}+I^{(1)}+v_x/2 \cdot (\tau_1 \partial I^{(1)}/\partial x - \tau_0 \partial I^{(0)}/\partial x)+v_y/2 \cdot (\tau_1 \partial I^{(1)}/\partial y - \tau_0 \partial I^{(0)}/\partial y)). \quad (3)$$

Figure 26:
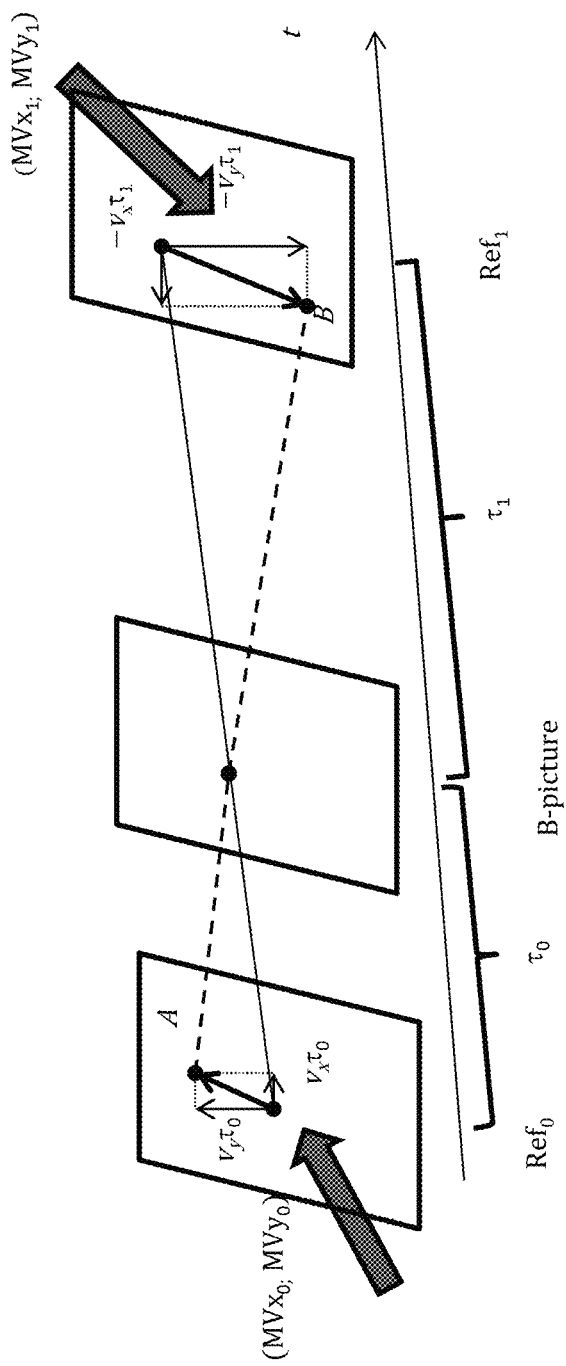
FIG. 26 shows an example of optical flow trajectory.

Here, $\tau_0$ and $\tau_1$ denote the distances to the reference frames as shown on a FIG. 26. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), both referenced regions have non-zero motion (MVx$_0$, MVy$_0$, MVx$_1$, MVy$_1$≠0) and the block motion vectors are proportional to the time distance (MVx$_0$/MVx$_1$=MVy$_0$/MVy$_1$=−$\tau_0$/$\tau_1$).

The motion vector field $(v_x, v_y)$ is determined by minimizing the difference Δ between values in points A and B (intersection of motion trajectory and reference frame planes on FIG. 9). Model uses only first linear term of a local Taylor expansion for Δ:

$$\Delta=(I^{(0)}-I^{(1)}{}_0+v_x(\tau_1 \partial I^{(1)}/\partial x + \tau_0 \partial I^{(0)}/\partial x)+v_y(\tau_1 \partial I^{(1)}/\partial y + \tau_0 \partial I^{(0)}/\partial y)) \quad (5)$$

All values in Equation 5 depend on the sample location (i', j'), which was omitted from the notation so far. Assuming the motion is consistent in the local surrounding area, we minimize Δ inside the (2M+1)×(2M+1) square window Ω centered on the currently predicted point (i,j), where M is equal to 2:

$$(v_x, v_y) = \underset{v_x,v_y}{\operatorname{argmin}} \sum_{[i',j] \in \Omega} \Delta^2[i', y'] \quad (6)$$

For this optimization problem, the JEM uses a simplified approach making first a minimization in the vertical direction and then in the horizontal direction. This results in $$v_x = (s_1 + r) > m ? \; clip3\!\left(-thBIO, thBIO, -\frac{s_3}{(s_1+r)}\right):0 \quad (7)$$

$$v_y = (s_5 + r) > m ? \; clip3\!\left(-thBIO, thBIO, -\frac{s_6 - v_x s_2/2}{(s_5+r)}\right):0 \quad (8)$$

where, $$s_1 = \sum_{[i',j] \in \Omega} (\tau_1 \partial I^{(1)}/\partial x + \tau_0 \partial I^{(0)}/\partial x)^2; \quad (9)$$

$$s_3 = \sum_{[i',j] \in \Omega} (I^{(1)} - I^{(0)})(\tau_1 \partial I^{(1)}/\partial x + \tau_0 \partial I^{(0)}/\partial x);$$

$$s_2 = \sum_{[i',j] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j] \in \Omega} (\tau_1 \partial I^{(1)}/\partial y + \tau_0 \partial I^{(0)}/\partial y)^2;$$

$$s_6 = \sum_{[i',j] \in \Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m are introduced in Equations 7 and 8.

$$r=500 \cdot 4^{d-8} \quad (10)$$

$$m=700 \cdot 4^{d-8} \quad (11)$$

Here d is bit depth of the video samples.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated only for positions inside the current block. In Equation 9, (2M+1)×(2M+1) square window Ω centered in currently predicted point on a boundary of predicted block needs to accesses positions outside of the block (as shown in FIG. 27 left-side (a)). In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in FIG. 27 right-side (b).

With BIO, it's possible that the motion field can be refined for each sample. To reduce the computational complexity, a block-based design of BIO is used in the JEM. The motion refinement is calculated based on 4×4 block. In the block-based BIO, the values of $s_n$ in Equation 9 of all samples in a 4×4 block are aggregated, and then the aggregated values of $s_n$ in are used to derived BIO motion vectors offset for the 4×4 block. More specifically, the following formula is used for block-based BIO derivation:

$$s_{1,b_k} = \sum_{(x,y)\in b_k} \sum_{[i',j]\in\Omega(x,y)} (\tau_1 \partial I^{(1)}/\partial x + \tau_0 \partial I^{(0)}/\partial x)^2; \quad (12)$$

$$s_{3,b_k} = \sum_{(x,y)\in b_k} \sum_{[i',j]\in\Omega} (I^{(1)} - I^{(0)})(\tau_1 \partial I^{(1)}/\partial x + \tau_0 \partial I^{(0)}/\partial x);$$

$$s_{2,b_k} = \sum_{(x,y)\in b_k} \sum_{[i',j]\in\Omega} (\tau_1 \partial I^{(1)}/\partial x + \tau_0 \partial I^{(0)}/\partial x)$$

$$(\tau_1 \partial I^{(1)}/\partial y + \tau_0 \partial I^{(0)}/\partial y);$$

$$s_{5,b_k} = \sum_{(x,y)\in b_k} \sum_{[i',j]\in\Omega} (\tau_1 \partial I^{(1)}/\partial y + \tau_0 \partial I^{(0)}/\partial y)^2;$$

$$s_{6,b_k} = \sum_{(x,y)\in b_k} \sum_{[i',j]\in\Omega} (I^{(1)} - I^{(0)})(\tau_1 \partial I^{(1)}/\partial y + \tau_0 \partial I^{(0)}/\partial y)$$

where $b_k$ denotes the set of samples belonging to the k-th 4×4 block of the predicted block. $s_n$ in Equations 7 and 8 are replaced by $((s_{n,bk})>>4)$ to derive the associated motion vector offsets.

In some cases, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12\times2^{14-d}$; otherwise, it is set to $12\times2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient ∂I/∂x signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18−d. In case of vertical gradient ∂I/∂y first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18−d. The length of interpolation filter for gradients calculation BIOfilterG and signal displacement BIOfilterF is shorter (6-tap) in order to maintain reasonable complexity. Table 3 shows the filters used for gradients calculation for different fractional positions of block motion vector in BIO. Table 4 shows the interpolation filters used for prediction signal generation in BIO.

TABLE 3

Filters for gradients calculation in BIO

| Fractional pel position | Interpolation filter for gradient(BIOfilterG) |
|---|---|
| 0 | { 8, −39, −3, 46, −17, 5} |
| 1/16 | { 8, −32, −13, 50, −18, 5} |
| 1/8 | { 7, −27, −20, 54, −19, 5} |
| 3/16 | { 6, −21, −29, 57, −18, 5} |
| 1/4 | { 4, −17, −36, 60, −15, 4} |
| 5/16 | { 3, −9, −44, 61, −15, 4} |
| 3/8 | { 1, −4, −48, 61, −13, 3} |
| 7/16 | { 0, 1, −54, 60, −9, 2} |
| 1/2 | { −1, 4, −57, 57, −4, 1} |

TABLE 4

Interpolation filters for prediction signal generation in BIO

| Fractional pel position | Interpolation filter for prediction signal(BIOfilterS) |
|---|---|
| 0 | { 0, 0, 64, 0, 0, 0} |
| 1/16 | { 1, −3, 64, 4, −2, 0} |
| 1/8 | { 1, −6, 62, 9, −3, 1} |
| 3/16 | { 2, −8, 60, 14, −5, 1} |
| 1/4 | { 2, −9, 57, 19, −7, 2} |
| 5/16 | { 3, −10, 53, 24, −8, 2} |
| 3/8 | { 3, −11, 50, 29, −9, 2} |
| 7/16 | { 3, −11, 44, 35, −10, 3} |
| 1/2 | { 3, −10, 35, 44, −11, 3} |

In the JEM, BIO is applied to all bi-predicted blocks when the two predictions are from different reference pictures. When LIC is enabled for a CU, BIO is disabled.

In the JEM, OBMC is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

2.2.8. Decoder-Side Motion Vector Refinement

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 28:
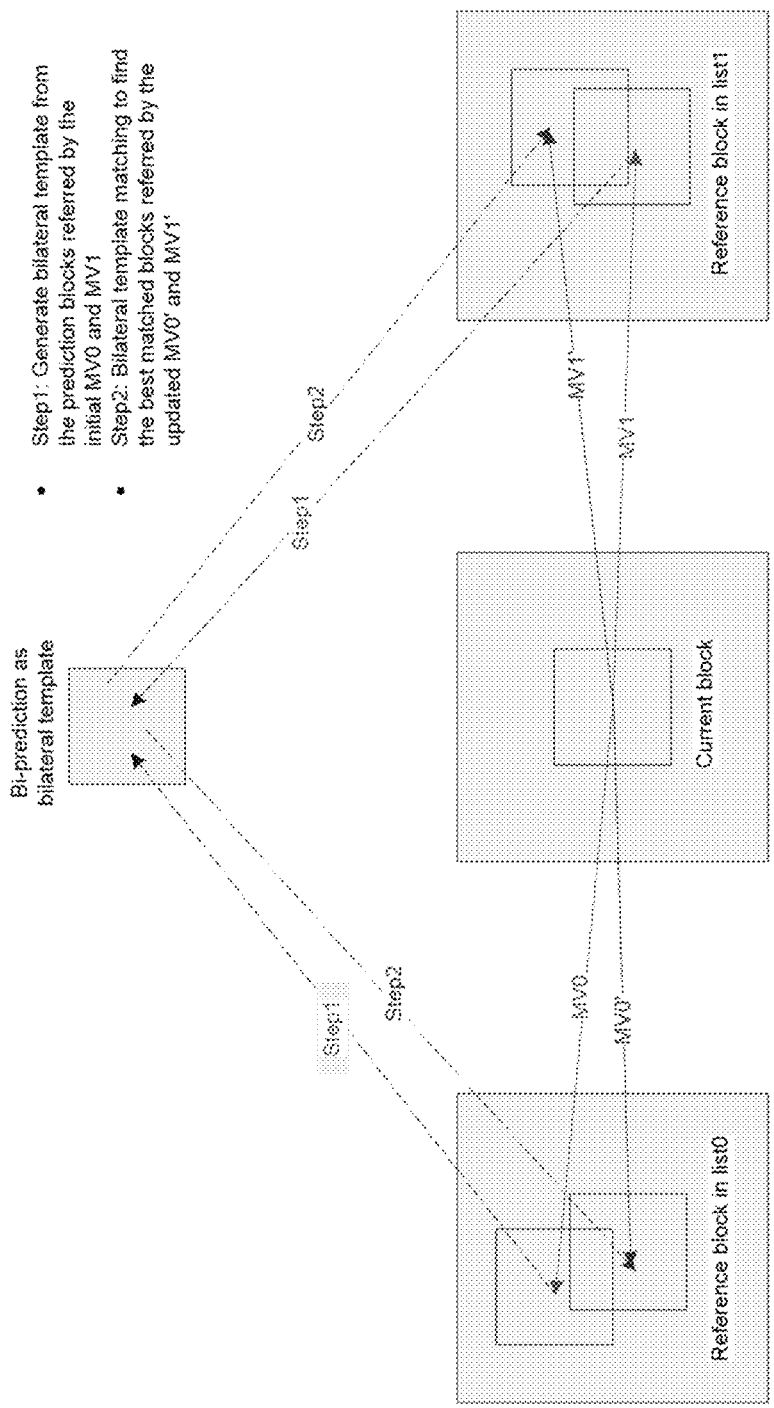
FIG. 28 shows an example of DMVR based on bilateral template matching.

In DMVR, a bilateral template is generated as the weighted combination (i.e. average) of the two prediction blocks, from the initial MV0 of list0 and MV1 of list1, respectively, as shown in FIG. 28. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 28, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

2.2.9. Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

2.2.9.1 Construction of Sub-Block Merge Candidate List

In this contribution, the ATMVP merge candidate in the normal merge list is moved to the first position of the affine merge list. Such that all the merge candidates in the new list (i.e., sub-block based merge candidate list) are based on sub-block coding tools.

2.2.10. Generalized Bi-Prediction Examples

With GBi, the bi-prediction $P_{bi\text{-}pred}$ is generated using Eq. (1) with one weighting parameter signalled for the coded coding unit, where P0 and P1 are motion compensated predictions using reference picture in list-0 and list-1, respectively. w is weighting parameter for list-1 prediction represented in ⅛ precision. GBi is also known as Bi-prediction with Coding Unit based Weighting (BCW).

$$P_{bi\text{-}pred}=((8-w)*P_0+w*P_1+4)>>3 \qquad (13)$$

In current GBi design, there are 5 weights {-2/8, 3/8, 4/8, 5/8, 10/8} available for low-delay picture and 3 weights {3/8, 4/8, 5/8} for non-low-delay picture.

The following rules are applied for determining the weight value for a coding unit:

For each bi-prediction PU that requires signaling MVD (i.e. normal inter prediction mode), its weight value is set equal to the explicitly signaled.

For each bi-prediction PU that is coded with merge modes, its weight value w is inferred directly from the weight value used for the associated merge candidate.

2.3 Context Modeling Using Neighboring Syntax Elements

One type of context modeling involves a context template with up to two neighboring syntax elements in the past of the current syntax element to encode, where the specific definition of the kind of neighborhood depends on the syntax element. Usually, the specification of this kind of context model for a specific bin is based on a modeling function of the related bin values for the neighboring element to the left and on top of the current syntax element, as shown A2 and B3 in FIG. 25.

9.5.4.2.2 Derivation Process of ctxInc Using Left and Above Syntax Elements

Input to this process is the luma location (x0, y0) specifying the top-left luma sample of the current luma block relative to the top-left sample of the current picture, the colour component cIdx, the current coding quadtree depth cqDepth, and the width and the height of the current coding block in luma samples cbWidth and cbHeight.

Output of this process is ctxInc.

The location (xNbL, yNbL) is set equal to (x0−1, y0) and the variable availableL, specifying the availability of the block located directly to the left of the current block, is derived by invoking the availability derivation process for a block in z-scan order as specified in subclause 6.4 with the location (xCurr, yCurr) set equal to (x0, y0) and the neighbouring location (xNbY, yNbY) set equal to (xNbL, yNbL) as inputs, and the output is assigned to availableL.

The location (xNbA, yNbA) is set equal to (x0, y0−1) and the variable availableA specifying the availability of the coding block located directly above the current block, is derived by invoking the availability derivation process for a block in z-scan order as specified in subclause 6.4 with the location (xCurr, yCurr) set equal to (x0, y0) and the neighbouring location (xNbY, yNbY) set equal to (xNbA, yNbA) as inputs, and the output is assigned to availableA.

The variables sizeC, sizeTh2 and sizeTh1 are derived as follows:

$$sizeTh2=(MaxBtSizeY==128)?1024:((MaxBt\text{-}SizeY==64)?512:256) \qquad (9\text{-}19)$$

$$sizeTh1=(MaxBtSizeY==128)?128:64 \qquad (9\text{-}20)$$

$$sizeC=cbWidth*cbHeight \qquad (9\text{-}21)$$

The assignment of ctxInc is specified as follows with condL and condA for the syntax elements alf_ctb_flag[x0][y0][cIdx], qt_split_cu_flag[x0][y0], mtt_split_cu_flag[x0][y0], cu_skip_flag[x0][y0], amvr_mode[x0][y0], inter_affine_flag[x0][y0], merge_triangle_flag[x0][y0] and merge_subblock_flag[x0][y0] specified in Table 9-11:

$$ctxInc=(condL \text{ \&\& } availableL)+(condA \text{ \&\& } availableA)+ctxSetIdx*3 \qquad (9\text{-}22)$$

TABLE 9-11

Specification of ctxInc using left and above syntax elements.

| Syntax element | condL | condA | ctxSetIdx |
|---|---|---|---|
| alf_ctb_flag[ x0 ][ y0 ][ cIdx ] | alf_ctb_flag[ xNbL ][ yNbL ][ cIdx ] | alf_ctb_flag[ xNbA ][ yNbA ][ cIdx ] | cIdx |
| qt_split_cu_flag | cqtDepth[ xNbL ][ yNbL ] > cqtDepth | cqtDepth[ xNbA ][ yNbA ] > cqtDepth | ( cqtDepth < 2 ) ? 0 : 1 |
| mtt_split_cu_flag treeType = = DUAL_TREE_CHROMA | cbHeight[ xNbL ][ yNbL ] < cbHeight | cbHeight[ xNbA ][ yNbA ] < cbWidth | 3 |
| mtt_split_cu_flag treeType ! = DUAL_TREE_CHROMA | cbHeight[ xNbL ][ yNbL ] < cbHeight | cbHeight[ xNbA ][ yNbA ] < cbWidth | ( sizeC > sizeTh2 ) ? 0 : ( ( sizeC > sizeTh1 ) ? 1 : 2 ) |
| cu_skip_flag[ x0 ][ y0 ] | cu_skip_flag[ xNbL ][ yNbL ] | cu_skip_flag[ xNbA ][ yNbA ] | 0 |
| amvr_mode[ x0 ][ y0 ] | amvr_mode[ xNbL ][ yNbL ] | amvr_mode[ xNbA ][ yNbA ] | 0 |
| merge_subblock_flag[ x0 ][ y0 ] | merge_subblock_flag[ xNbL ][ yNbL ] \|\| inter_affine_flag[ xNbL ][ yNbL ] | merge_subblock_flag[ xNbA ][ yNbA ] \|\| inter_affine_flag[ xNbA ][ yNbA ] | 0 |
| merge_triangle_flag[ x0 ][ y0 ] | merge_triangle_flag[ xNbL ][ yNbL ] | merge_triangle_flag[ xNbA ][ yNbA ] | 0 |
| inter_affine_flag | merge_subblock_flag[ xNbL ][ yNbL ] | merge_subblock_flag[ xNbA ][ yNbA ] | 0 |

TABLE 9-11-continued

Specification of ctxInc using left and above syntax elements.

| Syntax element | condL | condA | ctxSetIdx |
|---|---|---|---|
| [ x0 ][ y0 ] | [ yNbL ] || inter_affine_flag[ xNbL ][ yNbL ] | [ yNbA ] || inter_affine_flag[ xNbA ][ yNbA ] | |

2.4 Improved Context for Prediction Mode Flag

Figure 43:
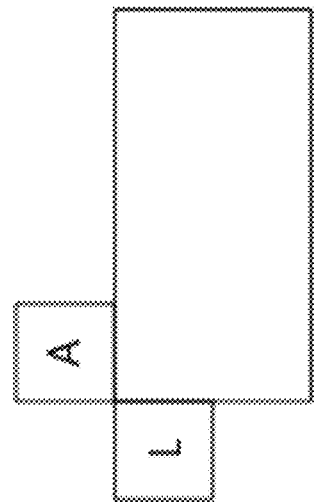
FIG. 43 shows an example of neighboring blocks used for deriving context of a pred_mode_flag.

In VVC Draft 3, the prediction mode flag, i.e., pred_mode_flag, is coded using only one context. In some embodiments, the context for coding pred_mode_flag of current block is derived using the value of pred_mode_flag of neighboring blocks. As described in FIG. 43, the context value is incremented by 1 if above (A) or left (L) block is coded by intra prediction mode, so the number of contexts is increased by 2 for coding pred_mode_flag.

In VTM-3.0, the combined merge and inter prediction mode, namely inter-intra mode, is also enabled. Therefore, it becomes a question whether inter-intra mode should be considered as intra mode or inter mode when using a neighboring block for the context derivation. In this contribution, different solutions are tested to get a conclusion.

In some embodiments, for deriving the context used for coding pred_mode_flag, four different methods are tested, as described below.

TABLE 1

Description of the different methods for context derivation of pred_mode_flag

| | Description of context (ctx) derivation |
|---|---|
| Method #1 (3 contexts) | ctx = A is intra ? 1 : 0<br>ctx += L is intra ? 1 : 0 |
| Method #2 (2 contexts) | ctx = (A is intra) || (L is intra) ? 1 : 0 |
| Method #3 (3 contexts) | ctx = A is intra or inter-intra ? 1 : 0<br>ctx += L is intra or inter-intra ? 1 : 0 |
| Method #4 (2 contexts) | ctx = (A is intra or inter-intra) || (L is intra or inter-intra) ? 1 : 0 |

3. EXAMPLES OF PROBLEMS SOLVED BY EMBODIMENTS

In the design of triangle partition, one block could be split to two partitions. To save memory bandwidth due to motion compensation, it is required that the two partitions shall be uni-predicted. During the motion compensation process, bi-prediction is used for the diagonal edge and uni-prediction is used for all other remaining parts. If bi-prediction is allowed for each partition, then samples located at the diagonal edge will have four MVs with two of them from one partition and two of them from another partition. Such a design has the following problems:

When constructing the TPM list, the sub-block merge candidates are not utilized to derive TPM candidates, only non-subblock merge candidates derived from spatial and temporal blocks are utilized.

Sub-block based method is disallowed for triangle partition.

The restriction of only allowing uni-prediction for non-diagonal edge may result in less coding efficiency.

DMVR, BIO interaction with triangle partitions.

Two partitions are allowed to select different TPM candidate indices, however, it couldn't be sure whether the two TPM candidates are from the same regular motion candidate. For example, one bi-direction regular motion candidate may be used to derive two TPM candidates, and each of them may be assigned to one partition. In this case, the two partitions may use the same bi-prediction regular motion candidate as the non-TPM mode which may be less efficient.

TPM is disabled when block width*height is smaller than 64. However, for a block with size equal to 4×16 or 16×4 and 4:2:0 color format, it will result in 2×8 chroma block with TPM enabled which increases the hardware complexity.

Several new tools in VTM3.0, including MMVD, sub-block merge list, MHIntra (inter-intra) also called CIIP (combined inter-intra prediction) mode, TPM are treated as special merge modes. Therefore, there are 5 merge modes. A merge flag/skip flag is signalled before indications of the five merge modes. Therefore, to reach the original skip/merge mode, indication of MMVD/sub-block merge list/MHIntra (inter-intra)/TPM is decoded to be 0.

In context modeling of CABAC, neighboring elements from a different CTU row may be required, which needs additional line buffer to store elements from above CTU row.

For several syntax elements, the neighboring blocks used in context modeling are different from those that used for reconstruction blocks.

4. EXAMPLES OF EMBODIMENTS

The proposed methods could be applied to any of non-square/non-rectangular partitions, e.g., geometry partitions. In the following descriptions, we use 'triangular partition mode' to represent one as an example of the non-square/non-rectangular partition mode (TPM), and the motion vector prediction candidate inserted to TPM candidate list is named 'TPM candidates'. And the motion information associated with any previously coded blocks is named as 'regular motion candidate'. It should be noted other kinds of partitions may be also applicable.

The detailed techniques below should be considered as examples to explain general concepts. These techniques should not be interpreted in a narrow way. Furthermore, these techniques can be combined in any manner.

Figure 29:
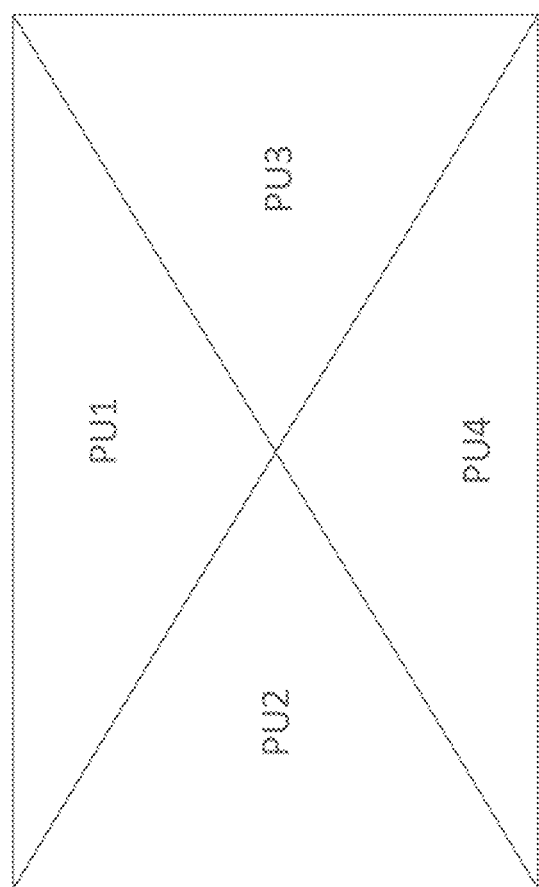
FIG. 29 shows an example of multiple geometry partitions within one block.

Extensions of TPM
1. It is proposed that one or multiple TPM candidates derived from sub-block candidates may be added to the TPM list.
   a. In one example, the TPM candidate may be derived from the ATMVP candidate.
   b. In one example, the TPM candidate may be derived from the affine candidate.
   c. For a sub-block candidate (e.g., ATMVP), it may include multiple sets of motion information and each set is corresponding to one sub-block (e.g., 8×8 for ATMVP, 4×4 for affine). One representative set may be treated as the regular motion candidate and it may be used to derive the TPM candidates.
  i. The representative set may be defined based on the sub-block position wherein the set of motion information is associated with. For example, the motion information associated with top-left, top-right, bottom-left, bottom-right sub-block of one block may be selected.
  ii. M representative sets may be selected, e.g., M is set to the number of partitions. In one example, the motion information associated with center sub-block of each partition may be selected.
2. It is proposed that the multiple partitions (e.g., 2 partitions in triangle partition design) may inherit from one single regular motion candidate.
  a. In one example, the range of indication of splitting patterns and selected merge indices for each partition may be extended. Suppose there are M splitting partitions, N allowed merge candidates, the range of the indication is defined as M*N*N instead of being equal M*N*(N−1) in the current triangular design.
  b. In one example, one flag may be firstly signaled to indicate whether multiple partitions are predicted from one single regular motion candidate.
  c. In one example, it is restricted that when multiple partitions are predicted from one single regular motion candidate, such a regular motion candidate shall be a bi-predicted motion candidate.
    i. Alternatively, furthermore, the two partitions may be assigned with List 0 motion information and List 1 motion information of the regular motion candidate, respectively.
    ii. Alternatively, furthermore, for samples located at the weighted area, the weighting factor group may be different from those used for the cases wherein two partitions are predicted from different motion candidates. In one example, average is always used.
  d. Such methods may be treated as an additional coding mode in addition to conventional AMVP or merge or TPM.
3. Motion vectors of each partition derived from bitstream may be further refined before being used to derive final prediction block of one TPM coded block.
  a. In one example, the DMVR technology may be applied with motion information of the two partitions as the whole block's motion information.
  b. In one example, BIO is applied after TPM prediction.
  c. In one example, if one partition is uni-predicted from LX and the other partition is bi-predicted or predicted from L(1−X), the DMVR or BIO technology may be applied by using motion information of the other partition in list L(1−X).
  d. In one example, refined motion information may be stored.
  e. In one example, if the partition is uni-predicted from LX, the refined motion information in LX may be stored.
  a. It is proposed that one or more partition(s) in TPM can be combined with intra-prediction. For example, the TPM prediction and intra-prediction are weighted summed to get the final prediction.
  f. It is proposed that one or more reference picture used in TPM can be the current picture.
4. It is proposed that sub-block based technology could be enabled for TPM coded blocks wherein each sub-block within one partition may be assigned with its own motion information.
  a. In one example, the sub-block based merge candidate may be added to the list for TPM coded blocks.
  b. In one example, affine mode may be enabled even when one block is coded with TPM.
  c. Alternatively, furthermore, it is restricted that uni-prediction is utilized for all sub-blocks except those located at the weighted area.
  d. Alternatively, furthermore, it is restricted that all reference pictures of different sub-blocks within one partition are the same.
  e. One or multiple TPM candidates may be derived from one ATMVP candidate, for example, each sub-block within one partition may inherit the motion information of List 0 motion information of the ATMVP candidates.
  f. The merge list for sub-block TPM coded blocks may check same spatial and/or temporal blocks used in the sub-block merge candidate list construction process.
5. When generalized bi-prediction is enabled, a bi-prediction regular motion candidate is further associated with two weighting factors. However, when using such a bi-prediction regular motion candidate to derive TPM candidates, it is proposed not to inherit the weighting factors.
  a. In one example, one TPM candidate is not associated with any weighting factor. Therefore, when deriving the prediction values of samples located at the non-weighted area, the motion compensated results are directly used. For samples located at the weighted area, the selected weighting factor group is utilized.
  b. Alternatively, the weighting factors are inherited. Alternatively, furthermore, when generating the final prediction values of samples located at the weighted area, one of the inherited weighting factor may be applied to the prediction value derived from the corresponding TPM candidate for a region.
6. It is proposed that bi-prediction may be enabled for samples not located at the weighted area of one TPM coded block.
  a. In one example, it is required that the two reference pictures are the same.
  b. In one example, for each partition, one reference picture may be assigned (e.g., following current design, could be either same or different for two partitions). Meanwhile, a third reference picture and motion vector may be further assigned.
7. It is proposed that multi-hypothesis may be applied to TPM coded blocks.
  a. In one example, one first final prediction block using current design may be firstly generated. Based on another reference picture and motion vector, a second prediction block is also generated with uni-prediction. And the final prediction block of one block is derived from the first final prediction block and a second prediction block.
  b. Alternatively, one first final prediction block using current design may be firstly generated. Based on two additional reference pictures and motion vectors, a second prediction block is also generated with bi-prediction. And the final prediction block of one block is derived from the first final prediction block and a second prediction block.

c. Alternatively, for each partition, bi-prediction or multi-hypothesis prediction is firstly applied. Then for the weighted area, weighted results of prediction blocks due to bi/multi-hypothesis prediction are used as the final prediction values.
8. OBMC may be disabled when TPM is enabled for one block.
   a. Alternatively, OBMC is disabled for samples located at the weighted area, but may be enabled for samples located at non-weighted area.
9. One block may be split to more than 2 non-square/non-triangular partitions.
   a. One block may be split to four non-square/non-triangular partitions. In one example, an example is depicted as FIG. 29.
   b. When there are more than 2 non-square/non-triangular partitions, it is restricted to be only two of them could be inter-coded.
   c. For samples located around the edges of two neighboring partitions, blending (e.g., weighted average of two prediction blocks) may be applied.
      FIG. 29 shows an example of multiple geometry partitions within one block.

Signaling of Side Information Required by TPM

Figure 30:
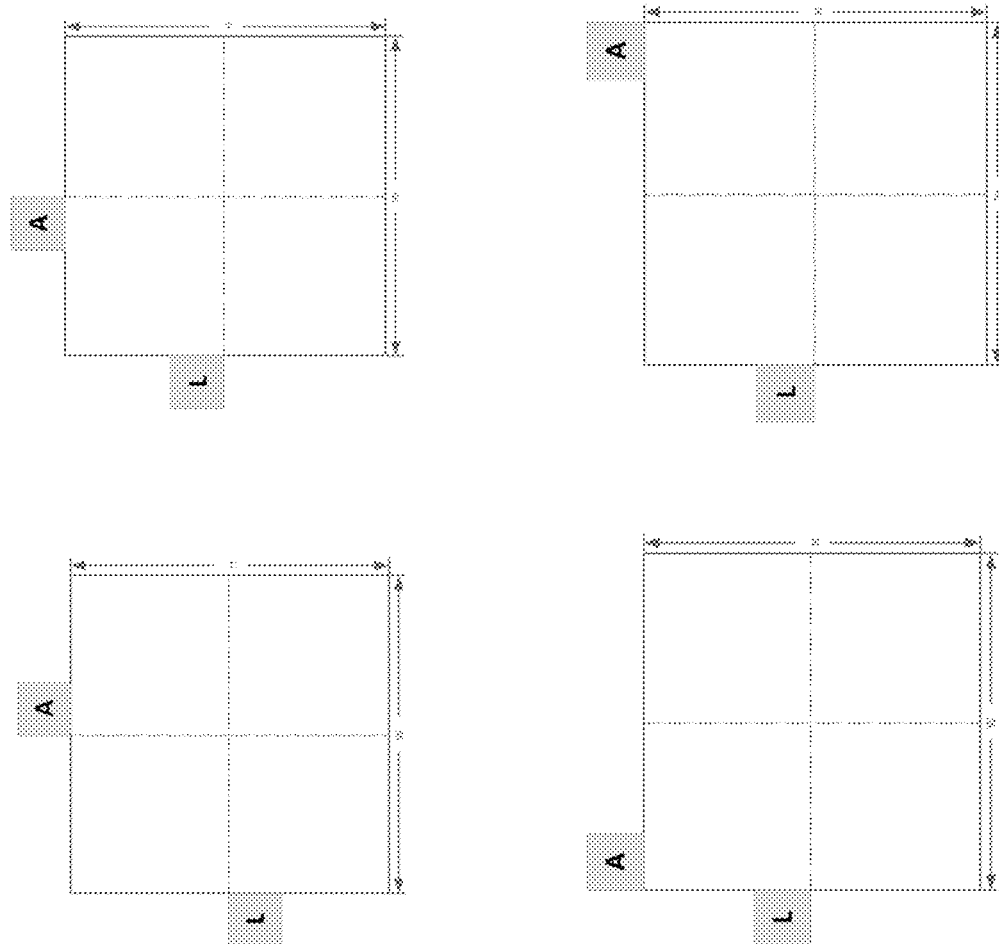
FIG. 30 shows examples of neighboring blocks used for context selection of a TPM flag.

10. The mapping between the splitting patterns, two merge indices and coded value (e.g., g_TriangleCombination) may be adaptively changed from sequence to sequence, picture to picture, tile to tile, slice to slice, CTU to CTU, block to block.
    a. In one example, the mapping may depend on the constructed merge candidate list.
    b. In one example, the mapping may depend on the coded mode associated with merge candidates.
11. Indication flag of TPM usage may be coded before the merge flag. That is, TPM may be also enabled for non-merge mode.
    a. Alternatively, furthermore, the merge flag may not be signalled if the block is TPM coded.
    b. Alternatively, furthermore, a merge flag may be further signalled if the block is inter coded (e.g., to indicate it is AMVP or merge mode).
    c. TPM may be allowed only for non-skip mode.
12. Indication flag of TPM usage may be coded if one block is coded with AMVP mode.
    a. Alternatively, furthermore, the TPM flag may not be signalled if one block is coded with merge mode.
    b. Alternatively, furthermore, the TPM usage flag may be inherited from spatial or temporal neighboring or non-adjacent blocks.
13. The splitting pattern may be inherited from spatial neighboring blocks.
    a. Alternatively, the splitting pattern may be inherited from temporal blocks.
    b. In one example, the splitting pattern is stored together with motion information. For each TPM candidate derived from one regular motion candidate, the splitting pattern associated with the regular motion candidate is also inherited.
       i. In this case, a TPM coded block may inherit both motion information (or encoding mode) and split pattern from a neighboring TPM coded block.
14. It is proposed that the splitting patterns and merge indices used for geometry partitions may be signaled separately.
    a. In one example, one bit flag may be coded separately to indicate the TPM splitting pattern.
       i. TPM splitting pattern of neighbouring blocks can be used to derive the context to code the bit.
    b. In one example, multiple merge indices for each partitions may be coded separately.
       i. Alternatively, furthermore, prediction among merge indices of different partition may be utilized.
    c. In one example, the coding of merge index may be dependent on the coded one bit flag for the splitting pattern.
    d. Alternatively, merge indices may be firstly coded (either jointly or separately), and the one bit flag for the splitting pattern may be coded dependent on the merge indices.
15. It is proposed to use bypass coding for the indication flag of TPM usage.
    a. Alternatively, the flag is still coded with contexts, however, the context is dependent on block width/height.
    b. Alternatively, the flag is still coded with contexts, however, the context is dependent on coded depth (e.g., quad-tree depth, binary tree and/or triple tree depth).
    c. Alternatively, the flag is still coded with contexts, however, the context is dependent on block width/height, such as block shape (e.g., square or non-square) and/or ratios between block width and heights (e.g., equal to 1, equal to ¼ or 4, equal to ½ or 2).
    d. Alternatively, the flag is still coded with contexts, however, the context is dependent on coded information of neighboring blocks which are not always next to the top-left position within one block. Denotes the block width and height by W and H, respectively, and (0, 0) is coordinate of the top-left sample within current block.
       i. In one example, the above neighboring blocks may be defined as (W/2, −1), (W/2−1, −1), (W−1, −1).
       ii. In one example, the left neighboring blocks may be defined as (−1, H/2), (−1, H/2−1), (−1, H−1).
       iii. Some combinations of above and left neighboring blocks which may be used in the context selection are depicted in FIG. 30.
       iv. In one example, only above neighboring blocks may be selected. Alternatively, furthermore, such case is enabled when the ratio between block's width and height is larger than a threshold, such as 1 or 2.
       v. In one example, only left neighboring blocks may be selected. Alternatively, furthermore, such case is enabled when the ratio between block's height and width is larger than a threshold, such as 1 or 2.
          FIG. 30 shows examples of neighboring blocks used for context selection of a TPM flag. The top-left example (a) is (W/2, −1) and (−1, H/2). The top-right example (b) is (W/2−1, −1) and (−1, H/2−1). The bottom-left example (c) is (0, −1) and (−1, H/2−1). The bottom-right example (d) is (W−1, −1) and (−1, H/2−1).
16. When two candidate indices (e.g., a0 and a1, b0 and b1) in the TPM list are jointly coded (or further joined with other information), the codeword may be adaptively changed from block to block, from CTU to CTU, from tile to tile, from picture to picture, from sequence to sequence.

a. In one example, the codeword may be assigned based on whether the two TPM candidates associated with the two indices are from the same regular motion candidate.
  i. In one example, the codeword C(a0, a1) may be smaller than C(b0, b1), if the following happens:
    1. The TPM candidate with index equal to a0 and the TPM candidate with index equal to a1 are derived from different regular motion candidate, and the TPM candidate with index equal to b0 and the TPM candidate with index equal to b1 are derived from same regular motion candidate.
b. In one example, the codeword may be assigned based on whether the two TPM candidates associated with the two indices are from the same prediction direction (or reference picture list).
  i. In one example, the codeword C(a0, a1) may be smaller than C(b0, b1), if the following happens:
    1. The TPM candidate with index equal to a0 and the TPM candidate with index equal to a1 are from two prediction directions, and the TPM candidate with index equal to b0 and the TPM candidate with index equal to b1 are from the same prediction direction.
17. The two partitions split in TPM can be coded with different modes.
  a. In one example, one is intra-coded and the other is inter-coded.
  b. In another example, one is merge-coded, the other is AMVP coded.

Enabling of TPM

18. TPM may be automatically disabled for a color component without TPM usage flag signaled.
  a. In one example, for chroma blocks, if either width or height is smaller or equal to a threshold (e.g., 2).
19. TPM may be disabled for a block with size equal to N×M or L×N (e.g., N is equal to 4).
  a. In one example, M and N are set to 8, 16.
  b. Alternatively, furthermore, it is disabled when color format is equal to 4:2:0.
  c. In one example, when a block with either width or height or both width and height are both larger than (or equal to) a threshold L, TPM may be disabled.
    vi. In one example, L is 64.
  d. In one example, when a block with either width or height or both or width and height, are both smaller than (or equal to) a threshold L, the above method may be disabled.
    vii. In one example, L is 4 or 8.
  e. In one example, it is disabled when width/height or height/width is larger than a threshold L, for example, L is 16.
  f. The threshold L may be pre-defined or signaled in SPS/PPS/picture/slice/tile group/tile level.
  g. Alternatively, the thresholds may depend on certain coded information, such as block size, picture type, temporal layer index, etc. al.
20. TPM may be enabled and disabled for different color components for one block.
  a. In one example, for a luma block size equal to N×M or L×N (e.g., N is equal to 4), TPM may be enabled for this luma block, however, it may be disabled for the chroma block, e.g., for 4:2:0 color format.
  b. In one example, if it is disabled for one color component, the associated prediction block may be derived based on motion information or prediction mode of one partition, for example, the first partition.
  c. In one example, if it is disabled for one color component, the associated prediction block may be directly derived based on motion information of two partitions.
    viii. In one example, the motion information of two partitions may be formed to a bi-prediction motion vectors, e.g., Mv1 for $1^{st}$ partition and Mv2 for $2^{nd}$ partition have motion vectors from different directions.
    ix. In one example, the motion information of two partitions may be formed to a uni-prediction motion vectors, e.g., Mv1 for $1^{st}$ partition and Mv2 for $2^{nd}$ partition have motion vectors from same directions, one motion vector of partition A may be scaled to the other reference picture of partition B, and the average of motion vector of partition B and scaled MV of partition A may be used.
    x. In one example, the motion information of two partitions may be formed to a bi-prediction motion vectors, e.g., Mv1 for $1^{st}$ partition and Mv2 for $2^{nd}$ partition have motion vectors from same directions, one motion vector of partition A may be scaled to another reference picture in another direction, and the motion vector of partition B and scaled MV of partition A may be used.
    xi. In above example, the motion information may be further scaled based on the color format.
21. For above mentioned methods, whether and/or how to enable them may be signaled in SPS/PPS/VPS/picture header/slice header/tile group header/CTU rows/group of CTUs/regions.
  a. In one example, when a block with either width or height or both width and height are both larger than (or equal to) a threshold L, or width*height, the above method may be disabled.
    i. In one example, L is 64, 4096.
  b. In one example, when a block with either width or height or both or width and height, or, or width*height are both smaller than (or equal to) a threshold L, the above method may be disabled.
    i. In one example, L is 4 or 8, 64.
  c. The threshold L may be pre-defined or signaled in SPS/PPS/picture/slice/tile group/tile level.
  d. Alternatively, the thresholds may depend on certain coded information, such as block size, picture type, temporal layer index, etc. al.
  e. In one example, whether to apply TPM depends on block width/height such as shape (e.g., it is square or non-square) and/or ratios between block width and heights (e.g., 1, ¼ or 4, ½ or 2).
  f. It is proposed to treat TPM as a different mode from skip/merge mode. Therefore, when TPM is enabled for one block, the associated merge flag is signalled to be false.
22. It is proposed to treat TPM as a different mode from skip/merge mode. Therefore, when TPM is enabled for one block, the associated merge flag is signalled to be false.
23. It is proposed to MHIntra as a different mode from skip/merge mode. Therefore, when MHIntra is enabled for one block, the associated merge flag is signalled to be false.
24. It is proposed to sub-block merge list as a different mode from skip/merge mode. Therefore, when subblock merge list is enabled for one block, the associated merge flag is signalled to be false.

25. For methods of bullets 22-24, when one block is decoded to be a merge/skip mode, the signalling of indications of TPM/MHIntra/sub-block merge list is skipped and inferred to be false.

26. It is proposed that the coding order of indications of usage of TPM/MHIntra/sub-block merge list/MMVD is as follows:
   a. MMVD, sub-block merge list, TPM, MHIntra
   b. MMVD, sub-block merge list, MHIntra, TPM
   c. Other kinds of orders.

27. It is proposed that the coding order of indications of usage of TPM/MHIntra/sub-block merge list/MMVD may be different from one video unit to another video unit, such as block/CU/PU/CTU/LCU row/region/slice/picture/sequence.
   a. In one example, the order may depend on the low delay check flag.
   b. In one example, the order may depend on previously coded information.
   c. In one example, the order may depend on one block's dimension.

28. To save the line buffer size, when using neighboring block's AMVR information (i.e., MV precision) for coding the AMVR information of current block, if the neighboring block is located in a different LCU row, the neighboring block is marked as unavailable.
   a. In one example, the associated AMVR information is set to a default value, i.e., ¼-pel.
   b. Alternatively, the neighboring block is treated as those located in a different slice/tile.
   c. In one example, if the neighboring block is located in a different region (e.g., video processing data unit which is typically set to 64×64), such block is treated in the same way as mentioned above.

29. To save the line buffer size, when using neighboring affine-coded block's AMVR information (i.e., MV precision) for coding the AMVR information of current affine-coded block, if the neighboring block is located in a different LCU row, the neighboring affine-coded block is marked as unavailable.
   a. In one example, the associated AMVR information is set to a default value, i.e., ¼-pel.
   b. Alternatively, the neighboring affine-coded block is treated as those located in a different slice/tile.
   c. In one example, if the neighboring affine-coded affine-coded block is located in a different region (e.g., video processing data unit which is typically set to 64×64), such block is treated in the same way as mentioned above.

30. It is also proposed to disable the usage of utilizing a neighboring block's information for context modeling if the neighboring block is in a different LCU row. Alternatively, only one context is used for coding a syntax element mentioned below. Alternatively, bypass coding is applied for coding a syntax element mentioned below.
   a. The information includes the alf_ctb_flag.
   b. The information includes the qt_split_cu_flag.
   c. The information includes the mtt_split_cu_flag.
   d. The information includes the mtt_split_cu_flag.
   e. The information includes the cu_skip_flag
   f. The information includes the amvr_mode
   g. The information includes the merge_subblock_flag
   h. The information includes the merge_triangle_flag
   i. The information includes the inter_affine_flag
   j. The information may further includes: cu_skip_flag, pred_mode_flag, pcm_flag, intra_luma_ref_idx, intra_luma_mpm_flag, intra_luma_mpm_idx, intra_luma_mpm_remainder, intra_chroma_pred_mode, merge_flag, inter_pred_idc, inter_affine_flag, cu_affine_type_flag, ref_idx_l0, mvp_l0_flag, ref_idx_l1 mvp_l1_flag, amvr_flag, amvr_4pel_flag, gbi_idx, cu_cbf, mmvd_flag, mmvd_merge_flag, etc.

Simplification of CABAC Context Modeling

Figure 42:
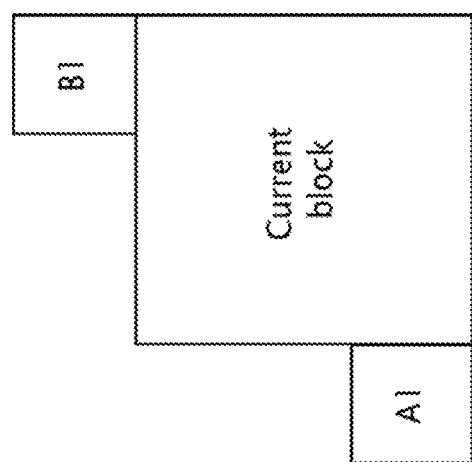
FIG. 42 shows an example of a neighboring element used in context modeling.

31. It is proposed that the used neighboring information in context modeling may be only from those blocks which are used to decode the current block.
   a. In one example, for the cu_skip_flag, instead of using the information of the two neighboring blocks denoted by A3 and B3 in FIG. 25, two other blocks (such as A1 and B1) in FIG. 42 may be utilized.
   b. Alternatively, furthermore, when the neighboring blocks are outside the current CTU/CTU row/region/video data processing unit or other video units such as slice/tile/tile groups/picture boundary, neighboring information from such neighboring blocks are disallowed to be utilized in the parsing process.
   c. Alternatively, furthermore, when the neighboring blocks are outside the current CTU/CTU row/region/video data processing unit or other video units such as slice/tile/tile groups/picture boundary, neighboring information from such neighboring blocks may be treated as unavailable and utilized in the parsing process.
   d. Alternatively, furthermore, when the neighboring blocks are outside the current CTU/CTU row/region/video data processing unit or other video units such as slice/tile/tile groups/picture boundary, neighboring information from such neighboring blocks may be set to default values and utilized in the parsing process.
   e. Alternatively, furthermore, when the neighboring blocks are outside the current CTU/CTU row/region/video data processing unit or other video units such as slice/tile/tile groups/picture boundary, neighboring information from other one or more neighboring blocks that are in the current CTU/CTU row/region/video data processing unit or other video units such as slice/tile/tile groups/picture boundary, may be utilized in the parsing process as a replacement.

32. It is proposed that the used neighboring information (such as neighboring block's syntax elements (Abbreviated as neighboring elements)) in context modeling may be from some predefined neighboring positions for all syntax elements that rely on neighboring blocks' coded information. In one example, such neighbouring positions may be also accessed during the reconstruction process of one block.
   a. In one example, neighboring elements from A1 and B1 in FIG. 2 are used in context modeling for all syntax elements.
   b. In one example, neighboring elements from A0 and B0 in FIG. 2 are used in context modeling for all syntax elements.
   c. In one example, neighboring elements from A1 and B2 in FIG. 2 are used in context modeling for all syntax elements.
   d. In one example, neighboring elements from A0 and B1 in FIG. 2 are used in context modeling for all syntax elements.

e. In one example, neighboring elements from A0 and B2 in FIG. 2 are used in context modeling for all syntax elements.
f. In one example, neighboring elements from A0 and A1 in FIG. 2 are used in context modeling for all syntax elements.
g. In one example, neighboring elements from A1 and B0 in FIG. 2 are used in context modeling for all syntax elements.
h. In one example, neighboring elements from B0 and B1 in FIG. 2 are used in context modeling for all syntax elements.
i. In one example, neighboring elements from B0 and B2 in FIG. 2 are used in context modeling for all syntax elements.
j. In one example, neighboring elements from B1 and B2 in FIG. 2 are used in context modeling for all syntax elements.
k. In one example, only 1 neighboring element is used in context modeling for all syntax elements.
33. It is proposed that neighboring elements from a neighbouring block in a CTU row or CTU different to the current CTU row or CTU may be not used in context modeling.
   a. Alternatively, neighboring elements from a neighbouring block in a CTU row or CTU different from the current CTU row or CTU may be not used in context modeling.
   b. In one example, if a neighboring element is from a neighbouring block in a CTU row or CTU different to the current CTU row or CTU, it is considered as unavailable.
   c. In one example, if a neighboring element is from a neighbouring block in a CTU row or CTU different from the current CTU row or CTU, a default value is used.
   d. In one example, if a neighboring element is from a neighbouring block in a CTU row or CTU different from the current CTU row or CTU, it should be replaced as another neighboring element is from another neighbouring block in a CTU row or CTU different from the current CTU row or CTU.
   e. In one example, if a neighboring element is from a neighbouring block in a CTU row or CTU different from the current CTU row or CTU, N (N>0) alternative neighboring elements which are within the same CTU row or CTU may be further checked in order until one available neighboring element is found, or all N neighboring elements are unavailable. For example, N may be equal to 1, 2, 3, or 4.
34. Proposed method may be applied only to some syntax elements, such as alf_ctb_flag, qt_split_cu_flag, mtt_split_cu_flag, cu_skip_flag, amvr_mode, inter_affine_flag, merge_triangle_flag and merge_subblock_flag, cu_skip_flag, pred_mode_flag, pcm_flag, intra_luma_ref_idx, intra_luma_mpm_flag, intra_luma_mpm_idx, intra_luma_mpm_remainder, intra_chroma_pred_mode, merge_flag, inter_pred_idc, inter_affine_flag, cu_affine_type_flag, ref_idx_10, mvp_10_flag, ref_idx_11 mvp_11_flag, amvr_flag, amvr_4pel_flag, gbi_idx, cu_cbf, mmvd_flag, mmvd_merge_flag, pred_mode_flag, etc.
   a. In one example, the context modeling of pred_mode_flag is derived from the following methods:

| | Description of context (ctx) derivation |
|---|---|
| Method #1 (3 contexts) | ctx = A1 is intra ? 1 : 0<br>ctx += B1 is intra ? 1 : 0 |
| Method #2 (2 contexts) | ctx = (A1 is intra) \|\| (B1 is intra) ? 1 : 0 |
| Method #3 (3 contexts) | ctx = A1 is intra or inter-intra ? 1 : 0<br>ctx += B1 is intra or inter-intra ? 1 : 0 |
| Method #4 (2 contexts) | ctx = (A1 is intra or inter-intra) \|\| (B1 is intra or inter-intra) ? 1 : 0 | b. Alternatively, the context modeling of pred_mode_flag may be derived from other neighboring blocks instead of A1 and/or B1, such as A2/B3 or A0/B0 in FIG. 25.
   c. The above syntax pred_mode_flag may be replaced by other kinds of syntax elements.
   d. In one example, if one neighbouring block is unavailable, it is treated as inter-coded when deriving the context;
   e. In one example, if one neighbouring block is unavailable, it is treated as intra-coded when deriving the context;
   f. In one example, if one neighbouring block is unavailable, it is treated as inter-intra-coded when deriving the context;
   g. In one example, if one neighbouring block is not in the same CTU row as the current block, it is treated as inter-coded when deriving the context;
   h. In one example, if one neighbouring block is not in the same CTU row as the current block, it is treated as intra-coded when deriving the context;
   i. In one example, if one neighbouring block is not in the same CTU row as the current block, it is treated as inter-intra-coded (also known as combined intra-inter prediction mode) when deriving the context;

5. ADDITIONAL EMBODIMENT EXAMPLES 5.1 Embodiment #1

Examples of signalling TPM as a different mode from merge mode are given as follows. The newly added parts are highlighted in boldface italics, and the deleted part is marked with UPPER CASE.

7.3.4.6 Coding Unit Syntax

| | Descriptor |
|---|---|
| coding_unit( x0, y0, cbWidth, cbHeight, treeType ) { | |
|   if( slice_type != I ) { | |
|     *cu_skip_flag* [ x0 ][ y0 ] | ae(v) |
|     if( cu_skip_flag[ x0 ][ y0 ] = = 0 ) | |
|       *pred_mode_flag* | ae(v) |
| } | |

|  | Descriptor |
|---|---|
| if( CuPredMode[ x0 ][ y0 ] = = MODE_INTRA ) { | |
| ... | |
| } else { /* MODE_INTER */ | |
|   if( cu_skip_flag[ x0 ][ y0 ] = = 0 ) { | |
|     merge_flag [ x0 ][ y0 ] | ae(v) |
|   if( merge_flag[ x0 ][ y0 ] ) { | |
|     merge_data( x0, y0, cbWidth, cbHeight ) | |
|   } else { | |
|     ***if( sps_triangle_enabled_flag && slice_type = = B && cbWidth * cbHeight >= 16 )*** | |
|       *merge_triangle_flag[ x0 ][ y0 ]* | *ace(v)* |
|     *if( merge_triangle_flag[ x0 ][ y0 ] )* | |
|       *merge_triangle_idx[ x0 ][ y0 ]* | *ace(v)* |
|     *else {* | |
|       if( slice_type = = B ) | |
|         inter_pred_idc [ x0 ][ y0 ] | ae(v) |
|       if( sps_affine_enabled_flag && cbWidth >= 16 && cbHeight >= 16 ) { | |
|         inter_affine_flag [ x0 ][ y0 ] | ae(v) |
|         if( sps_affine_type_flag && inter_affine_flag[ x0 ][ y0 ] ) | |
|           cu_affine_type_flag [ x0 ][ y0 ] | ae(v) |
|       } | |
|       if( inter_pred_idc[ x0 ][ y0 ] != PRED_L1 ) { | |
|         if( num_ref_idx_l0_active_minus1 > 0 ) | |
|           ref_idx_l0 [ x0 ][ y0 ] | ae(v) |
|         mvd_coding( x0, y0, 0, 0 ) | |
|         if( MotionModelIdc[ x0 ][ y0 ] > 0 ) | |
|           mvd_coding( x0, y0, 0, 1 ) | |
|         if(MotionModelIdc[ x0 ][ y0 ] > 1 ) | |
|           mvd_coding( x0, y0, 0, 2 ) | |
|         mvp_l0_flag [ x0 ][ y0 ] | ae(v) |
|       } else { | |
|         MvdL0[ x0 ][ y0 ][ 0 ] = 0 | |
|         MvdL0[ x0 ][ y0 ][ 1 ] = 0 | |
|       } | |
|       if( inter_pred_idc[ x0 ][ y0 ] != PRED_L0 ) { | |
|         if( num_ref_idx_l1_active_minus1 > 0 ) | |
|           ref_idx_l1 [ x0 ][ y0 ] | ae(v) |
|         if( mvd_l1_zero_flag && inter_pred_idc[ x0 ][ y0 ] = = PRED_BI ) { | |
|           MvdL1[ x0 ][ y0 ][ 0 ] = 0 | |
|           MvdL1[ x0 ][ y0 ][ 1 ] = 0 | |
|           MvdCpL1[ x0 ][ y0 ][ 0 ][ 0 ] = 0 | |
|           MvdCpL1[ x0 ][ y0 ][ 0 ][ 1 ] = 0 | |
|           MvdCpL1[ x0 ][ y0 ][ 1 ][ 0 ] = 0 | |
|           MvdCpL1[ x0 ][ y0 ][ 1 ][ 1 ] = 0 | |
|           MvdCpL1[ x0 ][ y0 ][ 2 ][ 0 ] = 0 | |
|           MvdCpL1[ x0 ][ y0 ][ 2 ][ 1 ] = 0 | |
|         } else { | |
|           mvd_coding( x0, y0, 1, 0 ) | |
|           if( MotionModelIdc[ x0 ][ y0 ] > 0 ) | |
|             mvd_coding( x0, y0, 1, 1 ) | |
|           if(MotionModelIdc[ x0 ][ y0 ] > 1 ) | |
|             mvd_coding( x0, y0, 1, 2 ) | |
|           mvp_l1_flag [ x0 ][ y0 ] | ae(v) |
|       } else { | |
|         MvdL1[ x0 ][ y0 ][ 0 ] = 0 | |
|         MvdL1[ x0 ][ y0 ][ 1 ] = 0 | |
|       } | |
|       if( sps_amvr_enabled_flag && inter_affine_flag = = 0 && | |
|         ( MvdL0[ x0 ][ y0 ][ 0 ] != 0 \|\| MvdL0[ x0 ][ y0 ][ 1 ] != 0 \|\| | |
|           MvdL1[ x0 ][ y0 ][ 0 ] != 0 \|\| MvdL1[ x0 ][ y0 ][ 1 ] != 0 ) ) | |
|         amvr_mode [ x0 ][ y0 ] | ae(v) |
|       if( sps_gbi_enabled_flag && inter_pred_idc[ x0 ][ y0 ] = = PRED_BI && | |
|         cbWidth * cbHeight >= 256 ) | |
|         gbi_idx [ x0 ][ y0 ] | ae(v) |
|     } | |
|   } | |
| } | |
| if( !pcm_flag[ x0 ][ y0 ] ) { | |
|   if( CuPredMode[ x0 ][ y0 ] != MODE_INTRA && cu_skip_flag[ x0 ][ y0 ] = = 0 ) | |
|     cu_cbf | ae(v) |
|   if( cu_cbf ) | |
|     transform_tree( x0, y0, cbWidth, cbHeight, treeType ) | |
| } | |
| } | |

7.3.4.8 Merge Data Syntax

| | Descriptor |
|---|---|
| merge_data( x0, y0, cbWidth, cbHeight ) { | |
|   *mmvd_flag* [ x0 ] [ y0 ] | ae(v) |
|   if( mmvd_flag[ x0 ][ y0 ] = = 1 ) { | |
|     *mmvd_merge_flag* [ x0 ][ y0 ] | ae(v) |
|     *mmvd_distance_idx* [ x0 ][ y0 ] | ae(v) |
|     *mmvd_direction_idx* [ x0 ][ y0 ] | ae(v) |
|   } else { | |
|   if( MaxNumSubblockMergeCand > 0 && cbWidth >= 8 && cbHeight >= 8 ) | |
|     *merge_subblock_flag* [ x0 ][ y0 ] | ae(v) |
|   if( merge_subblock_flag[ x0 ][ y0 ] = = 1 ) { | |
|     if( MaxNumSubblockMergeCand > 1 ) | |
|       *merge_subblock_idx* [ x0 ][ y0 ] | ae(v) |
|   } else { | |
|     if( sps_mh_intra_enabled_flag && cu_skip_flag[ x0 ][ y0 ] = = 0 && | |
|       ( cbWidth * cbHeight) >= 64 && cbWidth < 128 && cbHeight < 128 ) { | |
|       *mh_intra_flag* [ x0 ] [ y0 ] | ae(v) |
|       if( mh_intra_flag[ x0 ][ y0 ] ) { | |
|         if ( cbWidth <= 2 * cbHeight  \|  \| cbHeight <= 2 * cbWidth ) | |
|           *mh_intra_luma_mpm_flag* [ x0 ][ y0 ] | ae(v) |
|         if( mh_mtra_luma_mpm_flag[ x0 ][ y0 ] ) | |
|           *mh_intra_luma_mpm_idx* [ x0 ][ y0 ] | ae(v) |
|       } | |
|     } | |
|     **IF( SPS_TRIANGLE_ENABLED_FLAG && SLICE_TYPE = = B && CBWIDTH * CBHEIGHT >= 16 )** | |
|       MERGE_TRIANGLE_FLAG[ X0 ][ Y0 ] | AE(V) |
|     IF( MERGE_TRIANGLE_FLAG[ X0 ][ Y0 ] ) | |
|       MERGE_TRIANGLE_IDX[ X0 ][ Y0 ] | AE(V) |
|     ~~else~~ if( MaxNumMergeCand > 1 ) | |
|       *merge_idx* [ x0 ][ y0 ] | ae(v) |
|   } | |
| } | |

5.2 Embodiment #2

In this embodiment, line buffer size is reduced for context modeling. The changes are highlighted as follows in boldface italics.

9.5.4.2.2 Derivation Process of ctxInc Using Left and Above Syntax Elements

Input to this process is the luma location (x0, y0) specifying the top-left luma sample of the current luma block relative to the top-left sample of the current picture, the colour component cIdx, the current coding quadtree depth cqDepth, and the width and the height of the current coding block in luma samples cbWidth and cbHeight.

Output of this process is ctxInc.

The location (xNbL, yNbL) is set equal to (x0−1, y0) and the variable availableL, specifying the availability of the block located directly to the left of the current block, is derived by invoking the availability derivation process for a block in z-scan order as specified in subclause 6.4 with the location (xCurr, yCurr) set equal to (x0, y0) and the neighbouring location (xNbY, yNbY) set equal to (xNbL, yNbL) as inputs, and the output is assigned to availableL.

The location (xNbA, yNbA) is set equal to (x0, y0−1) and the variable availableA specifying the availability of the coding block located directly above the current block, is derived by invoking the availability derivation process for a block in z-scan order as specified in subclause 6.4 with the location (xCurr, yCurr) set equal to (x0, y0) and the neighbouring location (xNbY, yNbY) set equal to (xNbA, yNbA) as inputs, and the output is assigned to availableA.

The availableA is reset to false if (x0, y0−1) is in a different LCU row compared to (x0, y0).

The variables sizeC, sizeTh2 and sizeTh1 are derived as follows:

$$\text{size}Th2 = (\text{Max}BtSizeY == 128)?1024:((\text{Max}BtSizeY == 64)?512:256) \qquad (9\text{-}19)$$

$$\text{size}Th1 = (\text{Max}BtSizeY == 128)?128:64 \qquad (9\text{-}20)$$

$$\text{size}C = cb\text{Width} * cb\text{Height} \qquad (9\text{-}21)$$

The assignment of ctxInc is specified as follows with condL and condA for the syntax elements alf_ctb_flag[x0][y0][cIdx], qt_split_cu_flag[x0][y0], mtt_split_cu_flag[x0][y0], cu_skip_flag[x0][y0], amvr_mode[x0][y0], inter_affine_flag[x0][y0], merge_triangle_flag[x0][y0] and merge_subblock_flag[x0][y0] specified in Table 9-11:

$$ctx\text{Inc} = (\text{cond}L \text{ \&\& available}L) + (\text{cond}A \text{ \&\& available}A) + ctx\text{Set}Idx * 3 \qquad (9\text{-}22)$$

TABLE 9-11

Specification of ctxInc using left and above syntax elements

| Syntax element | condL | condA | ctxSetIdx |
|---|---|---|---|
| alf_ctb_flag[ x0 ][ y0 ][ cIdx ] | alf_ctb_flag[ xNbL ][ yNbL ][ cIdx ] | alf_ctb_flag[ xNbA ][ yNbA ][cIdx ] | cIdx |
| qt_split_cu_flag | cqtDepth[ xNbL ][ yNbL ] > cqtDepth | cqtDepth[ xNbA ][ yNbA ] > cqtDepth | ( cqtDepth < 2) ? 0 : 1 |
| mtt_split_cu_flag | cbHeight[ xNbL ][ yNbL ] < cbHeight | cbHeight[ xNbA ][ yNbA ] < cbWidth | 3 |

TABLE 9-11-continued

Specification of ctxInc using left and above syntax elements

| Syntax element | condL | condA | ctxSetIdx |
|---|---|---|---|
| treeType == DUAL_TREE_CHROMA mtt_split_cu_flag treeType != DUAL_TREE_CHROMA | cbHeight[ xNbL ][ yNbL ] < cbHeight | cbHeight[ xNbA ][ yNbA ] < cbWidth | ( sizeC > sizeTh2 ) ? 0 : ( ( sizeC > sizeTh1 ) ? 1 : 2 ) |
| cu_skip_flag[ x0 ][ y0 ] | cu_skip_flag[ xNbL ][ yNbL ] | cu_skip_flag[ xNbA ][ yNbA ] | 0 |
| amvr_mode[ x0 ][ y0 ] | amvr_mode[ xNbL ][ yNbL ] | amvr_mode[ xNbA ][ yNbA ] | 0 |
| merge_subblock_flag[ x0 ][ y0 ] | merge_subblock_flag[ xNbL ][ yNb ] \| inter_affine_flag[ xNbL ][ yNbL ] | merge_subblock_flag[ xNbA ][ yNbA ] \| inter_affine_flag[ xNbA ] [yNbA ] | 0 |
| merge_triangle_flag[ x0 ][ y0 ] | merge_triangle_flag [ xNbL ][ yNbL ] | merge_triangle_flag [ xNbA ][ yNbA ] | 0 |
| inter_affine_flag [ x0 ][ y0 ] | merge_subblock_flag[ xNbL ] [ yNbL] \| inter_affine_flag[ xNbL][ yNbL ] | merge_subblock_flag[ xNbA ][ yNbA ] \| inter affine flag[ xNbA ][ yNbA ] | 0 |

Figure 31:
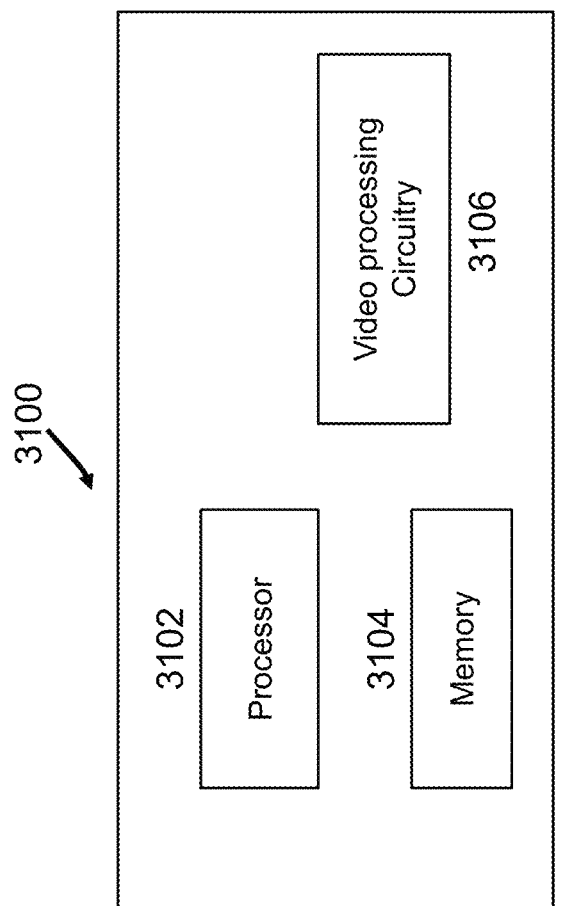
FIG. 31 is a block diagram of an example of a video processing apparatus.

FIG. 31 is a block diagram of a video processing apparatus 3100. The apparatus 3100 may be used to implement one or more of the methods described herein. The apparatus 3100 may be embodied in a smartphone, tablet, computer, Internet of Things (IoT) receiver, and so on. The apparatus 3100 may include one or more processors 3102, one or more memories 3104 and video processing hardware 3106. The processor(s) 3102 may be configured to implement one or more methods described in the present document. The memory (memories) 3104 may be used for storing data and code used for implementing the methods and techniques described herein. The video processing hardware 3106 may be used to implement, in hardware circuitry, some techniques described in the present document.

FIG. 33 is a flowchart for a method 3300 of processing a video. The method 3300 includes performing a determination (3305) that a first video block is partitioned to include a first prediction portion that is non-rectangular and non-square, adding (3310) a first motion vector (MV) prediction candidate associated with the first prediction portion to a motion candidate list associated with the first video block, wherein the first MV prediction candidate is derived from a sub-block based motion candidate, and performing (3315) further processing of the first video block using the motion candidate list.

FIG. 34 is a flowchart for a method 3400 of processing a video. The method 3400 includes partitioning (3405) a first video block to include prediction portions based on a first splitting pattern, the prediction portions associated with a first merge index and a first coded value, partitioning (3410) a second video block to include prediction portions based on a second splitting pattern, the prediction portions of the second video block associated with a second merge index and a second coded value, wherein the first coded value is equal to the second coded value, and one or more of the second splitting pattern or the second merge index of the second video block is different than the first video block based on the second video block being within a different sequence, picture, tile, slice, coding tree unit (CTU), or block than the first video block, and performing (3415) further processing of the first video block and the second video block.

FIG. 35 is a flowchart for a method 3500 of processing a video. The method 3500 includes identifying (3505) a characteristic of a first video block, determining (3510) a state of a geometric prediction mode to be applied to the first video block based on the characteristics, the state of geometric prediction mode being one of: an enable state to apply geometric prediction mode to the first video block, or a disable state to not apply geometric prediction mode to the first video block, and performing (3515) further processing of the first video block consistent with the state of the geometric prediction mode.

FIG. 36 is a flowchart for a method 3600 of processing video. The method 3600 includes performing a determination (3605) that a first video block is partitioned to include a first prediction portion and a second prediction portion, the first prediction portion and the second prediction portion being non-rectangular and non-square, adding (3610) a first MV prediction candidate associated with the first prediction portion and a second MV prediction candidate associated with the second prediction portion to a motion candidate list associated with the first video block, wherein the first MV prediction candidate and the second MV prediction candidate are derived from a single MV prediction candidate associated with a previously coded block, and performing (3615) further processing of the first video block using the motion candidate list.

FIG. 37 is a flowchart for a method 3700 of processing video. The method 3700 includes performing a determination, by a processor, that a first video block is partitioned to include a first prediction portion that is non-rectangular and non-square; adding a first motion vector (MV) prediction candidate associated with the first prediction portion to a motion candidate list associated with the first video block; modifying the first MV prediction candidate to refine the MV candidates used to derive a final prediction block for the first video block; and performing further processing of the first video block using the final prediction block.

FIG. 38 is a flowchart for a method 3800 of processing video. The method 3800 includes performing a determination (3805) that a first video block is partitioned to include a first prediction portion that is non-rectangular and non-square; adding (3810) a first motion vector (MV) prediction candidate associated with the first prediction portion to a motion candidate list associated with the first video block, and wherein the first MV prediction candidate is derived from a bi-prediction MV prediction candidate with weighting factors; and performing further processing (3815) of the first video block using the motion candidate list without the weighting factors.

FIG. 39 is a flowchart for a method 3900 of processing video. The method 3900 includes performing a determination (3905) that a first video block is partitioned to include a first prediction portion that is non-rectangular and non-square, and the first video block is coded consistent with TPM and multi-hypothesis; adding (3910) a first motion vector (MV) prediction candidate associated with the first prediction portion to a motion candidate list associated with the first video block; and performing (3915) further processing of the first video block using the motion candidate list.

Figure 40:
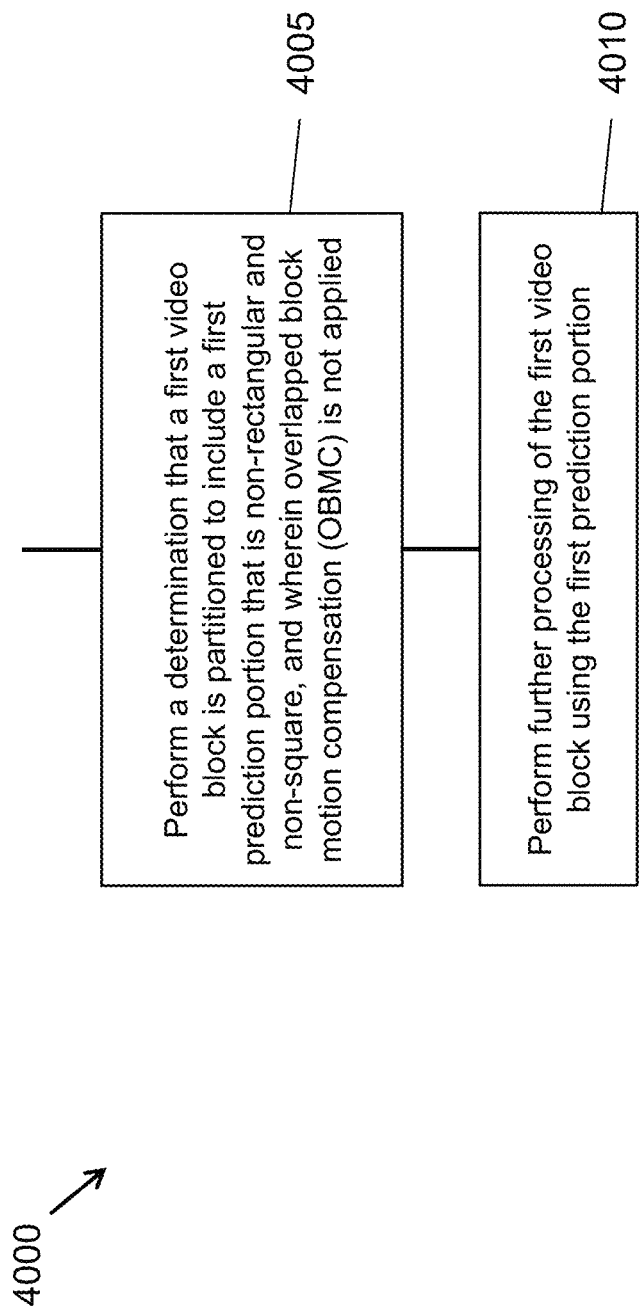

FIG. 40 is a flowchart for a method 4000 of processing video. The method 4000 includes performing a determination (4005) that a first video block is partitioned to include a first prediction portion that is non-rectangular and non-square, and wherein overlapped block motion compensation (OBMC) is not applied; and performing (4010) further processing of the first video block using the first prediction portion.

Figure 41:
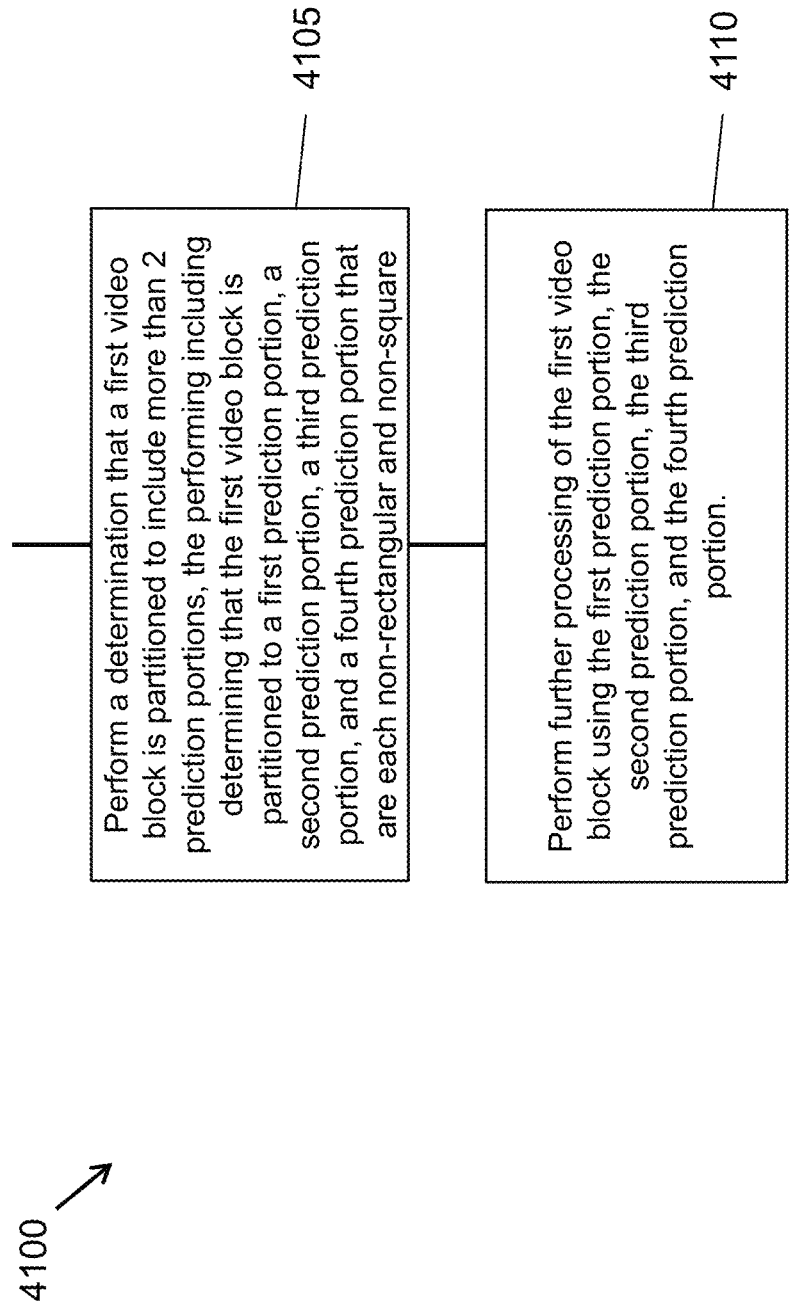

FIG. 41 is a flowchart for a method 4100 of processing video. The method 4100 includes performing a determination (4105) that a first video block is partitioned to include more than 2 prediction portions, the performing including determining that the first video block is partitioned to a first prediction portion, a second prediction portion, a third prediction portion, and a fourth prediction portion that are each non-rectangular and non-square; and performing (4110) further processing of the first video block using the first prediction portion, the second prediction portion, the third prediction portion, and the fourth prediction portion.

With reference to methods 3300, 3400, 3500, 3600, 3700, 3800, 3900, 4000, and 4100, some examples of determining a candidate for encoding and their use are described in Section 4 of the present document. For example, as described in Section 4, video blocks can be processed using prediction portions that are non-square and non-rectangular.

With reference to methods 3300, 3400, 3500, 3600, 3700, 3800, 3900, 4000, and 4100, a video block may be encoded in the video bitstream in which bit efficiency may be achieved by using a bitstream generation rule related to motion information prediction.

The methods can include wherein the first MV prediction candidate is derived from an alternative temporal motion vector prediction (ATMVP) candidate.

The methods can include wherein the first MV candidate is derived from an affine candidate.

The methods can include wherein the first MV prediction candidate added to the motion candidate list includes multiple sets of motion information, one of the multiple sets of motion information indicative of a regular motion candidate that is based on a previously coded video block, the regular motion candidate used to derive the first MV prediction candidate.

The methods can include wherein the multiple sets of motion information are based on a position of the first prediction portion within the first video block.

The methods can include wherein the first video block is partitioned to include M prediction portions including the first prediction portion, and a number of the multiple sets of motion information is M.

The methods can include wherein the first video block is also partitioned to include a second prediction portion that is non-rectangular and non-square, and wherein further processing the first video block using the motion candidate list includes using the first MV prediction candidate to process the first prediction portion and the second prediction portion.

The methods can include wherein a range of indication of splitting patterns for the first prediction portion and the second prediction portion is M*N*N, wherein M is a number of prediction portions that the first video block is partitioned into, and wherein N is a number of allowed merge candidates to be added to the motion candidate list.

The methods can include determining, by the processor, that a flag indicates that a single MV prediction candidate in the motion candidate list is to be used for the first prediction portion and the second prediction portion.

The methods can include herein each MV prediction candidate in the motion candidate list is a bi-predicted motion candidate based on the first prediction portion and the second prediction portion are based on separate MV prediction candidates.

The methods can include wherein the first video block is also partitioned to include a second prediction portion that is non-rectangular and non-square, and wherein the first prediction portion is assigned List 0 motion information, and wherein the second prediction portion is assigned List 1 motion information.

The methods can include wherein a weighting factor group is different for samples located at a weighted area based on the first prediction portion and the second prediction portion are predicted from different MV prediction candidates.

The methods can include wherein the methods are applied as an additional coding mode in addition to advanced motion vector prediction (AMVP), merge, or triangular partition mode (TPM).

The methods can include modifying the motion candidate list to refine the MV candidates used to derive a final prediction block for the first video block.

The methods can include wherein decoder-side motion vector refinement (DMVR) is applied with motion information of the first prediction partition and motion information of a second prediction partition of the first video block to derive motion information for the first video block.

The methods can include wherein bi-directional optical flow (BIO) is applied after TPM.

The methods can include wherein refined motion information is stored.

The methods may include the first prediction portion is a triangular shape, and the first prediction portion is combined with intra-prediction.

The methods can include wherein the first prediction portion is partitioned in accordance with TPM, and one or more reference pictures used in TPM is a current picture.

The methods can include wherein the first video block is partitioned to include the first prediction portion in accordance with TPM, wherein the first prediction portion is assigned motion information different than a second prediction portion of the first video block.

The methods can include wherein the motion candidate list includes merge candidates for TPM coded video blocks.

The methods can include wherein affine mode is enabled based on the first video block being coded in accordance with TPM.

The methods can include wherein uni-prediction is used for the first prediction portion, the first prediction portion not being located at a weighted area.

The methods can include wherein reference pictures of different sub-blocks within the first prediction portion are the same.

The methods can include wherein each of the MV prediction candidates in the motion candidate list are derived from an ATMVP candidate.

The methods can include wherein a merge list is checked for one or both of spatial or temporal blocks used in a merge candidate list construction process.

The methods can include wherein bi-prediction is enabled, and a bi-prediction regular motion candidate is associated with weighting factors, and wherein TPM candidates are derived without using the weighting factors.

The methods can include wherein bi-prediction is enabled, and a bi-prediction regular motion candidate is associated with weighting factors, and wherein TPM candidates are derived using the weighting factors.

The methods can include wherein bi-prediction is enabled for samples not located at a weighted area of the first video block, the first video block coded in accordance with TPM.

The methods can include wherein two reference pictures are the same.

The methods can include wherein one reference picture is assigned for each partition of the first video block.

The methods can include wherein the first video block is coded in accordance with TPM, and multi-hypothesis is applied to the first video block.

The methods can include wherein a final prediction block is generated using a current design, and wherein a second prediction block is generated in accordance with uni-direction and based on another reference picture and motion vector different than for the final prediction block.

The methods can include wherein a final prediction block is generated using a current design, and wherein a second prediction block is generated in accordance with bi-direction and based on another reference picture and motion vector different than for the final prediction block.

The methods can include wherein for each partition of the first video block, bi-prediction or multi-hypothesis prediction is applied, and wherein weighted results of prediction blocks for a weighted area due to bi-prediction or multi-hypothesis are used as final prediction values.

The methods can include wherein the first video block is coded in accordance with TPM, and overlapped block motion compensation (OBMC) is not applied.

The methods can include wherein OBMC is not applied for samples located at a weighted area, and wherein OBMC is applied for samples located at a non-weighted area.

The methods can include wherein the first video block is partitioned also include a second prediction portion that is non-rectangular and non-square.

The methods can include wherein the first video block is partitioned to also include a third prediction portion and a fourth prediction portion, the third prediction portion and the fourth prediction portion being non-rectangular and non-square.

The methods can include wherein two of the first, second, third, or fourth prediction portions are inter-coded, and the other two are not inter-coded.

The methods can include wherein blending is applied to samples located around an edge between the first prediction portion and the second prediction portion.

The methods can include wherein a mapping associated with the first splitting pattern, the first merge index, and the first coded value is based on a constructed merge candidate list.

The methods can include wherein a mapping associated with the first splitting pattern, the first merge index, and the first coded value is based on a coded mode associated with merge candidates.

The methods can include wherein TPM is enabled for non-merge mode based on a flag indicating TPM usage that is coded before a merge flag.

The methods can include wherein TPM is enabled for non-merge mode based on a flag indicating TPM usage that is coded, and wherein a merge flag is not signaled based on the first video block not being coded with TPM.

The methods can include wherein a merge flag is signaled based on the first video block being inter-coded.

The methods can include wherein the first splitting pattern is inherited from neighboring blocks of the first video block.

The methods can include wherein the first splitting pattern is inherited form temporal blocks of the first video block.

The methods can include wherein the first splitting pattern and the first merge index are signaled separately.

The methods can include wherein a flag indicating usage of TPM for the first splitting pattern uses bypass coding.

The methods can include wherein the flag is coded with context that is based on one or both of a width or a height of the first video block.

The methods can include wherein the flag is coded with context that is based on coded depth.

The methods can include wherein the flag is coded with context that is based a block shape of the first video block or a ratio of width and height of the first video block.

The methods can include wherein the flag is coded with context that is based coded information of neighboring blocks of the first video block.

The methods can include wherein the first splitting pattern is in accordance with TPM, and wherein partitions of the first video block includes a first region and a second region, the first region and the second region being coded with different modes.

The methods can include wherein one of the first region or the second region is intra-coded, and the other is inter-coded.

The methods can include wherein one of the first region or the second region is merge-coded, and the other is AMVP coded.

The methods can include wherein the characteristics of the first video block include a color component, wherein the state of the geometric prediction mode is the disabled state, and wherein the geometric prediction mode is in the disabled state without use of a flag indicating that the geometric prediction mode is in the disable state being signaled.

The methods can include wherein the characteristics of the first video block include chroma blocks having a width or height being less than a threshold range.

The methods can include wherein the characteristics include a size of the first video block being N×M or L×N, where N is 4.

The methods can include wherein the characteristics include a color format being 4:2:0.

The methods can include wherein the characteristics include the first video block having a width, a height, or both the width and the height being larger than or equal to a threshold L.

The methods can include wherein threshold L is 64.

The methods can include wherein the characteristics include the first video block having a width, a height, or both the width and the height being smaller than or equal to a threshold L.

The methods can include wherein threshold L is 4 or 8.

The methods can include wherein the threshold L is based on coded information including one or more of a block size, a picture type, or a temporal layer index.

The methods can include wherein the characteristics is a color component of the first video block.

The methods can include wherein TPM is enabled or applied based on being signaled in a video parameter set (VPS), a sequence parameter set (SPS), a picture parameter set (PPS), a picture header, a tile group header, a slice header, a group of rows of coding tree units (CTUs), a region, or a group of CTUs.

The methods can include wherein the geometric prediction mode is TPM.

The methods can include wherein the non-rectangular and non-square prediction portions are triangular.

In some embodiments a video processing method, includes performing a conversion between a video block and a bitstream representation of the video block consistent with a coding rule that specifies that a skip/merge mode of coding is treated separately from a second coding mode, wherein the second coding mode is a triangular partition mode or a MHIntra mode or a sub-block merge list mode.

In some embodiments, the bitstream representation is configured as follows: (1) in cases that the second coding mode is enabled for the video block, then a merge flag in the bitstream representation is signaled to have a false value, or (2) in case that the current block uses the skip/merge mode, then a corresponding indication of a merge list for the second coding mode is not explicitly signaled in the bitstream representation Another video coding method includes performing a conversion between a video block and a bitstream representation of the video block consistent with a rule that specifies a specific order of indication of usage of a plurality of sub-block coding tools in the conversion, wherein the specific order is one of: (a.) merge with motion vector difference (MMVD) followed by sub-block merge list followed by triangular partition mode TPM, followed by MHIntra, or (b.) MMVD followed by sub-block merge list followed by MHIntra followed by TPM.

In some embodiments, the rule further specifies to use a different specific order for other video portions or based on different video conditions.

In some embodiments, the other video portions include other video slices, or other video coding units or other video prediction units or other video coding unit rows or other video pictures or other video sequences than that of the video block.

In some embodiments, the different video conditions include different values of low delay check flags, or different values of previously coded information or dimensions of other video blocks.

Another method of video processing includes performing a conversion between a video block and a bitstream representation of the current video block consistent with a rule of coding wherein the rule specifies a selective use of a neighboring block for specifying a motion vector prediction in an adaptive motion vector resolution (AMVR) coding mode of the video block, wherein the rule includes: (1) excluding the neigh block that is in a different largest coding unit (LCU) row or (2) specifies a fixed resolution value or (3) in case that the video block is coded using affine mode, making unavailable an affine-coded neighboring block that is in a different LCU row.

Another method of video processing includes performing a conversion between a video block and a bitstream representation of the current video block consistent with a rule of coding wherein the rule specifies a selective use of a neighboring block for specifying a motion vector prediction in an adaptive motion vector resolution (AMVR) coding mode of the video block, wherein the rule includes selective use of a neighboring block as: (a) disabling using the neighboring video block's information for context modeling of the video block in case that the neighboring block is in a different largest coding unit (LCU) row or (b) using only one context for coding a syntax element during the conversion or (c) applying bypass coding is applied to the only one syntax element.

In some embodiments, the only one syntax element includes a. alf_ctb_flag, b. qt_split_cu_flag, c. mtt_split_cu_flag, d. mtt_split_cu_flag, e. cu_skip_flag, f. amvr_mode, g. merge_subblock_flag, h. merge_triangle_flag, or i. inter_affine_flag.

In some embodiments, the conversion includes generating pixel values of the video block from the bitstream representation or generating the bitstream representation from pixel values of the video block.

Another method of video processing includes performing a conversion between a video block and a bitstream representation of the current video block consistent with a rule of coding wherein the rule specifies a selective use of neighboring video blocks for specifying a motion vector prediction in an adaptive motion vector resolution (AMVR) coding mode of the video block, wherein the rule includes that information regarding the neighboring video blocks are used for context modeling based on the neighboring video blocks being used to decode the current video block.

The methods can include determining that the neighboring video blocks are outside of a portion including the current video block, the portion being: a coding tree unit (CTU), a CTU row, a region, a video data processing unit, a slice, a tile, a tile group, or a picture boundary, and wherein the rule includes: (1) the information regarding the neighboring video blocks are excluded from a parsing technique, or (2) the information regarding the neighboring video blocks are used in the parsing technique, or (3) the information regarding the neighboring video blocks are set as default values for the parsing technique, or (4) information regarding other neighboring video blocks that are in the same portion are used in the parsing technique as a replacement.

The methods can include wherein the information regarding the neighboring video blocks are from predefined neighboring positions for syntax elements that are based on coded information of neighboring video blocks.

Another method of video processing includes performing a conversion between a video block and a bitstream representation of the current video block consistent with a rule of coding wherein the rule specifies a selective use of neighboring video blocks for specifying a motion vector prediction in an adaptive motion vector resolution (AMVR) coding mode of the video block, wherein the rule includes that information regarding the neighboring video blocks are used for context modeling based on the neighboring video blocks being used to decode the current video block, the neighboring video blocks being used excluding video blocks within a different CTU row than a current CTU row, or within a different CTU than a current CTU.

The methods can include wherein the information from the neighboring video blocks that are excluded is unavailable for context modeling.

The methods can include wherein a default value is used in place of the information of the neighboring video blocks that are excluded.

The methods can include wherein information from an alternative neighboring video block within the current CTU row or the current CTU is used in place of the video blocks that are excluded.

The methods can include wherein syntax elements include one or more of: an alf_ctb_flag, a qt_split_cu_flag, a mtt_split_cu_flag, a cu_skip_flag, amvr_mode, an inter_affine_flag, a merge_triangle_flag and a merge_subblock_flag, a cu_skip_flag, a pred_mode_flag, a pcm_flag, an intra_luma_ref_idx, an intra_luma_mpm_flag, an intra_luma_mpm_idx, an intra_luma_mpm_remainder, an intra_chroma_pred_mode, a merge_flag, an inter_pred_idc, an inter_affine_flag, a cu_affine_type_flag, a ref_idx_10, a mvp_10_flag, a ref_idx_11 mvp_11_flag, an amvr_flag, an amvr_4pel_flag, a gbi_idx, cu_cbf, a mmvd_flag, or a mmvd_merge_flag.

The methods can include wherein the context modeling includes use of a pred_mode_flag.

The methods can include wherein the pred_mode_flag is derived from one or more of: ctx=A1 is intra ? 1:0 and ctx+=B1 is intra ? 1:0, ctx=(A1 is intra)||(B1 is intra) ? 1:0, ctx=A1 is intra or inter-intra ? 1:0 and ctx+=B1 is intra or inter-intra ? 1:0, or ctx=(A1 is intra or inter-intra)||(B1 is intra or inter-intra)?1:0.

The methods can include wherein the pred_mode_flag is derived from neighboring blocks located adjacent to corners of the current video block.

The methods can include wherein the pred_mode_flag is replaced by other kinds of syntax elements.

The methods can include wherein an unavailable neighboring block is processed as inter-coded when deriving the context.

The methods can include wherein an unavailable neighboring block is processed as intra-coded when deriving the context.

The methods can include wherein an unavailable neighboring block is processed as inter-coded when deriving the context.

The methods can include wherein a neighboring video block is not within a same coding tree unit (CTU) row as the current video block, and the neighboring video block is treated as inter-coded when deriving context.

The methods can include wherein a neighboring video block is not within a same CTU row as the current video block, and the neighboring video block is treated as intra-coded when deriving context.

The methods can include wherein a neighboring video block is not within a same CTU row as the current video block, and the neighboring video block is treated as inter-intra-coded when deriving context.

The following listing of technical solutions may be preferably incorporated into some embodiments of video encoder or decoder apparatus.

Additional features and variations of the following solutions are provided in the previous section (e.g., items 1 to 4, 17 and 21).

Example Solution Set A

1. A method of video processing (e.g., method 4400 depicted in FIG. 44), comprising: making a determination (4402) that a conversion between a video block of a video region of a video and a coded representation of the video uses a geometry partitioning mode in which the video block is partitioned into multiple prediction partitions including at least a first prediction partition; adding (4404) N motion information candidates to a motion candidate list for the video block using one or more sub-block merge candidates associated with the video block, where N is a positive integer; deriving (4406), from the motion candidate list, motion candidates for the multiple prediction partitions; and performing (4408) the conversion based on the motion candidates for the multiple prediction partitions.

2. The method of solution 1, wherein a sub-block temporal motion vector predictor candidate is used for deriving the N MV candidates.

3. The method of solution 1, wherein an affine motion candidate is used for deriving the N MV candidates.

4. The method of solution 1, wherein M representative MV candidates from one or more sub-block motion candidates of one or more sub-blocks are used for deriving the M MV candidates, where M is a positive integer.

5. The method of solution 4, wherein the M representative MV candidates are selected based positions of the one or more sub-blocks.

6. The method of any of solutions 4-5, wherein M is equal to a number of partitions in which the video block is partitioned for the conversion.

7. The method of any of solutions 4-5, wherein M=1, and a representative MV candidate is selected from motion information associated with a center sub-block of the first prediction portion.

8. A method for processing video (e.g., method 4500 depicted in FIG. 45), comprising: determining (4502), for a conversion between a video block of a video and a coded representation of the video, that the video block is partitioned into multiple prediction partitions including at least a first prediction partition; adding (4504) a first motion information candidate to a first candidate list associated with the first prediction partition and a second motion information candidate associated to a second candidate list associated with a second prediction partition, wherein the first motion information candidate and the second motion information candidate are inherited from a single motion candidate; and performing (4506) the conversion using the first motion information candidate and/or the second motion information candidate.

9. The method of solution 8, wherein a range of indication of splitting patterns and MV candidate indices for the first prediction portion and the second prediction portion is M*N*N, wherein M is a number of prediction portions that the first video block is partitioned into, and wherein N is a number of allowed merge candidates to be added to the motion candidate list.

10. The method of solutions 8 or 9, wherein a flag in the bitstream representation indicates that the single MV prediction candidate in the motion candidate list is to be used for both the first prediction portion and the second prediction portion.

11. The method of solution 8, wherein the prediction candidate in the motion candidate list is a bi-predicted motion candidate.

12. The method of solution 8, wherein the first MV candidate is assigned List 0 motion information and the second MV candidate is assigned List 1 motion information.

13. The method of any of solutions 8-12, wherein a specific weighting factor group is used for samples located in a weighted area of the video block according to the splitting pattern, wherein the specific weighting factor group is different from another weighting factor group used for another video block in which different motion candidates are used for determining candidate motion vectors for prediction portions of the another video block.

14. The method of solution 13, wherein the specific weighting factor group corresponds to averaging for the samples located in the weighted area.

15. The method of any of solutions 8, wherein the conversion uses the method as an additional coding mode in addition to an advanced motion vector prediction (AMVP), merge, or a triangular partition mode (TPM) used during the conversion.

16. A method of any of solutions 1-15, wherein the performing the conversion includes deriving a refined final motion vector for a prediction block for the video block.

17. The method of solution 16, wherein the deriving the refined final motion vector includes using a decoder-side motion vector refinement (DMVR) tool to a motion information of the first prediction partition and a motion information of the second prediction partition of the first video block to derive motion information for the video block.

18. The method of solution 16, wherein the performing the conversion includes applying a bi-directional optical flow (BIO) tool to a result after a triangular partition mode prediction.

19. The method of solution 17 or solution 18, wherein the first prediction portion is uni-predicted from a first reference list and the second prediction portion is bi- or uni-predicted using a second reference list, then the DMVR tool or the BIO tool are applied using motion information of the second prediction portion in the second reference list.

20. The method of solution 16, further including storing motion information of a reference list LX during the conversion due to the first prediction portion being uni-predicted from the reference list LX, where X is 0 or 1.

21. The method of solution 16, wherein the conversion uses a final prediction that is a weighted sum of a prediction result based on the geometric partition mode and a prediction result based on an intra-prediction mode.

22. The method of solution 16, one or more reference pictures used in geometry partition mode is a current picture.

23. A method of video processing (e.g. method 4600 depicted in FIG. 46), comprising: making a determination (4602) that a conversion between a video block of a video and a coded representation of the video uses a sub-block enabled geometric partitioning mode in which the video block is partitioned to include a prediction partition such that a sub-block of the prediction partition is assigned a sub-block motion information thereof; and performing (4604) the conversion based on the determination.

24. The method of solution 23, wherein the sub-block motion information is used as a candidate in a candidate list used for the conversion of the video block.

25. The method of solution 23, wherein an affine mode is enabled based on the first video block being coded in accordance with the geometric partitioning mode.

26. The method of any of solutions 23-25, wherein the conversion restricts, for a sub-block that is not in a weighted area of the video block, to use only uni-prediction.

27. The method of solution 23, wherein the conversion is based on a rule that specifies to use a same reference pictures for all sub-blocks within any given prediction portion of the video block.

28. The method of any of solutions 23-27, wherein the conversion comprises deriving one or more motion vector prediction candidates in a motion candidate list are derived from a sub-block temporal motion vector predictor (SbTMVP) candidate associated with the sub-block.

29. The method of solution 28, wherein the conversion further uses a rule that each sub-block within the prediction partition inherits motion information of List 0 motion information of the SbTMVP candidate.

30. The method of solution 23, wherein the conversion further uses a rule that a merge list for the prediction partition is checked in a same order as for a sub-block merge candidate list process used during the conversion of the video.

31. The method of any of solutions 1-30, wherein the geometry partitioning mode uses different coding modes for representing the prediction partitions of the video block.

32. The method of solution 31, wherein the first partition mode uses intra coding and the second partition mode uses inter coding.

33. The method of solution 31, wherein a first prediction partition uses merge coding and a second prediction partition uses an advanced motion vector predictor tool.

34. The method of any of solutions 1 to 33, wherein an indication in the bitstream representation signals use of the geometry partitioning mode for the video block.

35. The method of solution 34, wherein the indication is at a sequence parameter set level or a picture parameter set level or a video parameter set level or a picture header or a slice header or a tile group header or a coding tree unit level.

36. The method of any of solutions 1-35, wherein the geometry partition mode is enabled due to the video block satisfying a size condition.

37. The method of solution 36, wherein the size condition specifies to use the geometry partition mode due to the video block having a size greater than a threshold.

38. The method of solution 36, wherein the size condition specifies to use the geometry partition mode due to the video block having a size less than a threshold.

39. The method of solutions 37-38, wherein the threshold is signaled in the coded representation at a sequence parameter set or a picture parameter set or a picture or a slice or a tile group or a tile level.

40. The method of any of solutions 37-38, wherein the size is a function of a picture type or a temporal layer index associated with the video block.

41. The method of any of solutions 1 to 33, wherein the geometry partition mode is used for the conversion due to the video block having a pre-defined width to height ratio.

Additional features and variations of the following solutions are provided in the previous section (e.g., items 5, 7, 8, 9 and 21).

Example Solution Set B

Figure 47B:
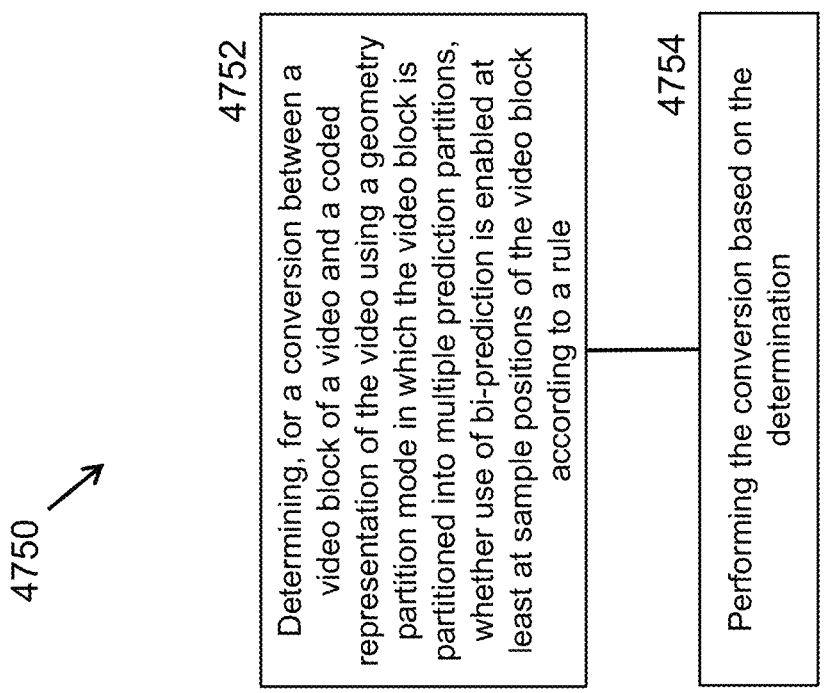

1. A method of video processing (e.g., method 4700 depicted in FIG. 47A), comprising: determining (4702), for a conversion between a video block of a video and a coded representation of the video using a geometry partition mode in which the video block is partitioned into multiple prediction partitions, whether an inheritance of generalized bi prediction (GBi) weighting factors from motion candidates used for motion information derivation for the prediction partition is enabled at sample positions of the video block according to an inheritance rule; and performing (4704) the conversion based on the determining.

2. The method of solution 1, wherein the inheritance rule specifies that the inheritance is disabled for all positions of the video block.

3. The method of solution 2, further comprising that the conversion is performed regardless of the GBi weighting factors associated with the motion candidates.

4. The method of solution 2, wherein a GBi weighting factor index for the video block is set to 0.

5. The method of solution 1, wherein the inheritance rule specifies that the inheritance is enabled for all positions of the video block.

6. The method of solution 5, further comprising that, for the prediction partition, a corresponding GBi weighting factor is set equal to that associated with a motion candidate used to derive motion information of the video block.

7. The method of solution 1, wherein the inheritance is disabled for samples positions outside a weighted area of the video block and enabled at sample positions in the weighted area wherein the weighted area crosses the boundary of two prediction partitions.

8. The method of solution 7, further comprising that for sample positions in the prediction partition excluding the weighted area, the corresponding GBi weighting factor is set equal to 0.

9. The method of solution 4, further comprising that, for weighted area in the prediction partition, a corresponding GBi weighting factor is set equal to that associated with the motion candidate used to derive motion information of the video block.

10. A method of video processing (e.g., method 4750 depicted in FIG. 47B), comprising: determining (4752), for a conversion between a video block of a video and a coded representation of the video using a geometry partition mode in which the video block is partitioned into multiple prediction partitions, whether use of bi-prediction is enabled at least at sample positions of the video block according to a rule; and performing (4754) the conversion based on the determining.

11. The method of solution 10, wherein the rule specifies that bi-prediction is enabled for samples positions in a non-weighted region of the video block.

12. The method of solution 11, wherein the rule further specifies that bi-prediction is enabled for samples positions in the non-weighted region of the video block only by using two reference pictures that are same as each other.

13. The method of any of solutions 11-12, wherein the bi-prediction uses a first reference frame for a first prediction partition, a second reference frame for a second prediction partition and a third reference frame for both the first prediction partition and the second prediction partition, wherein the video block consists of the first prediction partition and the second prediction partition.

14. A method of video processing (e.g., method 4800, depicted in FIG. 48), comprising: determining (4802), for a conversion between a video block of a video and a coded representation of the video using a geometry partition mode in which the video block is partitioned into at least a first prediction partition and a second prediction partition, a final prediction block from a first prediction block and a second prediction block from motion information that is different from a first set of motion information derived for sample positions of the first prediction partition, a second set of motion information derived for sample positions of the second prediction partition; and performing (4804) the conversion based on the final prediction block; wherein the video block is coded using a multi-hypothesis technique.

15. The method of solution 14, wherein the second prediction block is uni-predictively generated using a motion vector or a reference picture different from the first set of motion information and the second set of motion information.

16. The method of solution 14, wherein the second prediction block is bi-predictively generated using two additional reference pictures.

17. The method of any of solutions 14, wherein the second prediction block is generated using a third set motion information for the first prediction partition and a fourth set of motion information for the second prediction partition;

18. The method of any of solutions 14-17, samples of the final prediction block in the first and second prediction partitions excluding a weighted area are generated from the first prediction block or the second prediction block; and wherein, for samples in the weighted area, a weighted prediction from the first prediction block and the second prediction block is used; wherein the weighted area crosses the boundary of two prediction partitions.

19. The method of any of above solutions wherein the conversion is further based on an overlapped block motion compensation (OBMC) rule that specifies whether use of OBMC coding is enabled at sample positions of the video block.

20. The method of solution 19, wherein the OBMC rule specifies that the OBMC coding is disabled for the conversion due to the video block using the geometry partition mode.

21. The method of solution 19, wherein the OBMC rule specifies to disable OBMC coding at sample positions in the weighted region of the video block and enable OBMC at remaining sample positions.

22. The method of any of solutions 1-21, wherein the video block is partitioned into two or more partitions.

23. The method of solution 22, wherein the video block is partitioned into four triangular prediction partitions.

24. The method of any of solutions 1-23, wherein the video block is partitioned into at least two partitions that are non-rectangular and non-square partitions such that at most one of the at least two partitions is inter coded.

25. The method of any of solutions 22-24, wherein the conversion includes using a weighted prediction average at sample positions at edges of neighboring ones of the four partitions.

26. The method of any of solutions 1-25, wherein an indication in the bitstream representation signals use of the geometry partitioning mode for the video block.

27. The method of solution 26, wherein the indication is at a sequence parameter set level or a picture parameter set level or a video parameter set level or a picture header or a slice header or a tile group header or a coding tree unit level.

28. The method of any of solutions 1-25, wherein the geometry partition mode is enabled due to the video block satisfying a size condition.

29. The method of solution 26, wherein the size condition specifies to use the geometry partition mode due to the video block having a size greater than a threshold.

30. The method of solution 26, wherein the size condition specifies to use the geometry partition mode due to the video block having a size less than a threshold.

31. The method of solutions 29-30, wherein the threshold is signaled in the coded representation at a sequence parameter set or a picture parameter set or a picture or a slice or a tile group or a tile level.

32. The method of any of solutions 29-30, wherein the size is a function of a picture type or a temporal layer index associated with the video block.

33. The method of any of solutions 1-32, wherein the geometry partition mode is used for the conversion due to the video block having a pre-defined width to height ratio.

Additional features and variations of the following solutions are provided in the previous section (e.g., items 10, 11, 12, 13 and 21).

Example Solution Set C

1. A method of video processing (e.g., method 4900, depicted in FIG. 49), comprising: determining (4902), for a conversion between a video block of a video region of a video and a bitstream representation of the video, a relationship between (1) a splitting pattern used to split the video block into prediction partitions such that at least one prediction partition is a non-rectangular and non-square partition, and (2) indexes to merge candidates of the partitions used for the conversion, and a format of the bitstream representation permits changing the relationship at the video region level; and performing (4904) the conversion based on the determining.

2. The method of solution 1, wherein the video region corresponds to a video sequence of a video picture or a video tile or a video slice or a video coding tree unit or a coding unit.

3. The method of any of solutions 1-2, wherein the relationship is dependent on a characteristic of merge candidate list used during the conversion of the video block.

4. The method of any of solutions 1-3, wherein the relationship is dependent on a coded mode associates with the merge candidates.

5. A method of video processing (e.g., method 5000, depicted in FIG. 50), comprising: performing (5002) a conversion between a video block of a video and a coded representation of the video in accordance with a syntax rule that defines syntax elements of the coded representation; wherein the syntax rule specifies a signaling order of a first flag indicative of use of a geometry partition mode for the video block and a second flag indicative of use of a merge mode for the video block; wherein the geometry partition mode includes splitting the video block into multiple prediction partitions, at least one prediction partition having a non-rectangular, non-square shape, and wherein the merge mode allows inheriting motion vector information from neighboring blocks of the video block.

6. The method of solution 5, wherein the second flag is signaled after the first flag.

7. The method of solution 5, wherein the syntax rule specifies to omit signaling the second flag due to signaling of the first flag.

8. The method of solution 5, wherein the second flag is signaled conditionally based on a coding mode of the video block.

9. The method of solution 8, wherein the second flag is signaled due to the video block being inter coded.

10. The method of solution 5, wherein the syntax rule specifies that the first flag is omitted due to the video block being skip mode coded.

11. A method of video processing (e.g., method 5100, depicted in FIG. 51), comprising: performing (5102) a conversion between a video block of a video and a coded representation of the video in accordance with a syntax rule that defines a syntax of the coded representation; wherein the syntax rule specifies a signaling of a flag indicative of use of a geometry partition mode for the video block is included selectively based on whether another coding tool is used for the conversion of the video block; wherein the geometry partition mode includes splitting the video block into multiple prediction partitions, at least one prediction partition having a non-rectangular, non-square shape.

12. The method of solution 11, wherein the syntax rule specifies to include the flag if an advanced motion vector prediction tool is used for the conversion of the video block.

13. The method of solution 11, wherein the syntax rule specifies to disable signaling the flag if the video block is coded using a merge mode.

Figures 52, 53:
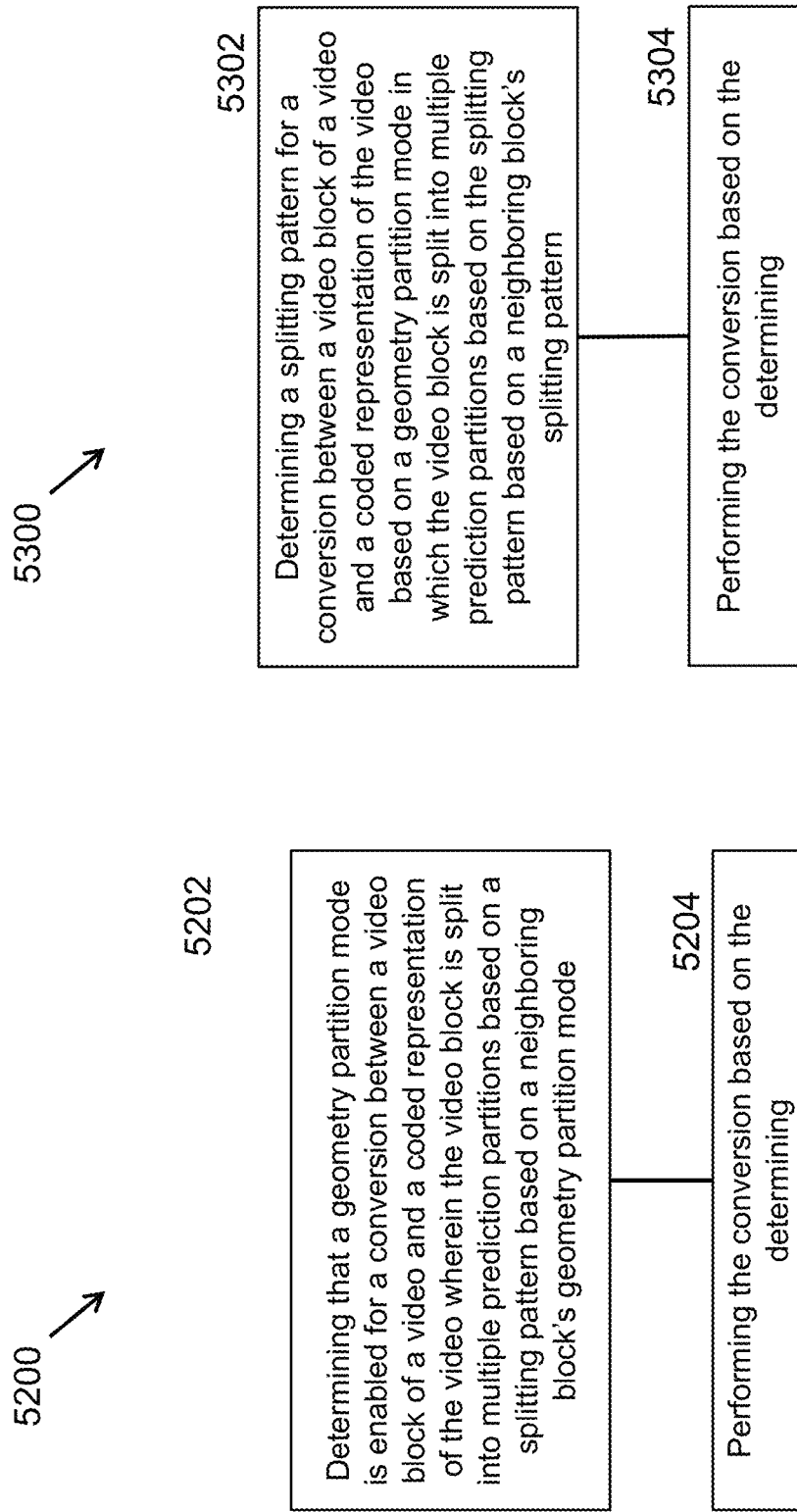

14. A method of video processing (e.g., method 5200, depicted in FIG. 52), comprising: determining (5202) that a geometry partition mode is enabled for a conversion between a video block of a video and a coded representation of the video wherein the video block is split into multiple prediction partitions based on a splitting pattern based on a neighboring block's geometry partition mode; and performing (5204) the conversion based on the determining.

15. A method of video processing (e.g., method 5300, depicted in FIG. 53), comprising: determining (5302) a splitting pattern for a conversion between a video block of a video and a coded representation of the video based on a geometry partition mode in which the video block is split into multiple prediction partitions based on the splitting pattern based on a neighboring block's splitting pattern; and performing (5304) the conversion based on the determining.

16. The method of solution 14 or 15, wherein the neighboring block is a spatially neighboring block.

17. The method of solution 14 or 15, wherein the neighboring block is a temporally neighboring block.

18. The method of any of solutions 2-4, further including, storing the splitting pattern together with motion information for the video block.

19. The method of any of solutions 2-5, wherein the conversion includes deriving motion candidates for the multiple partitions from a regular motion candidate such that a splitting pattern associated with the regular motion candidate is inherited by the derived motion candidates.

20. The method of solution 14 or 15, wherein the video block inherits both motion information and the splitting pattern from the neighboring block.

21. The method of any of solutions 1-20, wherein an indication in the bitstream representation signals use of the geometry partitioning mode for the video block.

22. The method of solution 21, wherein the indication is at a sequence parameter set level or a picture parameter set level or a video parameter set level or a picture header or a slice header or a tile group header or a coding tree unit level.

23. The method of any of solutions 1-20, wherein the geometry partition mode is enabled due to the video block satisfying a size condition.

24. The method of solution 21, wherein the size condition specifies to use the geometry partition mode due to the video block having a size greater than a threshold.

25. The method of solution 21, wherein the size condition specifies to use the geometry partition mode due to the video block having a size less than a threshold.

26. The method of solutions 24-25, wherein the threshold is signaled in the coded representation at a sequence parameter set or a picture parameter set or a picture or a slice or a tile group or a tile level.

27. The method of any of solutions 4-5, wherein the size is a function of a picture type or a temporal layer index associated with the video block.

28. The method of any of solutions 1-20, wherein the geometry partition mode is used for the conversion due to the video block having a pre-defined width to height ratio.

Additional features and variations of the following solutions are provided in the previous section (e.g., items 14, 15, 16, 21).

Example Solution Set D

Figures 54, 55:
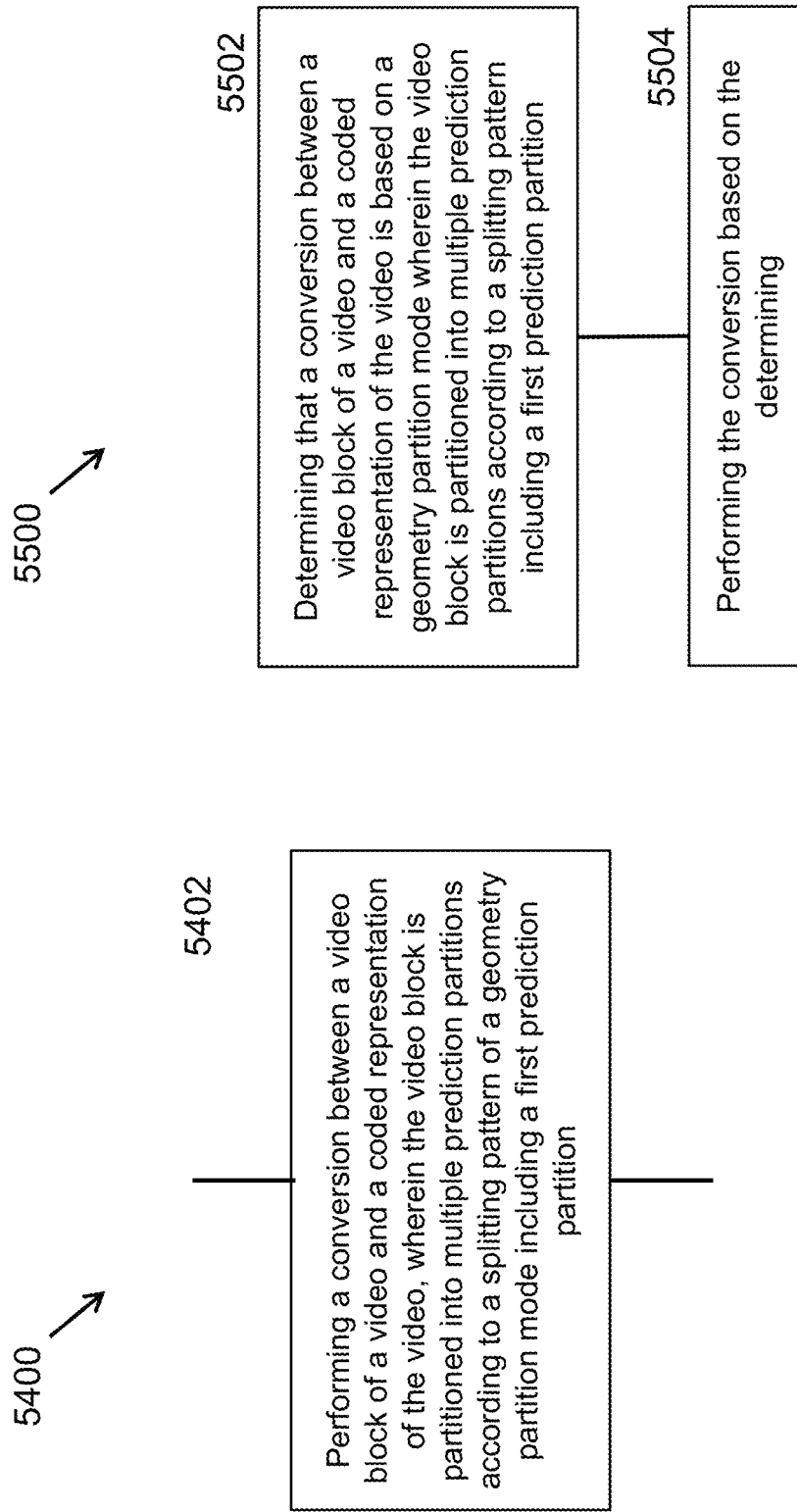

1. A method of video processing (e.g., method 5400, depicted in FIG. 54), comprising: performing (5402) a conversion between a video block of a video and a coded representation of the video, wherein the video block is partitioned into multiple prediction partitions according to a splitting pattern of a geometry partition mode including a first prediction partition; wherein the coded representation includes multiple syntax elements among which one syntax element corresponds to the splitting pattern and other syntax elements corresponds to merge indices for the multiple prediction partitions.

2. The method of solution 1, wherein the splitting pattern is signaled using a one bit flag.

3. The method of solution 2, wherein a neighboring splitting pattern of a neighboring video block is used for contextual coding of the one bit flag.

4. The method of any of solutions 1-3, wherein multiple merge indices are signaled for each of the multiple prediction partitions.

5. The method of any of solutions 1-3, wherein the multiple merge indices for the multiple prediction partitions are signaled using predictive coding.

6. The method of solution 1, wherein a coding scheme used for signaling the merge indices is dependent on a coding scheme used for signaling the splitting pattern.

7. The method of solution 1, wherein a coding scheme used for signaling the splitting pattern is dependent on a coding scheme used for signaling the merge indices.

8. The method of solution 1, wherein the conversion comprises parsing the multiple syntax elements from the coded representation.

9. A method of video processing (e.g., method 5500, depicted in FIG. 55), comprising: determining (5502) that a conversion between a video block of a video and a coded representation of the video is based on a geometry partition mode wherein the video block is partitioned into multiple prediction partitions according to a splitting pattern including a first prediction partition; and performing (5504) the conversion based on the determining; wherein the geometry partition mode for the video block is signaled in the coded representation using a context-based coding in which the context depends on a coding condition of the video block.

10. The method of solution 9, wherein the coding condition corresponds to a height or a width of the video block or a ratio of the height and the width.

11. The method of solution 9, wherein the context is dependent on a coded depth of the video block within a partitioning tree.

12. The method of solution 9, wherein the coding condition corresponds to coded information of a neighboring block.

13. The method of solution 12, wherein the video block has a width W and a height H. Here, a top-left sample position of the video block is represented as (0, 0), and the neighboring block corresponds to an above neighboring block at positions (W/2, −1), (W/2−1, −1), or (W−1, −1).

14. The method of solution 13, wherein the context is fully determined by the above neighboring block due to a ratio between the width and the height being greater than a threshold.

15. The method of solution 13, wherein the video block has a width W and a height H, and wherein a top-left sample position of the video block is represented as (0, 0), and the neighboring block corresponds to a left neighboring block at positions (−1, H/2), (−1, H/2−1), (−1, H−1).

16. The method of solution 15, wherein the context is fully determined by the left neighboring block due to a ratio between the height and the width being greater than a threshold.

17. The method of solutions 13 and 15, wherein the context is dependent on a combination of the above neighboring block and the left neighboring block.

18. A method of video processing (e.g., method 5600, depicted in FIG. 56), comprising performing (5602) a conversion between a video block of a video and a coded representation of the video, wherein the video block is partitioned using a geometry prediction mode into multiple prediction partitions according to a splitting pattern having a first prediction partition; wherein two candidate index entries of the candidate list are assigned a codeword in the coded representation, and wherein a format of the coded representation permits changing the assignment of the codeword across a segment of the video.

19. The method of solution 18, wherein the segment of the video corresponds to the video block or a video coding tree unit or a video tile or a video picture or a video sequence.

20. The method of any of solutions 18 or 19, wherein the assignment is changed based on whether the two candidate index entries correspond to two candidates that are from a same regular motion candidate.

21. The method of solution 20, wherein the assignment is such that a first codeword assigned to a first pair of candidate indices representing candidates derived from different regular motion candidates is selected to be smaller than a second codeword assigned to a second pair of candidate indices representing candidates derived from the same regular motion candidate.

22. The method of any of solutions 18 or 19, wherein the assignment is changed based on whether the two candidate index entries correspond to two candidates that are from a same prediction direction or a same reference picture list.

23. The method of solution 20, wherein the assignment is such that a first codeword assigned to a first pair of candidate indices representing candidates having different prediction directions is selected to be smaller than a second codeword assigned to a second pair of candidate indices representing candidates having the same prediction direction.

24. The method of any of solutions 1-23, wherein an indication in the bitstream representation signals use of the geometry partitioning mode for the video block.

25. The method of solution 24, wherein the indication is at a sequence parameter set level or a picture parameter set level or a video parameter set level or a picture header or a slice header or a tile group header or a coding tree unit level.

26. The method of any of solutions 1-25, wherein the geometry partition mode is enabled due to the video block satisfying a size condition.

27. The method of solution 26, wherein the size condition specifies to use the geometry partition mode due to the video block having a size greater than a threshold.

28. The method of solution 26, wherein the size condition specifies to use the geometry partition mode due to the video block having a size less than a threshold.

29. The method of solutions 27-28, wherein the threshold is signaled in the coded representation at a sequence parameter set or a picture parameter set or a picture or a slice or a tile group or a tile level.

30. The method of any of solutions 27-28, wherein the size is a function of a picture type or a temporal layer index associated with the video block.

31. The method of any of solutions 1-30, wherein the geometry partition mode is used for the conversion due to the video block having a pre-defined width to height ratio.

Additional features and variations of the following solutions are provided in the previous section (e.g., items 18 to 21).

Example Solution Set E

1. A method of video processing (e.g., method 5700, depicted in FIG. 57), comprising: determining (5702), for a conversion between a video block of a video and a coded representation of the video, whether use of a geometry partition mode is enabled based on a rule that uses a characteristic of the video block; and performing (5704) the conversion according to the determining, wherein, the geometry partition mode partitions the video block into multiple prediction partitions.

2. The method of solution 1, wherein the rule specifies to disable the geometry partition mode due to the video block representing a color component of the video.

3. The method of solution 1, wherein the rule specifies to disable the geometry partition mode due to the video block being a chroma block having a size or a width smaller than a threshold.

4. The method of solution 1, wherein the rule specifies to disable the geometry partition mode due to the video block having a size N×M or K×N where K, M, N are integers different from each other.

5. The method of solution 4, wherein N is equal to 4 or 128.

6. The method of solution 1, wherein the rule specifies to disable to geometry partition mode due to the video block having a width and/or a height greater than a threshold L, where L is an integer.

7. The method of solution 6, wherein L is equal to 64.

8. The method of solution 1, wherein the rule specifies to disable to geometry partition mode due to the video block having a width and/or a height smaller than a threshold L, where L is an integer.

9. The method of solution 1, wherein the rule specifies to disable to geometry partition mode due to the video block having a ratio that a width divided by a height greater than a threshold L, where L is an integer.

10. The method of solution 1, wherein the rule specifies to disable to geometry partition mode due to the video block having a ratio that a height divided by a width greater than a threshold L, where L is an integer.

11. The method of any solutions of 8 to 10, wherein L is equal to 8.

12. The method of any of solutions 5-10, wherein at least one of the thresholds L, M, N and K is signaled in the coded representation in a sequence parameter set or a picture parameter set or a picture header or a slice header or a tile group header or a tile header.

13. The method of any of solutions 5-12, wherein at least one of the thresholds L, M, N and K is a function of a block size or a picture type or a temporal layer index associated with the video block.

14. The method of any of solutions 1-13, wherein the coded representation omits including an indication of the usage of geometry partition mode when it is determined that the geometry partition mode is disabled for the video block.

15. The method of solution 1, wherein the characteristic of the video block includes a video component of the video that the video block belongs to.

16. The method of solution 15, wherein the video block contain samples with multiple color components and the rule specifies to disable the geometry partition mode for one color component while enable the geometry partition mode for another color component.

17. The method of solution 1, wherein the rule specifies to enable the geometry partition mode for luma blocks having sizes N×M or L×N, where L, M, N are positive integers, while disabling the geometry partition mode for corresponding chroma blocks if the video has a 4:2:0 format.

18. The method of solution 1, wherein, in case that it is determined that the geometry partition mode is disabled for the video block, then the conversion includes deriving a prediction block for the video block using a motion information or a prediction mode of one prediction partition of the video block.

19. The method of solution 1, wherein, in case that it is determined that the geometry partition mode is disabled for the video block, then the conversion includes deriving a prediction block for the video block using derived motion information from a motion information associated with two prediction partitions of the video block.

20. The method of solution 19, wherein the motion information of the two prediction partitions having motion vectors in two different directions is used to generate bi-prediction motion vectors for the video block.

21. The method of solution 19, wherein the motion information of the two prediction partitions having motion vectors in a same direction is used to generate uni-prediction motion vectors for the video block using a scaling operation in which a first motion vector of a first partition is scaled according to a reference picture of the second partition and an average of the scaled motion vector and a second motion vector of the second partition is used.

22. The method of solution 16, wherein the motion information of the two prediction partitions have motion vectors in two directions are used to generate bi-prediction motion vectors for the video block using a scaling operation in which a first motion vector of a first partition is scaled according to a reference picture of the second partition and an average of the scaled motion vector and a second motion vector of the second partition is used.

23. The method of any of solutions 21 and 22, wherein the scaling operation is dependent on a color format of the video.

24. The method of any of solutions 1-23, wherein an indication in the bitstream representation signals use of the geometry partitioning mode for the video block.

25. The method of solution 24, wherein the indication is at a sequence parameter set level or a picture parameter set level or a video parameter set level or a picture header or a slice header or a tile group header or a coding tree unit level.

26. The method of any of solutions 24-25, wherein the size is a function of a picture type or a temporal layer index associated with the video block.

Additional features and variations of the following solutions are provided in the previous section (e.g., items 22-27).

Example Solution Set F

1. A method of video processing (e.g., method 5800 depicted in FIG. 58), comprising performing (5802) a conversion between a video block of a video and a coded representation of the video in accordance with a rule that defines a format of syntax elements of the coded representation; wherein the rule specifies whether indication of use of a first coding mode is signaled or whether to signal the indication is based on use of a second coding mode for the video block; wherein the second coding mode is a merge mode; wherein the merge mode enables inheriting motion information from a merge candidate in a merge candidate list without a motion vector difference for whole of the video block.

2. The method of solution 1, wherein the first coding mode comprises a geometry partition mode in which the video block is partitioned into multiple prediction partitions.

3. The method of solution 2, wherein at least one of the multiple prediction partitions is a non-rectangular and non-square prediction partition.

4. The method of solution 1, wherein the first coding mode comprises an inter-intra coding mode in which a prediction block of the video block is derived from an intra prediction signal and an inter prediction signal.

5. The method of solution 1, wherein the first coding mode comprises a sub-block merge coding mode, wherein, in the sub-block merge mode, the conversion uses derived motion information for each sub-block within the block.

6. The method of any of solutions 1 to 5, wherein the rule specifies that a value of the indication indicative of use of the first coding mode is set to FALSE due to the second coding mode being enabled for the video block.

7. The method of any of solutions 1 to 5, wherein the rule specifies that the indication of use of the first coding mode is excluded from the coded representation due to the second coding mode being enabled for the video block.

8. The method of any of solutions 1 to 7, wherein the conversion includes parsing the coded representation according to the rule.

9. A method of video processing (e.g., method 5900 depicted in FIG. 59), comprising: performing (5902) a conversion between a video block of a video and a coded representation of the video, wherein a format of the coded representation conforms to a first rule that specifies whether syntax elements signaling multiple coding modes are included in the coded representation and/or a second rule that specifies an order in which the syntax elements signaling the multiple coding modes are included in the coded representation; wherein the multiple coding modes include two or more of a geometry partition mode, an inter-intra (MHIntra) mode, a sub-block merge mode or a merge with motion vector differencing (MMVD) mode; wherein, in the inter-intra coding mode, a prediction block of the video block is derived from an intra prediction signal and an inter prediction signal; wherein, in the sub-block merge mode, the conversion uses derived motion information for each sub-block within the block; wherein, in the MMVD mode, a combined merge and motion vector differencing (MVD) coding mode is used; and wherein the merge mode enables inheriting motion information from a merge candidate in a merge candidate list without MVD for whole of the video block.

10. The method of solution 9, wherein the second rule specifies following order of syntax elements: the MMVD mode, the sub-block merge mode, the geometry partition mode, and MHIntra mode.

11. The method of solution 9, wherein the second rule specifies following order of syntax elements: the MMVD mode, the sub-block merge mode, the MHIntra mode, and the geometry partition mode.

12. The method of solution 9, wherein the second rule specifies following order of syntax elements: the sub-block merge mode is signaled before the MMVD mode.

13. The method of solution 9, wherein the second rule specifies following order of syntax elements: the sub-block merge mode, the MMVD mode, the MHIntra mode, the geometry partition mode.

14. The method of solution 9, wherein the order is changed in the coded representation at a video unit level based on a coding condition of the video.

15. The method of solution 12, wherein the video unit corresponds to a block, a coding unit, a prediction unit, a coding tree unit or a largest coding unit row, a video slice, a picture or a sequence level.

16. The method of any of solutions 12-15, wherein the coding condition comprises a value of a low delay check flag, coding information of previously coded video blocks, or a dimension of the video block.

17. A method of video processing (e.g., method 6000 depicted in FIG. 60), comprising: checking (6002), for a conversion between a current video block of a video and a coded representation of the video, whether a neighboring motion vector precision information of a neighboring block of the video block is available for determining a motion vector precision for the current block based on a position of the neighboring block; and performing (6004) the conversion based on the checking.

18. The method of solution 17, wherein, in a case that the neighboring block and the current video block are in different largest coding unit (LCU) rows or in different regions of the video, then the neighboring motion vector precision information is considered to be unavailable.

19. The method of solution 18, wherein, due to determining that the neighboring motion vector precision information is unavailable, the motion vector precision for the current block is set to a default value.

20. The method of solution 17, wherein in a case that the neighboring block and the current video block are in different largest coding unit (LCU) rows, then the motion vector precision for the current video block is determined by assuming the neighboring block to be in a different slice or a different tile.

21. The method of any of solutions 17 to 20, wherein the current video block and the neighboring block are coded using affine coding mode.

22. A method of video processing (e.g., method 6100 depicted in FIG. 61), comprising:
determining (6102), for a conversion between a current video block of a video and a coded representation of the video, a context coding mode used for the coded representation based on a position of the neighboring block with respect to a largest coding unit (LCU) row of the current video block; and performing (6104) the conversion based on the determining.

23. The method of solution 22, wherein the neighboring block is considered unavailable due to being in a different LCU row, and wherein the context coding mode uses a single context for coding a syntax element.

24. The method of solution 22, wherein the neighboring block is considered unavailable due to being in a different LCU row, and wherein the context coding mode uses bypass coding for coding a syntax element.

25. The method of any of solutions 23-24, wherein the syntax element is one of: alf_ctb_flag, qt_split_cu_flag, mtt_split_cu_flag, mtt_split_cu_flag, cu_skip_flag, amvr_mode, merge_subblock_flag, merge_triangle_flag, inter_affine_flag, cu_skip_flag, pred_mode_flag, pcm_flag, intra_luma_ref_idx, intra_luma_mpm_flag, intra_luma_mpm_idx, intra_luma_mpm_remainder, intra_chroma_pred_mode, merge_flag, inter_pred_idc, inter_affine_flag, cu_affine_type_flag, ref_idx_10, mvp_10_flag, ref_idx_11 mvp_11_flag, amvr_flag, amvr_4pel_flag, gbi_idx, cu_cbf, mmvd_flag, or mmvd_merge_flag.

Additional features and variations of the following solutions are provided in the previous section (e.g., items 1 to 4, 17 and 21).

Example Solution Set G

1. A method of video processing (e.g., method 6200 depicted in FIG. 62), comprising: performing (6202) a conversion between a current video block of a video and a coded representation of the video, wherein the coded representation conforms to a rule that specifies that context modeling is restricted to information from neighboring block that are used for decoding the current video block and/or satisfy a position criterion.

2. The method of solution 1, wherein the neighboring block is a left-bottom block or a top right block.

3. The method of solution 1, wherein the rule specifies to disallow use of neighboring blocks that are outside a current video unit that contains the current video block.

4. The method of solution 1, wherein the rule specifies to use neighboring blocks that are outside a current video unit that contains the current video block as unavailable blocks.

5. The method of solution 1, wherein the rule specifies to use neighboring blocks that are outside a current video unit that contains the current video block as having default values.

6. The method of solution 1, wherein the rule specifies to use neighboring blocks that are outside a current video unit that contains the current video block as replacement blocks.

7. The method of solution 3, wherein the current video unit is a coding tree unit or a coding tree unit row or a video region or a video data processing unit or a slice or a tile or a tile group or at picture boundary.

8. A method of video processing (e.g., method 6300 depicted in FIG. 63), comprising: performing (6302) a conversion between a current video block of a video and a coded representation of the video, wherein the coded representation conforms to a rule that specifies use of coding information from neighboring blocks for context modeling of one or more syntax elements representing coded representation of the current video block.

9. The method of solution 8, wherein the coding information from neighboring blocks is based on syntax elements representing the neighboring blocks in the bitstream representation.

10. The method of any of solutions 8 or 9, wherein the neighboring blocks correspond to blocks that are accessed for reconstructing the current video block from the coded representation.

11. The method of any of solutions 8-10, wherein the neighboring blocks correspond to exactly two blocks from five positions used for spatial merge candidate construction.

12. The method of any of solutions 8-10, wherein the neighboring blocks correspond to exactly one block from five positions used for spatial merge candidate construction.

13. The method of solution 8, wherein the rule specifies to exclude using neighboring blocks that are outside a coding tree unit or a coding tree unit row of the current video block.

14. The method of solution 8, wherein the rule specifies to use syntax elements neighboring blocks that are outside a coding tree unit or a coding tree unit row of the current video block are considered to be unavailable for context modeling.

15. The method of solution 8, wherein the rule specifies to use syntax elements neighboring blocks that are outside a coding tree unit or a coding tree unit row of the current video block are considered to have default values for the context modeling.

16. The method of solution 8, wherein the rule specifies to use syntax elements neighboring blocks that are outside a coding tree unit or a coding tree unit row of the current video block are used by replacing with an outside neighboring block for the context modeling.

17. The method of solution 8, wherein the rule specifies to use syntax elements neighboring blocks that are outside a coding tree unit or a coding tree unit row of the current video block are replaced by one of N available neighboring blocks in the coding tree unit or the coding tree unit include an available coding information for the context modeling, where N is an integer.

18. The method of any of solutions 8 to 17, wherein the one or more syntax elements include alf_ctb_flag, qt_split_cu_flag, mtt_split_cu_flag, cu_skip_flag, amvr_mode, inter_affine_flag, merge_triangle_flag and merge_subblock_flag, cu_skip_flag, pred_mode_flag, pcm_flag, intra_luma_ref_idx, intra_luma_mpm_flag, intra_luma_mpm_idx, intra_luma_mpm_remainder, intra_chroma_pred_mode, merge_flag, inter_pred_idc, inter_affine_flag, cu_affine_type_flag, ref_idx_10, mvp_10_flag, ref_idx_11 mvp_11_flag, amvr_flag, amvr_4pel_flag, gbi_idx, cu_cbf, mmvd_flag, mmvd_merge_flag, or pred_mode_flag.

19. The method of solution 18, wherein a context ctx of a syntax element is derived as follows:

$ctx = A1$ is intra48 1:0; $ctx\mathrel{+}= B1$ is intra ?1:0 wherein A1 is a bottom left neighboring block and B1 is a top right neighboring block.

20. The method of solution 18, wherein a context ctx of pred_mode_flag is derived as follows:

$ctx = (A1 \text{ is intra}) \| (B1 \text{ is intra}) ? 1:0$ wherein A1 is a bottom left neighboring block and B1 is a top right neighboring block.

21. The method of solution 18, wherein a context ctx of a syntax element is derived as follows:

$ctx = A1$ is intra or inter-intra?1:0; $ctx\mathrel{+}= B1$ is intra or inter-intra?1:0;

wherein A1 is a bottom left neighboring block and B 1 is a top right neighboring block.

22. The method of solution 18, wherein a context ctx of a syntax element is derived as follows:

$ctx = (A1 \text{ is intra or inter-intra}) \| (B1 \text{ is intra or inter-intra}) ? 1:0;$ wherein A1 is a bottom left neighboring block and B 1 is a top right neighboring block.

23. The method of solution 18, wherein a context ctx of a syntax element is derived by excluding using neighboring blocks at five positions used for spatial merge candidate construction.

24. The method of solution 23, wherein the syntax element corresponds to pred_mode_flag.

25. The method of any of solutions 18-24, wherein the context is derived by treating an unavailable neighboring block as an inter-coded block.

26. The method of any of solutions 18-24, wherein the context is derived by treating an unavailable neighboring block as an intra-coded block.

27. The method of any of solutions 18-24, wherein the context is derived by treating an unavailable neighboring block as an inter-intra coded block.

28. The method of any of solutions 18-24, wherein the context is derived by treating a neighboring block that is in a different coding tree unit row as the current video block as an inter-coded block.

29. The method of any of solutions 18-24, wherein the context is derived by treating a neighboring block that is in a different coding tree unit row as the current video block as an intra-coded block.

30. The method of any of solutions 18-24, wherein the context is derived by treating a neighboring block that is in a different coding tree unit row as the current video block as an inter-intra coded block.

With reference to the above-listed solution sets, in some embodiments, the geometry partition mode (also called geometric partition mode in the present document) may include partitioning a video block into multiple partitions wherein at least one partition is a non-square and non-rectangular partition. As further disclosed throughout the present document, these partitions, called prediction partitions, may be used to form prediction blocks which are used during coding or decoding of the video block.

With reference to the above-listed solution sets, in some embodiments, the conversion may include encoding video generate the coded representation from video pixel values or other representation (e.g., transcoding).

With reference to the above-listed solution sets, in some embodiments, in some embodiments, the conversion may include video decoding operation in which the coded representation or bitstream is parsed by a decoding logic to generate or reconstruct video samples. In this regard, the conversion includes a parsing process in which syntax elements are parsed according to the various rules described in the present document.

In some embodiments, the disclosed techniques are implemented by a video decoder apparatus (e.g., as shown in FIG. 31). In some embodiments, a video encoder may implement various techniques described in the present document. In some embodiments, the disclosed solutions may be embodied as a computer program product that stores code for implementing the above-listed solutions using a processor.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 64:
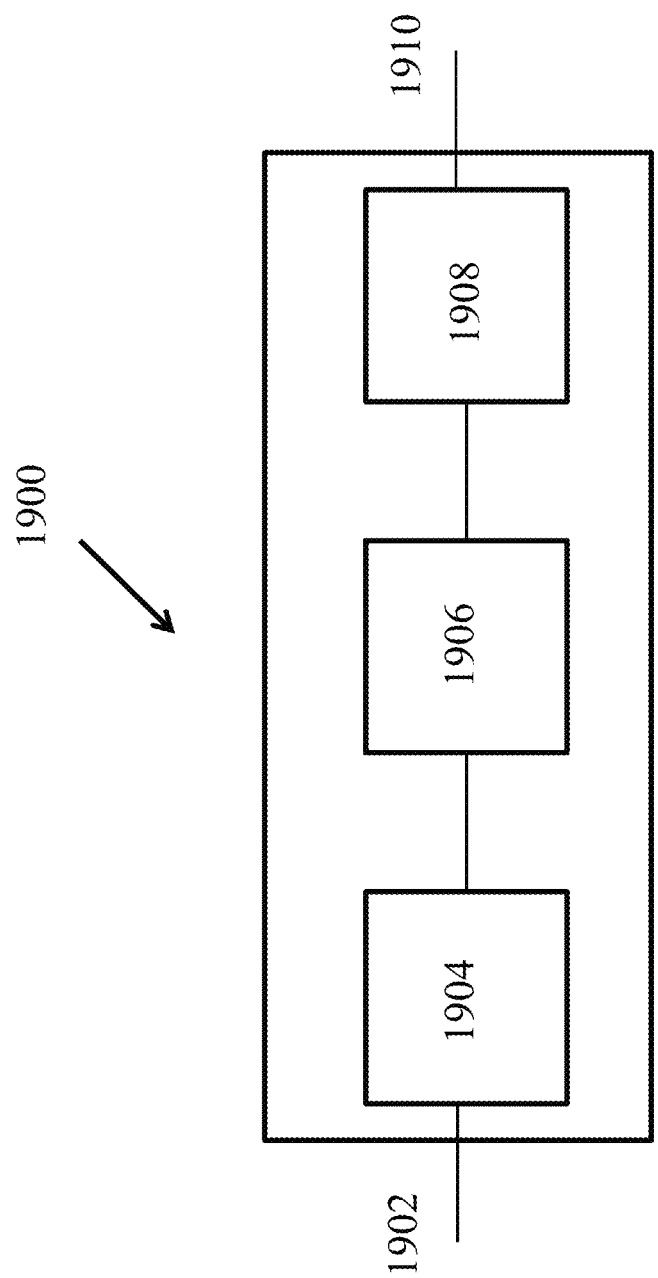
FIG. 64 is a block diagram of an example video processing system in which disclosed techniques may be implemented.

FIG. 64 is a block diagram of an example video processing system in which disclosed techniques may be implemented.

FIG. 64 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

It will be appreciated that the disclosed techniques may be embodied in video encoders or decoders to improve compression efficiency when the coding units being compressed have shaped that are significantly different than the traditional square shaped blocks or rectangular blocks that are half-square shaped. For example, new coding tools that use long or tall coding units such as 4×32 or 32×4 sized units may benefit from the disclosed techniques.

It will further be appreciated that various rules for video processing in which sub-block coding modes are either used together or excluded from use together are specified.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of coding video data, comprising:
   determining, for a conversion between a current block of a video and a bitstream of the video, whether the current block is coded with a geometric partitioning mode based on a size condition, wherein the geometric partitioning mode is disabled in case that the current block satisfies the size condition; and
   performing the conversion based on the determining;
   wherein in case that the current block is coded with the geometric partitioning mode, the bitstream includes multiple syntax elements among which one syntax element indicating a splitting pattern of the geometric partitioning mode for the current block and other syntax elements indicating multiple merge indices for the current block.

2. The method of claim 1, wherein a prediction among the multiple merge indices is utilized.

3. The method of claim 1, wherein an indication which specifies whether the geometric partitioning mode is enabled is included in the bitstream.

4. The method of claim 3, wherein the indication is at a sequence parameter set level or a picture parameter set level or a video parameter set level or a picture header or a slice header or a tile group header or a coding tree unit level.

5. The method of claim 1, wherein the size condition specifies not to use the geometric partitioning mode for the current block due to the current block having a size greater than a first threshold, wherein the first threshold is equal to 64.

6. The method of claim 1, wherein the size condition specifies not to use the geometric partitioning mode for the current block due to the current block having a size less than a second threshold, wherein the second threshold is equal to 8.

7. The method of claim 1, wherein the size condition specifies not to use the geometric partitioning mode for the current block due to the current block having a pre-defined width to height ratio.

8. The method of claim 1, wherein the conversion comprises parsing the multiple syntax elements from the bitstream.

9. The method of claim 1, wherein whether the geometric partitioning mode is used for the conversion depends on a height of the current block or a width of the current block or a ratio of the height and the width.

10. The method of claim 1, wherein the syntax elements indicating multiple merge indices are coded separately in the bitstream.

11. The method of claim 1, wherein the geometric partitioning mode includes multiple splitting patterns and at least one splitting pattern divides the current block into two partitions, at least one of which is non-square and non-rectangular.

12. The method of claim 1, wherein number of multiple merge indices is equal to number of partitions of the current block according to the splitting pattern of the geometric partitioning mode.

13. The method of claim 1, wherein the geometric partitioning mode comprises a triangular partitioning mode.

14. The method of claim 1, wherein the conversion comprises encoding the video into the bitstream.

15. The method of claim 1, wherein the conversion comprises decoding the bitstream to generate pixel values of the video.

16. The method of claim 15, wherein the decoding comprises parsing the syntax elements of the bitstream.

17. An apparatus for coding video data comprising a processor and a non-transitory memory with instructions thereon, wherein the instructions upon execution by the processor, cause the processor to:
  determine, for a conversion between a current block of a video and a bitstream of the video, whether the current block is coded with a geometric partitioning mode based on a size condition, wherein the geometric partitioning mode is disabled in case that the current block satisfies the size condition; and
  perform the conversion based on the determining;
  wherein in case that the current block is coded with the geometric partitioning mode, the bitstream includes multiple syntax elements among which one syntax element indicating a splitting pattern of the geometric partitioning mode for the current block and other syntax elements indicating multiple merge indices for the current block.

18. A non-transitory computer-readable storage medium storing instructions that cause a processor to:
  determine, for a conversion between a current block of a video and a bitstream of the video, whether the current block is coded with a geometric partitioning mode based on a size condition, wherein the geometric partitioning mode is disabled in case that the current block satisfies the size condition; and
  perform the conversion based on the determining;
  wherein in case that the current block is coded with the geometric partitioning mode, the bitstream includes multiple syntax elements among which one syntax element indicating a splitting pattern of the geometric partitioning mode for the current block and other syntax elements indicating multiple merge indices for the current block.

19. A non-transitory computer-readable recording medium storing a bitstream which is generated by a method performed by a video processing apparatus, wherein the method comprises:
  determining, for a conversion between a current block of a video and a bitstream of the video, whether the current block is coded with a geometric partitioning mode based on a size condition, wherein the geometric partitioning mode is disabled in case that the current block satisfies the size condition; and
  generating the bitstream from the current block based on the determining;
  wherein in case that the current block is coded with the geometric partitioning mode, the bitstream includes multiple syntax elements among which one syntax element indicating a splitting pattern of the geometric partitioning mode for the current block and other syntax elements indicating multiple merge indices for the current block.

* * * * *